United States Patent
Park et al.

(10) Patent No.: US 12,235,036 B2
(45) Date of Patent: Feb. 25, 2025

(54) PANEL ASSEMBLY FOR A HOME APPLIANCE AND HOME APPLIANCE THEREWITH

(71) Applicant: LG Electronics Inc., Seoul (KR)

(72) Inventors: Jaesung Park, Seoul (KR); Hyesun Jung, Seoul (KR); Doyoun Han, Seoul (KR); Seongmin Song, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 17/863,821

(22) Filed: Jul. 13, 2022

(65) Prior Publication Data
US 2023/0018403 A1 Jan. 19, 2023

(30) Foreign Application Priority Data

Jul. 13, 2021 (KR) .................. 10-2021-0091825
Jul. 13, 2021 (KR) .................. 10-2021-0091832
Jul. 13, 2021 (KR) .................. 10-2021-0091835

(51) Int. Cl.
*F25D 23/02* (2006.01)
*F25D 27/00* (2006.01)

(52) U.S. Cl.
CPC .......... *F25D 23/028* (2013.01); *F25D 27/00* (2013.01); *F25D 2327/001* (2013.01); *F25D 2400/18* (2013.01)

(58) Field of Classification Search
None
See application file for complete search history.

(56) References Cited

U.S. PATENT DOCUMENTS

| | | | | |
|---|---|---|---|---|
| 6,059,420 A | * | 5/2000 | Rogers | F25D 27/00 362/802 |
| 8,668,292 B2 | * | 3/2014 | Pae | F25D 23/028 312/405 |
| 8,789,900 B2 | * | 7/2014 | Laible | A47B 96/20 312/204 |
| 9,046,294 B2 | * | 6/2015 | Lee | F25D 23/04 |

(Continued)

FOREIGN PATENT DOCUMENTS

| | | | | |
|---|---|---|---|---|
| CN | 101890869 A | * | 11/2010 | B44C 5/04 |
| CN | 103250018 | | 8/2013 | |

(Continued)

OTHER PUBLICATIONS

Extended Search Report in European Appln. No. 22184627.2, dated Nov. 24, 2022, 8 pages.

*Primary Examiner* — Hanh V Tran
(74) *Attorney, Agent, or Firm* — Fish & Richardson P.C.

(57) ABSTRACT

A home appliance, e.g. a refrigerator, includes a cabinet forming a space and a door for opening and closing the space, the door including a door body with an insulator filled therein, and a panel assembly mounted in front of the door body, wherein the panel assembly includes a lighting device configured to emit light, a panel forming a front surface of the door and configured to transmit light therethrough, a light guide plate disposed behind the panel and configured to guide light emitted from the lighting device to the panel, and a member disposed between the panel and the light guide plate, including the panel and the light guide plate mounted thereon, and configured to transmit light of the light guide plate through an entire part of the panel.

20 Claims, 62 Drawing Sheets

(56) References Cited

U.S. PATENT DOCUMENTS

| | | | | |
|---|---|---|---|---|
| 10,180,280 | B2* | 1/2019 | Lee | F25D 23/028 |
| 10,670,329 | B2* | 6/2020 | Kang | F25D 27/005 |
| 10,808,994 | B2* | 10/2020 | Lee | G02B 6/0065 |
| 11,506,447 | B2* | 11/2022 | Jang | F25D 27/00 |
| 11,674,742 | B2* | 6/2023 | Park | F25D 29/005 |
| | | | | 361/679.01 |
| 11,988,442 | B2* | 5/2024 | Kwon | F25D 29/003 |
| 2009/0303409 | A1* | 12/2009 | Park | G02B 6/0088 |
| | | | | 445/24 |
| 2014/0144083 | A1* | 5/2014 | Artwohl | G09F 23/065 |
| | | | | 49/70 |
| 2014/0226073 | A1* | 8/2014 | Kamada | G02B 6/0088 |
| | | | | 362/609 |
| 2018/0164030 | A1* | 6/2018 | Lee | F25D 27/00 |
| 2018/0164031 | A1* | 6/2018 | Lee | F25D 11/00 |
| 2019/0051225 | A1* | 2/2019 | Sylvester | F21V 9/32 |
| 2019/0360745 | A1* | 11/2019 | Lee | F21V 33/0044 |
| 2019/0383551 | A1* | 12/2019 | Choi | F25D 23/028 |
| 2020/0018451 | A1* | 1/2020 | Signorino | F21V 3/04 |
| 2020/0173715 | A1* | 6/2020 | Kim | F25D 29/00 |
| 2024/0183606 | A1* | 6/2024 | Kim | F25D 27/00 |

FOREIGN PATENT DOCUMENTS

| | | | | | |
|---|---|---|---|---|---|
| CN | 104729201 | A | * | 6/2015 | F25D 23/02 |
| CN | 105627676 | A | * | 6/2016 | |
| CN | 107014145 | A | * | 8/2017 | |
| CN | 108931100 | A | * | 12/2018 | F25D 23/02 |
| CN | 106225405 | B | * | 8/2019 | A47F 11/06 |
| DE | 102020109934 | A1 | * | 8/2021 | |
| EP | 2857754 | A2 | * | 4/2015 | F24C 15/04 |
| EP | 3333513 | A1 | * | 6/2018 | A47F 3/0434 |
| EP | 3524908 | A1 | * | 8/2019 | A47F 3/0434 |
| EP | 3822563 | A1 | * | 5/2021 | E05F 15/616 |
| EP | 3869133 | A1 | * | 8/2021 | F21V 33/0044 |
| FR | 2978525 | A1 | * | 2/2013 | A47F 11/10 |
| JP | 2017106637 | A | * | 6/2017 | F21K 9/56 |
| KR | 20090090520 | A | | 8/2009 | |
| KR | 20120022201 | A | | 3/2012 | |
| KR | 20160044721 | A | * | 4/2016 | |
| KR | 20170106575 | A | * | 9/2017 | |
| KR | 20180022232 | A | * | 3/2018 | |
| KR | 20180067382 | | | 6/2018 | |
| KR | 20180119248 | A | * | 11/2018 | |
| KR | 20190137474 | A | * | 12/2019 | |
| KR | 20190137475 | A | * | 12/2019 | |
| KR | 20190137476 | A | * | 12/2019 | |
| KR | 20190137478 | A | * | 12/2019 | |
| WO | WO-2011093614 | A2 | * | 8/2011 | A47F 3/001 |
| WO | WO-2018043933 | A1 | * | 3/2018 | E06B 3/70 |
| WO | WO-2019175978 | A1 | * | 9/2019 | |
| WO | WO-2020013599 | A1 | * | 1/2020 | F25D 23/02 |
| WO | WO-2020096258 | A1 | * | 5/2020 | D06F 39/14 |
| WO | WO 2021/112409 | | | 6/2021 | |

* cited by examiner

PANEL ASSEMBLY FOR A HOME APPLIANCE AND HOME APPLIANCE THEREWITH

CROSS-REFERENCE TO RELATED APPLICATIONS

The present application claims priority under 35 U.S.C. 119 and 35 U.S.C. 365 to Korean Patent Application Nos. 10-2021-0091825, filed on Jul. 13, 2021, 10-2021-0091832, filed on Jul. 13, 2021, and 10-2021-0091835, filed on Jul. 13, 2021, the disclosures of which are hereby incorporated by reference in their entirety.

BACKGROUND

The present disclosure relates to a panel assembly for a home appliance, in particular for a door of a home appliance and to a home appliance including the same, e.g. a refrigerator, a dish washer, a laundry machine such as a clothing manager or a washing and/or drying machine, or a cooking device, e.g. an oven.

In general, a refrigerator is a home appliance for storing food at low temperature in an internal storage space that is shielded by a refrigerator door, and is configured to store the stored food in an optimal state by cooling the inside of the storage space using cold air generated through heat exchange with a refrigerant circulating through the refrigeration cycle.

Such a refrigerator is gradually being enlarged and multi-functional according to a trend of changes in dietary life and high-quality products, and a refrigerator equipped with various structures and convenience devices in consideration of user convenience is being developed.

In order to harmonize with an environment in which the refrigerator is disposed or with surrounding furniture or home appliances, structures for varying an outer appearance of a door front of the refrigerator are developed, and this trend is the same throughout the home appliance.

U.S. Pat. No. 8,789,900 discloses a structure in which a deco panel forming an outer appearance is installed on a door front of a refrigerator, and here, the outer appearance of the door front is formed according to a user's preference by detachably configuring the deco panel.

However, the refrigerator having this structure has a problem in that, when a user wants to change the outer appearance, the entire deco panel needs to be removed and replaced, and it is not possible to use the deco panel before replacement any longer.

To overcome the problem, Chinese Patent No. 103250018 discloses a refrigerator in which a reflective layer and a transparent panel are disposed on a door front and colored light emitting members are mounted on both ends of the reflective layer to cause the transparent panel to glow with set color.

However, in this structure, the light emitting member is positioned inward compared with a panel forming a front surface of a door, and thus there is a problem in that an outer appearance is poor due to shadows generated at both ends of the door when a light emitting member is operated.

When light emitting members are positioned at both ends of the door, there is a problem in that brightness is lowered due to an insufficient amount of light at a central part and that it is not possible to ensure uniform amounts of light on an entire front surface of the door.

In particular, there is a problem in that, when an entire front surface of the door glows in a structure having a large door, imbalance of brightness may become serious, and the quality of an outer appearance is degraded.

To overcome this problem, Koran Patent No. 10-2018-0067382 discloses a refrigerator in which a light guide plate is provided inside a door and a light emitting diode (LED) is provided below the light guide plate to emit light toward a front surface of the door.

However, in order to maintain a fixed structure in this structure of a light guide plate that is repeatedly opened and closed, components for fixing the light guide plate are disposed along a perimeter of the light guide plate, and thus a bezel structure needs to be provided around the light guide plate to shield the components.

Thus, it is possible to transmit light through a partial region of the door except for a bezel, and thus an entire front surface of a refrigerator door is not capable of glowing with uniform brightness.

In addition, there is a problem, when the LED is turned on for a long time, the light guide plate is deformed, and in this case, when a central part of the light guide plate is in contact with a front panel, local dark marks are formed viewed from the outside, and this phenomenon occurs more frequently in the case of a panel with a large size, resulting in user dissatisfaction.

The same or similar problems arise for other home appliances.

SUMMARY

An object of the present disclosure is to provide a panel assembly for a home appliance, in particular for a door of a home appliance, and to a home appliance including the same, e.g. a refrigerator, a dish washer, a laundry machine such as a clothing manager or a washing and/or drying machine, or a cooking device, e.g. an oven, wherein a panel forming an entire front surface of the pane assembly and/or forming an entire outer surface of the home appliance and/or forming an entire surface of a door of the home appliance can glow or emit light.

An object of the present disclosure is to provide a panel assembly for a home appliance, in particular for a door of a home appliance, and to a home appliance including the same, e.g. a refrigerator, a dish washer, a laundry machine such as a clothing manager or a washing and/or drying machine, or a cooking device, e.g. an oven, wherein an appearance of an entire panel forming a front surface of a door of the home appliance can be modified by a user, e.g. it can glow with color set by a user. In particular, it is an object of the present disclosure to provide a refrigerator for causing an entire panel forming a front surface of a door to glow with color set by a user.

An object of the present disclosure is to provide a panel assembly for a home appliance, in particular for a door of a home appliance, and to a home appliance including the same, e.g. a refrigerator, a dish washer, a laundry machine such as a clothing manager or a washing and/or drying machine, or a cooking device, e.g. an oven, with no bezel and/or with an invisible coupling region of a panel and a light guide plate. In particular, it is an object of the present disclosure to provide a refrigerator, which include a coupling region of a panel and a light guide plate to transmit light therethrough.

An object of the present disclosure is to provide a panel assembly for a home appliance, in particular for a door of a home appliance, and to a home appliance including the same, e.g. a refrigerator, a dish washer, a laundry machine such as a clothing manager or a washing and/or drying machine, or a cooking device, e.g. an oven, with a compact, stable and/or invisible mounting structure of a panel forming a front surface (i.e. outer surface) of the panel assembly. In particular, it is an object of the present disclosure to provide a refrigerator, which include a member for preventing contact between a panel and a light guide plate.

An object of the present disclosure is to provide a panel assembly for a home appliance, in particular for a door of a home appliance, and to a home appliance including the same, e.g. a refrigerator, a dish washer, a laundry machine such as a clothing manager or a washing and/or drying machine, or a cooking device, e.g. an oven, with a simplified mounting process and/or mounting structure of a panel forming a front surface (i.e. outer surface) of the panel assembly. In particular, it is an object of the present disclosure to provide a refrigerator for improving the assembly workability of a panel assembly by simplifying a mounting process and/or a mounting structure of a panel of the panel assembly.

According to one aspect, a panel assembly for a door of a home appliance includes: a lighting device configured to emit light, a panel configured to form a front surface (or outer surface) of the door and configured to transmit light therethrough, a light guide plate disposed behind the panel and configured to guide light emitted from the lighting device to the panel, and a member disposed between the panel and the light guide plate, including the panel and the light guide plate mounted thereon, and configured to transmit light of the light guide plate through an entire part of the panel.

According to one aspect, a panel assembly for a door of a home appliance includes: a lighting device configured to emit light, a panel configured to form a front surface (or outer surface) of the panel assembly and/or of the door and to transmit light therethrough, a light guide plate disposed behind the panel, i.e. at a rear side of the panel, and configured to guide light emitted from the lighting device to the panel, and a member disposed between the panel and the light guide plate and configured to transmit light from the light guide plate to the panel.

According to one aspect, a home appliance, in particular a refrigerator, includes: a cabinet forming a (storage) space and a door for opening and closing the (storage) space, the door including a door body (e.g. filled with an insulator filled), and a panel assembly mounted in front of and/or on and/or at the door body, wherein the panel assembly includes a lighting device configured to emit light, a panel forming a front surface of the door and configured to transmit light therethrough, a light guide plate disposed behind the panel and configured to guide light emitted from the lighting device to the panel, and a member disposed between the panel and the light guide plate, including the panel and the light guide plate mounted thereon, and configured to transmit light of the light guide plate through an entire part of the panel.

According to one aspect, a home appliance includes: a cabinet forming or defining a space and a door for opening and closing the space, the door including a door body and a panel assembly mounted in front of and/or on and/or at the door body, wherein the panel assembly includes: a lighting device configured to emit light, a panel configured to form a front surface (or outer surface) of the panel assembly and/or of the door and to transmit light therethrough, a light guide plate disposed behind the panel, i.e. at a rear side of the panel, and configured to guide light emitted from the lighting device towards the panel (i.e. towards an entire surface of the panel), and a member disposed between the panel and the light guide plate and configured to transmit light from the light guide plate to or towards the panel.

The panel assembly, the home appliance and/or the refrigerator according to any one of these aspects may include one or more of the following features:

Directional indications, such as front, rear, upper, lower, etc. are to be understood with respect to an operational orientation of the home appliance in a state where the panel assembly is mounted on or at its door.

The panel assembly may be configured to form an outer appearance of the door, e.g. a front surface of the door. The panel assembly may be mountable or mounted on the door, e.g. on a front surface of the door and/or on a door body of the door.

The home appliance may be any home appliance including a door for opening and closing a space formed in the home appliance. The home appliance may be a refrigerator, a cooking device, a dish washer, a laundry machine, a clothing manager, or the like.

The lighting device may include an LED assembly. The lighting device may be disposed on or at a side or an edge of the light guide plate.

The member may be disposed between the panel and the light guide plate for assembling the panel and the light guide plate. For instance, the member may receive or hold the light guide plate and/or the panel may be attached on or at the member.

A light transmission path may be formed from the lighting device through the light guide plate, the member and the panel to an outside of the door.

The light guide plate and/or the member may have a size and/or surface area corresponding to that of the panel.

The panel may have a size and/or surface area corresponding to that of the (front surface of the) door. That is, the panel may solely form the front surface of the door. In other words, the panel may form a uniform front surface of the door configured to emit light.

A reflective sheet may be disposed behind (i.e. at a rear surface of) the light guide plate. The reflective sheet may be in surface contact with the light guide, e.g. with a surface of the light guide facing away from the member and/or from the plate. The reflective sheet may be configured to reflect light towards the light guide and/or the member and/or the plate. The panel assembly may include a back cover forming a rear surface of the panel assembly. Then, the reflective sheet may be disposed between the light guide plate and the back cover.

A reflective member may be disposed at at least one side surface of the light guide plate, e.g. at at least one of an upper side surface, a lower side surface, and lateral side surfaces (a left side surface and a right side surface). The reflective member may be configured to prevent light from being transmitted from a corresponding side of the door.

The member may be transparent and/or made of plastic. The panel may be transparent and/or made of glass or plastic.

The member may include a front part on which the panel is mounted. The front part may have a size and/or surface area corresponding to that of the panel. The panel may be attached and/or adhered on the front part of the member. Further, the member may include a side surface part extending rearward, or towards the door body and/or the back cover, from both or opposite ends of the front part to form a space into which the light guide plate is inserted.

The side part may be formed at right and left side ends of the front part, and right and left side ends of the light guide plate are inserted into the side part to be fixed to the member.

The side part may include a first part extending towards the door body and a second part extending from the first extension. The second extension may extend from the first extension towards a center of the member and/or to face a rear surface of the front part and/or to form a first space with the front part. The first extension and the second extension may form a bracket with the front part to receive the light guide plate therein. A first space recessed to allow both ends of the light guide plate to be inserted thereinto may be formed in the side part.

The side part may extend vertically along the front part. The first space may have open upper and lower surfaces through which the light guide plate is inserted vertically.

The member may be formed of a plastic material for transmitting light therethrough, e.g. of a transparent plastic material. The member may be formed by injection molding or extrusion.

The member may be formed with the same cross-sectional shape in a vertical direction.

The side part may include first parts extending rearward from right and left side ends of the front part. That is, the side part may include first parts extending from opposite sides thereof towards the door body. The side part may include further second parts protruding on or from the first extensions at both sides in a direction to face each other. That is, the side part may include second parts extending from the first extensions towards each other, i.e. towards a center of the member. An end of the light guide plate may be inserted into a space formed by the front part, the first extension, and the second extension. In other words, lateral ends of the light guide plate may be inserted between the second extensions and the front part and covered by the first extensions.

The front part and the second extension may be spaced apart from each other by a distance corresponding to, e.g. equal to or larger than, a thickness of the light guide plate and/or such that the light guide plate is insertable therebetween. The light guide plate may have a uniform thickness.

In a state in which the light guide plate is inserted into the first space: the front part may be in contact with a front surface of the light guide plate, and/or the second extension may be in contact with a rear surface of the light guide plate, and/or the first extension may be in contact with a side surface of the light guide plate.

The panel assembly may further include an upper bracket forming an upper surface of the panel assembly, and/or a lower bracket forming a lower surface of the panel assembly. The upper bracket and the lower bracket may be mounted at upper and lower ends of the member, respectively. The upper bracket and the lower bracket may fix a position of the light guide plate mounted on the member.

The panel assembly or the refrigerator may further include third parts protruding in a direction to face each other from extending ends of the first extensions at both sides. The upper bracket and the lower bracket may be inserted and mounted in a second space formed by the first extension, the second extension, and the third extension.

The third extension may protrude compared with the second extension. That is, each of the third extension may protrude further towards a center of the member and/or from the first extension than the corresponding second part, i.e. the second extension extending from the first extension in parallel with said third part.

An upper end of the member, in particular an upper end of the front part and/or of the side part, may be stepped to receive the upper bracket. A lower end of the member, in particular a lower end of the front part and/or of the side part, may be stepped to receive the lower bracket. Upper and lower ends of the front part may be formed to be stepped with the side part, the upper bracket may be mounted at an upper end of the side part, and the lower bracket may be mounted at a lower end of the side part.

The upper bracket may be mounted on an upper end of the side part and inserted into the second space. An upper end of the upper bracket may be at level and/or flush with an upper end of the front part. The lower bracket may be mounted below a lower end of the side part and inserted into the second space. A lower end of the lower bracket may be at level and/or flush with a lower end of the front part. Lateral ends or sides of the upper bracket and/or of the lower bracket may be flush with lateral ends (i.e. outer sides) of the side part.

The panel assembly may further include a back cover forming a rear surface of the panel assembly. The back cover may be mounted on the side part or on a rear surface of the side part, e.g. on the third extensions. Right and left side ends, i.e. lateral ends, of the back cover may be in contact with the side part and/or upper and lower ends of the back cover may be mounted to be in contact with the upper bracket and the lower bracket, respectively, to cover the light guide plate from a rear.

The panel may be mounted on a front surface of the front part. The light guide plate may be mounted to be in contact with a rear surface of the front part.

The panel may be mounted in front of the front part to cover the front part.

The panel and the member may be formed with the same width. The side part may form (at least a part of) a side surface of the panel assembly.

The front part may partition a space between a rear surface of the panel and a front surface of the light guide plate.

A light diffuser may be added to the member to diffuse light transmitted through the member and directed toward the panel.

BRIEF DESCRIPTION OF THE DRAWINGS

FIG. 47 is a front view showing a front appearance of a refrigerator in the state in which the lighting device is turned on.

FIG. 56 is a front view of a front appearance of a refrigerator in the state in which a lighting device of the refrigerator is turned on.

DETAILED DESCRIPTION

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
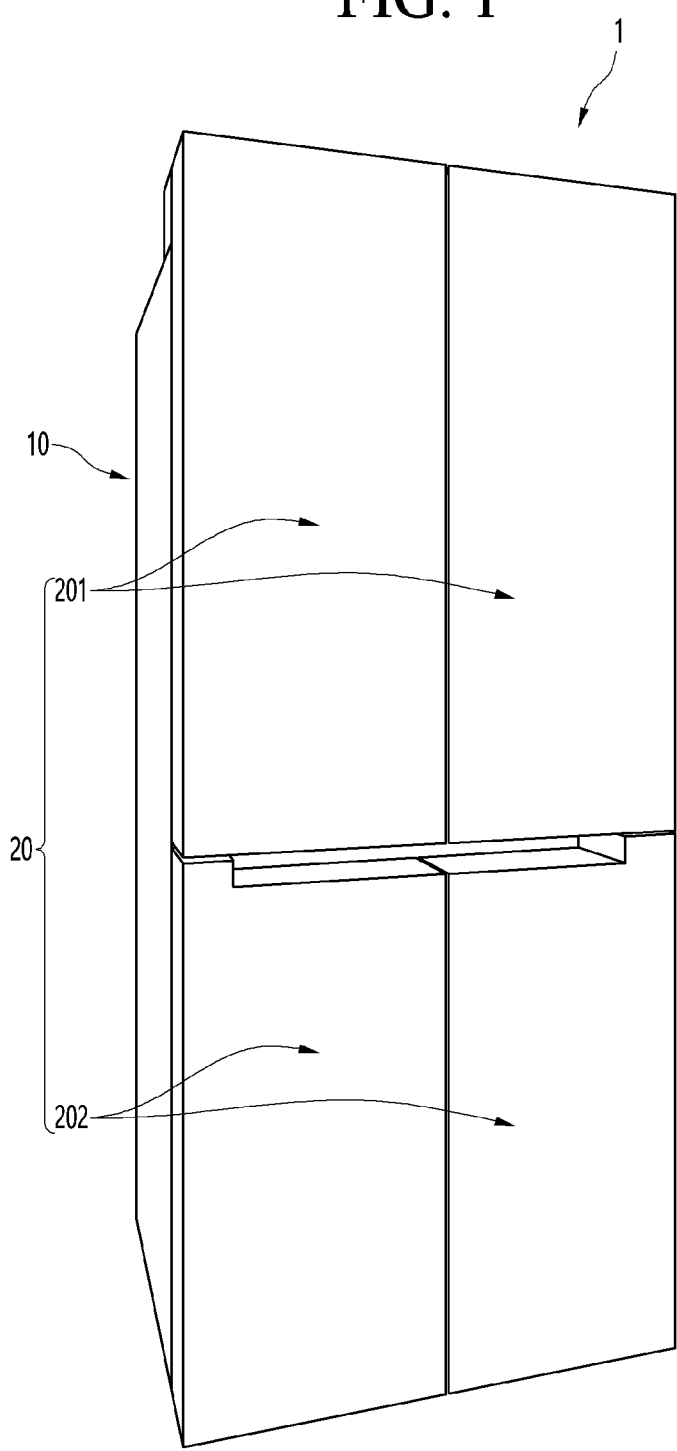
FIG. 1 is a front view of a refrigerator according to an embodiment of the present disclosure.

FIG. 1 is a front view of a refrigerator according to an embodiment of the present disclosure.

As shown in the drawings, an outer appearance of a refrigerator 1 according to the embodiment of the present disclosure may be formed by a cabinet 10 forming a storage space, and a door 20 for opening and closing the storage space of the cabinet 10.

For example, the cabinet 10 may form the storage space partitioned in a vertical direction, a refrigerating compartment may be formed at an upper part, and a freezing compartment may be formed at a lower part. The refrigerating compartment may be referred to as an upper storage space, and the freezing compartment may be referred to as a lower storage space.

The door 20 may be configured to open and close each of the refrigerating compartment and the freezing compartment. For example, the door may be rotatably mounted on the cabinet, and the refrigerating compartment and the freezing compartment may each be opened and closed by rotation. Needless to say, the door may also be withdrawn to open and close each of the refrigerating compartment and the freezing compartment.

The door may include a refrigerating compartment door 201 for opening and closing the refrigerating compartment, and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which a refrigerating compartment is disposed at an upper part and a freezing compartment is disposed at a lower part is described as an example in the embodiment, the present disclosure may be applied to all types of refrigerators equipped with a door without being limited to a type of a refrigerator.

A front appearance of the refrigerator 1 may be formed in the state in which the door 20 is closed and may form the out appearance of the refrigerator 1 viewed from the front in the state in which the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
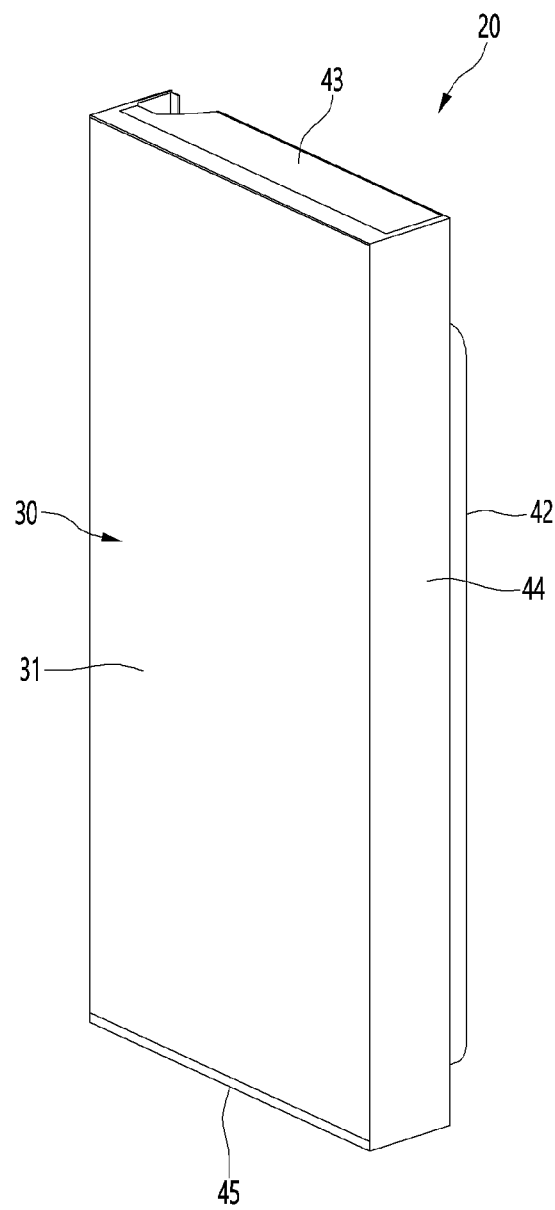
FIG. 2 is a perspective view of a refrigerator door according to an embodiment present disclosure.
Figure 3:
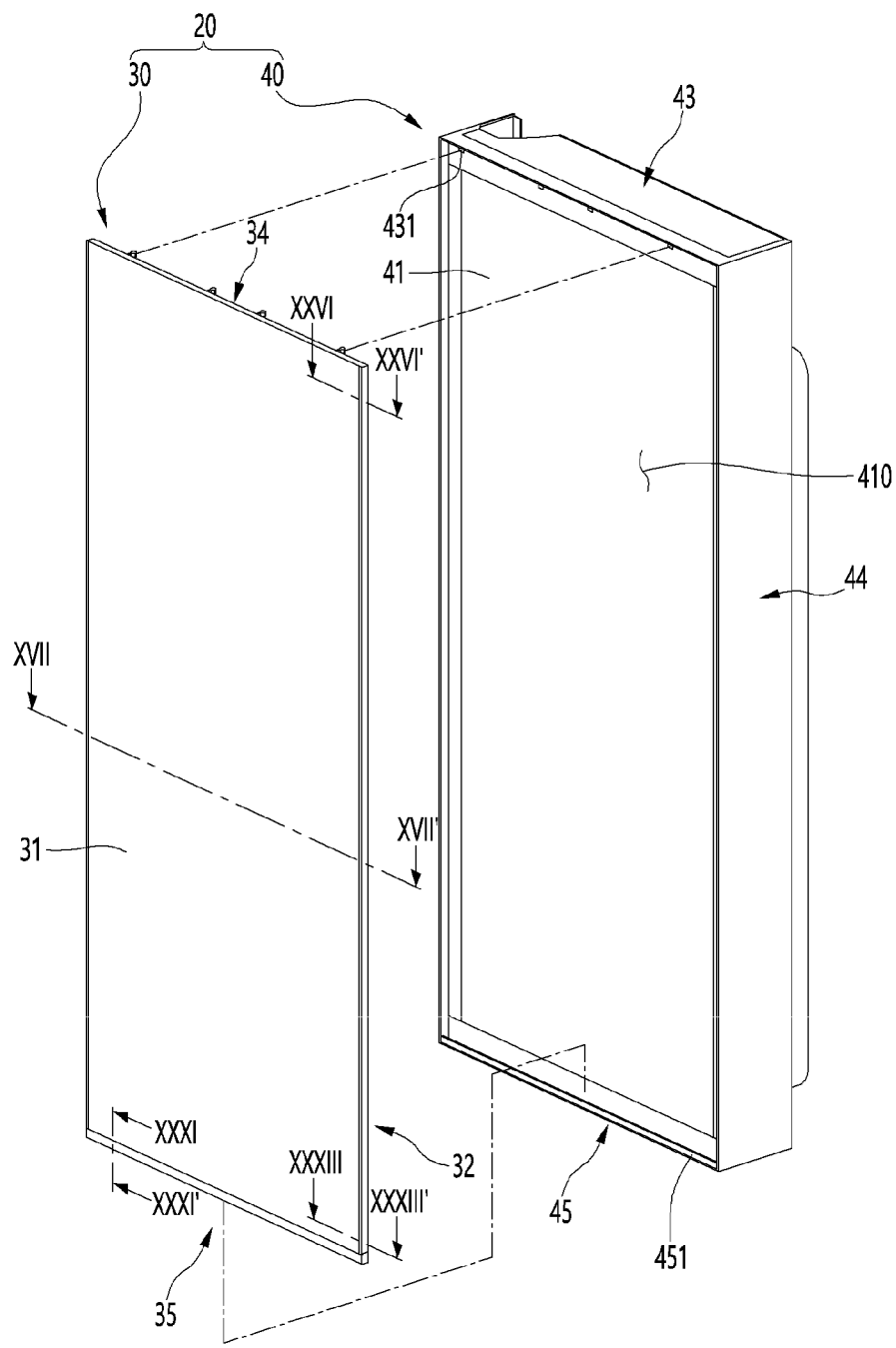
FIG. 3 is an exploded perspective view of the refrigerator door.

FIG. 2 is a perspective view of a refrigerator door according to an embodiment present disclosure. FIG. 3 is an exploded perspective view of the refrigerator door.

As shown in the drawings, the door 20 may include a door body 21 forming the overall shape of the door 20, and a panel assembly 30 forming a front appearance of the door 20. That is, the door 20 may be configured in such a way that the panel assembly 30 is mounted on a front surface of the door body 40.

The door body 40 may include a body plate 41 forming a front surface and a door liner 42 forming a rear surface. The body plate 41 may be formed of a metal material and may be formed in a plate shape having a size corresponding to the panel assembly 30. The door liner 42 may be formed of a plastic material and may form a bottom shape of the door 20.

The door body 40 may include a side deco 44 forming right and left side surfaces of the door body 21. The side deco 44 may connect right and left side ends of the body plate 41 and right and left side ends of the door liner 42.

The door body 40 may include an upper cap deco 43 and a lower cap deco 45 that form upper and lower surfaces of the door body 40. The upper cap deco 43 may be connected to an upper end of the side deco 44, an upper end of the body plate 41, and an upper end of the door liner 42. The lower cap deco 45 may be connected to a lower end of the side deco 44, a lower end of the body plate 41, and a lower end of the door liner 42.

An outer appearance of the door body 40 may be formed by the body plate 41, the door liner 42, the side deco 44, the upper cap deco 43, and the lower cap deco 45. An insulator may be filled in an internal space of the door body 40, which is formed by coupling the body plate 41, the door liner 42, the side deco 44, the upper cap deco 43, and the lower cap deco 45, and may provide an insulation structure to prevent heat from being transferred through the door 20.

An opened forward may be formed on a front surface of the door body 40. That is, a front end of the side deco 44 and front ends of the upper cap deco 43 and the lower cap deco 45 may protrude more forward than a front surface of the body plate 41, and thus the panel receiving space 410 with an open front side may be formed in front of the body plate 41. The panel receiving space 410 may be formed with a size corresponding to the size of the panel assembly 30 and the panel assembly 30 may be inserted into the panel receiving space 410. A perimeter of the panel assembly 30 may be supported by a peripheral surface of the panel receiving space 410, that is, protruding portions of the side deco 44, the upper cap deco 43, and the lower cap deco 45.

The panel assembly 30 may be formed in a plate shape and may be formed with a size corresponding to a front surface of the door body 40. Thus, when the panel assembly 30 is mounted on the front surface of the door body 40, the panel assembly 30 may shield the front surface of the door body 40 and may form a front appearance of the door 20. Since the panel assembly 30 may form the front appearance of the door 20, the panel assembly 30 may be referred to as a door panel, and since the panel assembly 30 may form the front appearance of the refrigerator 1, the panel assembly 30 may also be referred to as an exterior panel.

In the state in which the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap deco 45, and an upper end of the panel assembly 30 may be coupled to an upper end of a front surface of the upper cap deco 43 to firmly couple the panel assembly 30 to the door body 40. The panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the front appearance of the door 20. The panel assembly 30 may be configured to emit light from an entire front thereof and may be configured to glow with various colors.

To this end, a lighting device 36 may be provided inside the panel assembly 30. A wire 381 may be connected to the lighting device 36 in order to supply and control power. The wire 381 may be exposed outside the rear surface of the panel assembly 30, and a connector 382 may be provided on an end of the wire 381.

Although not illustrated in detail, a structure connected to the connector 382 of the wire 381 to supply power to the lighting device 36 may be provided on a front surface of the door body 40.

The wire 381 and the connector 382 may be configured to supply power to the lighting device 36 and thus may be referred to as a power supply. In addition to the wire 381 and the connector 382, the power supply may also have a structure that is exposed in the form of a terminal and comes into smooth contact with a mating terminal disposed on the door body 40 to supply power to the lighting device 36.

Hereinafter, the structure of the panel assembly 30 will be described in more detail with reference to drawings.

Figure 4:
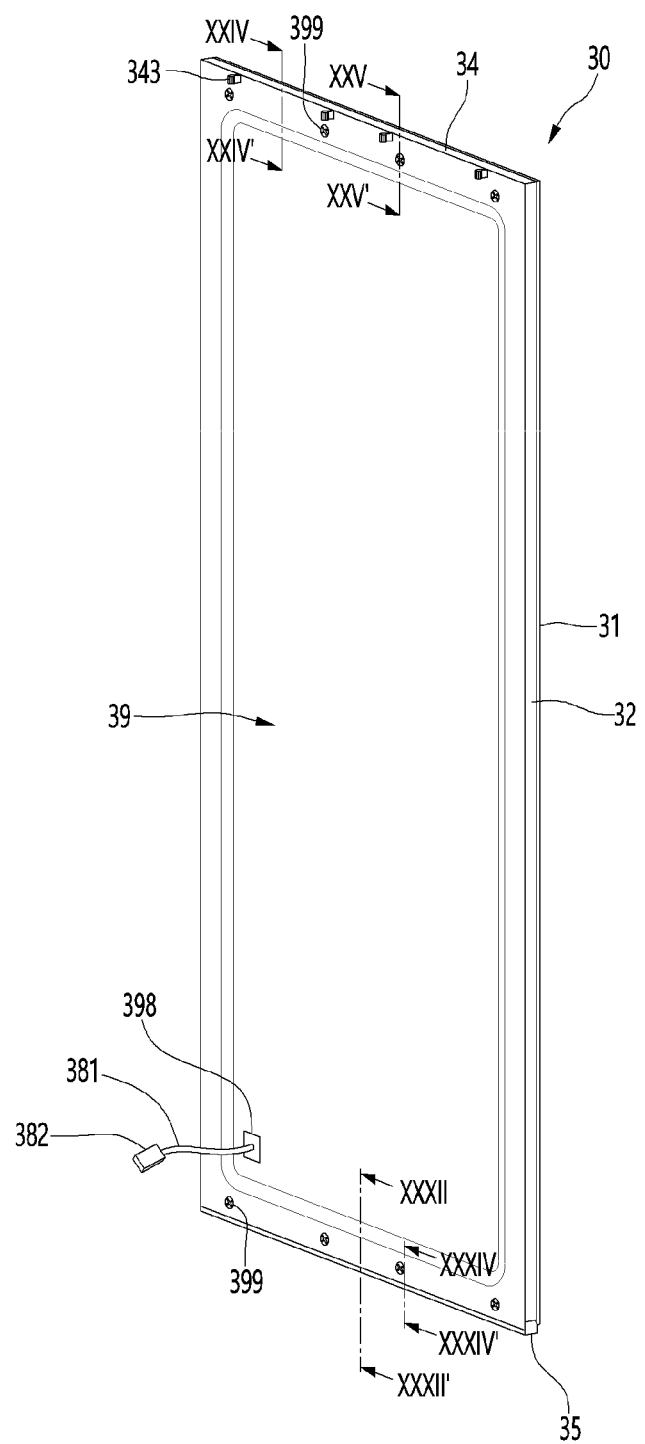
FIG. 4 is a perspective view of a panel assembly viewed from the rear according to an embodiment of the present disclosure.
Figure 5:
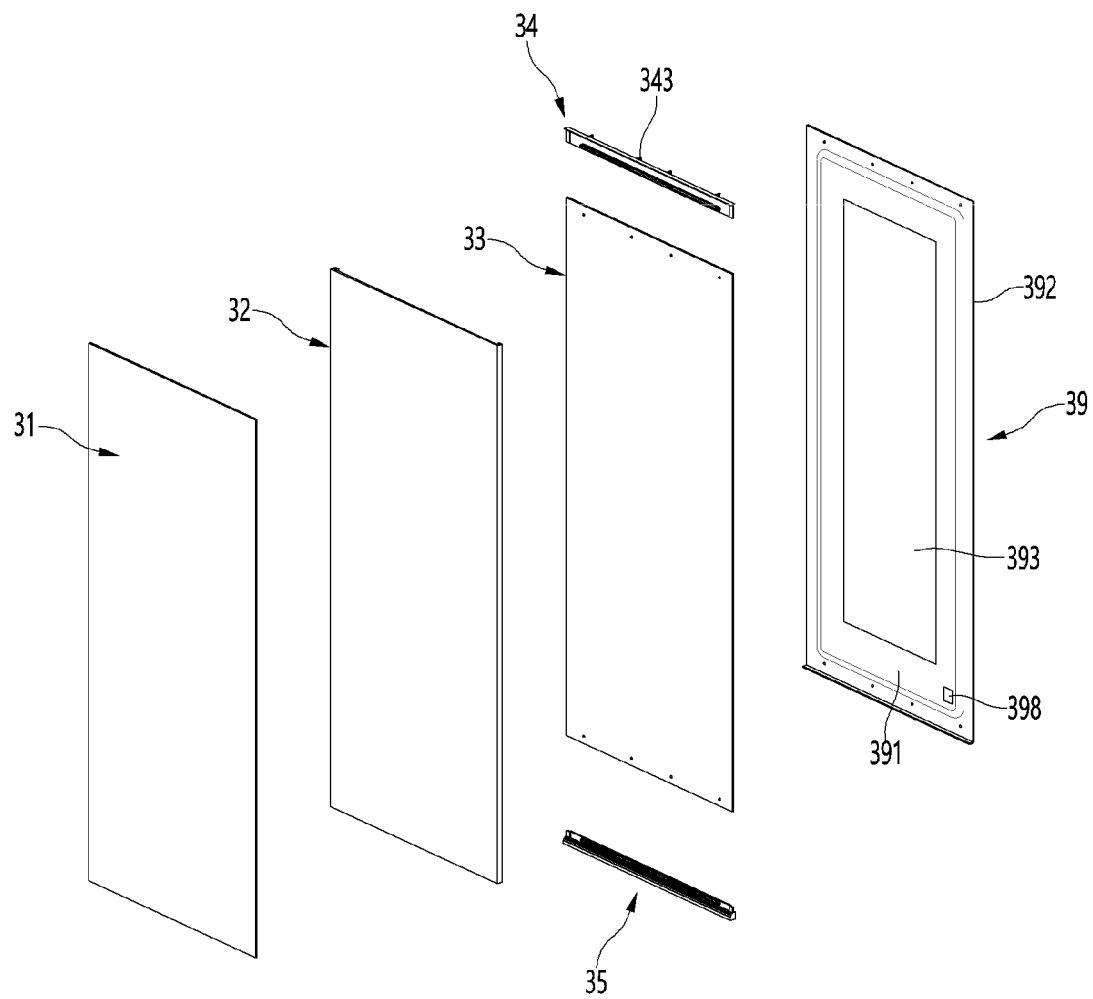
FIG. 5 is an exploded perspective view of the panel assembly viewed from the front.
Figure 6:
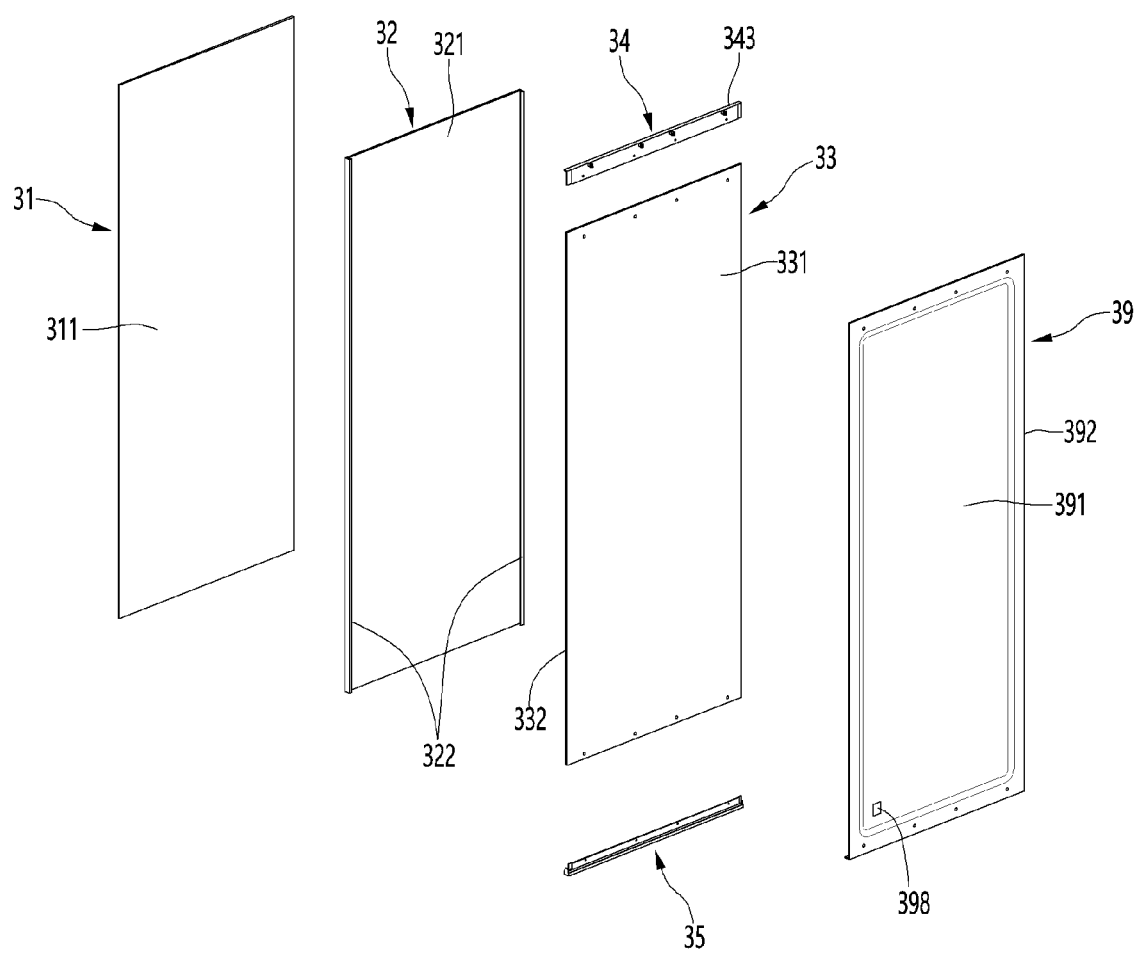
FIG. 6 is an exploded perspective view of the panel assembly viewed from the rear.

FIG. 4 is a perspective view of a panel assembly viewed from the rear according to an embodiment of the present disclosure. FIG. 5 is an exploded perspective view of the panel assembly viewed from the front. FIG. 6 is an exploded perspective view of the panel assembly viewed from the rear.

As shown in the drawings, the panel assembly 30 may include a panel 31 forming a front appearance, the lighting device 36 for emitting light to cause the panel 31 to glow, a light guide plate 33 for guiding light emitted from the lighting device 36, and a member 32 on which the panel 31 is mounted.

The panel assembly 30 may include an upper bracket 34 forming an upper surface of the panel assembly 30 and a lower bracket 35 forming a lower surface of the panel assembly 30. The lighting device 36 may be mounted on the lower bracket 35. The panel assembly 30 may further include a back cover 39 forming a rear surface.

In more detail, the panel 31 may be formed in a rectangular plate shape and may be formed of a material that transmits light therethrough. For example, the panel 31 may be formed of a glass material such as blue glass, white glass, and vapor deposition glass or may be formed of other materials for transmitting light therethrough, such as ABS, PMMA, or PC. The panel 31 may be formed with a set thickness for preventing the panel 31 from breaking easily due to the features of the panel 31 that forms an outer appearance. The panel 31 may be formed with a larger thickness than the light guide plate 33. For example, the panel 31 may be formed with a thickness of about 3 mm to 5 mm. The panel 31 may be referred to as a transparent plate or an out plate.

The panel 31 may be formed to be transparent to allow light reflected by the light guide plate 33 to be transmitted. In this case, the transparency may be defined as a degree to which the light reflected by the light guide plate 33 is transmitted and irradiated to the outside to identify that the panel 31 glows with specific color.

Throughout the embodiments of the present disclosure, the "transparency" and "transmittance" may be defined as the state in which it is possible to cause light to pass through the panel 31 and to represent set color through the panel 31.

The panel 31 may be formed to have color and may be formed to represent different colors depending on an operation or on and off states of the lighting device 36. For example, a specific design or pattern may be printed on the panel 31 to have specific color. A film with a specific design or pattern printed thereon may be added to the panel 31, surface treatment such as imprinting, etching, and glass printing may be performed on the panel 21, or a coating or deposition layer having specific color and texture may be formed to form an outer appearance of the panel 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the panel 31 due to the color of the panel 31.

In this case, a color layer 311 having color may be formed on the panel 31. In an off state, the color layer 311 may be formed to have at least color having brightness equal to or greater than 0 other than black. That is, in a state in which the refrigerator 1 is installed, the front surface of the refrigerator 1 may be displayed in a color other than black, and the front color of the refrigerator may be changed according to an operation of the lighting device 36.

The panel 31 may be formed to correspond to a size of a portion of a front surface of the panel assembly 30, which is exposed to the outside. In detail, an upper end and right and left side ends of the panel 31 except for a lower end may be formed to have the same size as those of the panel assembly 30. The lower end of the panel 31 may be positioned somewhat higher than the lower end of the panel assembly 30, that is, the lower end of the lower bracket 35, but the exposed portion of the lower bracket 35 may be shielded by the lower cap deco 45 in the state in which the panel assembly 30 is mounted. Thus, the entire front surface of the panel 31 which is exposed to the outside in the state in which the panel assembly 30 is mounted may be formed by the panel 31.

The panel 31 may be formed to be larger than the light guide plate 33. A rear surface of the panel 31 may be coupled to a front surface of the member 32. Thus, in the state in which the panel 31 is mounted on the member 32, a separate component is not present at the perimeter of the panel 31, and the panel 31 may form the front appearance of the panel assembly 30.

The light guide plate 33 may be positioned at a rear spaced apart from the panel 31 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a light diffuser added thereto for diffusing light incident on the light guide plate 33 or a pattern for diffusing light may be further formed on the light guide plate 33. Thus, light may be transferred to the panel 31 by the light guide plate 33, and in this case, a pattern of the light guide plate 33 may be set to cause the entire front surface of the panel 31 to glow with uniform brightness.

The light guide plate 33 may be entirely formed in a rectangular plate shape and may be formed with a somewhat smaller size than that of the panel 31. The light guide plate 33 may be supported by the back cover 39 from the rear and may be fixed to be maintained at a predetermined interval from the panel 31 by the member 32.

The light guide plate 33 may be formed with a set thickness to reflect light emitted from the lighting device 36 toward the panel 31. In this case, the light guide plate 33 may have a thickness for providing the amount of light to cause the entire panel 31 to sufficiently glow. For example, when the panel 31 is formed with a thickness of about 3.2 mm, the light guide plate 33 may be formed with a thickness of about 2 mm.

The member 32 may be disposed between the panel 31 and the light guide plate 33. The member 32 may be used to fixedly mount the light guide plate 33 and the panel 31, and in particular, may maintain the light guide plate 33 at a predetermined interval from the panel 31.

The front surface of the member 32 may support the panel 31 and opposite side surfaces of the member 32 may restrain both ends of the light guide plate 33. The front surface of the member 32 may be somewhat larger than the size of the light guide plate 33, and in the state in which the light guide plate 33 is mounted, the front surface of the member 32 and the light guide plate 33 may be maintained in the state of surface-contacting each other.

In detail, the member 32 may include a front part 321 shaped like a plate on which the panel 31 is mounted, and a side part 322 that is formed at right and left side ends of the front part 321 and on which the light guide plate 33 is mounted. The front part 321 may be formed like a plate corresponding to the panel 31, and a front surface of the light guide plate 33 may be disposed on a rear surface of the front part 321. The side part 322 may extend rearward from right and left side ends of the front part 321 and may be formed to restrain right and left side ends of the light guide plate 33. The member 32 may be used to mount the panel 31 and the light guide plate 33 thereon and may be referred to as a support member, the member 32 may transmit light therethrough and may be referred to as a transmissive plate, and the member 32 may form a structure containing a side surface of the panel assembly 340 and may also be referred to as a frame.

The member 32 may be formed of a material for transmitting light therethrough and may be entirely formed by injection or extrusion as a single component. That is, the member may be formed of a material having a property of transmitting light and having moldability. For example, the member 32 may be formed of an optically transparent ABS material. The member may be formed of various transparent plastic materials, that is, a material such as polycarbonate (PC), or acrylic. The member may transmit light reflected by the light guide plate 33 therethrough to make the light pass through the panel 31.

The light transmission capability and transparency of the member 32 may refer to a degree to which light emitted from the light guide plate 33 at the rear is capable of passing through the member 32 to illuminate the panel 31.

The member 32 may have corrosion or a pattern formed on the front part 321 through which light is transmitted, and such corrosion or pattern may be formed when viewed from the front of the panel assembly 30.

A light diffuser may be added during molding of the member 32. The light diffuser may diffuse light passing through the member 32 and may allow the light to be emitted more evenly to the entire front of the panel 31. In particular, it may be possible to prevent a lower portion of the panel 31, adjacent to the lighting device 36, from locally brightening or a hot spot from appearing.

Due to addition of the light diffuser, the member 32 may make the entire panel 31 brighter through light diffusion, but the transparency of the member 32 may be slightly lowered, and transmission of light reflected from the light guide plate 33 may be sufficient. When the transparency of the member 32 is slightly lowered due to the light diffuser, an outline of the light guide plate 33 disposed behind the member 32, a boundary of the side part 322 of the member 32, and the like may be hidden and may not be exposed to the outside. That is, due to the member 32, a rear appearance of the panel assembly 30 may be formed by the panel 31 and an internal boundary or hidden parts may not be seen to the outside.

The upper bracket 34 may be provided at an upper end of the panel assembly 30. The upper bracket 34 may form an upper surface of the panel assembly 30. The upper bracket 34 may be injection-molded with a plastic material, and may form a structure coupled to the member 32 and a structure coupled to the back cover 39.

The upper bracket 34 may be coupled to the upper end of the member 32 and may extend from a left end of the upper end of the member 32 to a right end thereof. The upper bracket 34 may be exposed through the upper surface of the panel assembly 30 in the state of being mounted.

The back cover 39 may be coupled to the rear surface of the upper bracket 34. The back cover 39 may be coupled to the upper bracket 34 by fastening a screw. The rear surface of the light guide plate 33 may be supported by the front surface of the upper bracket 34. That is, when the back cover 39 is coupled, the upper bracket 34 may support the light guide plate 33 from the rear.

The lower bracket 35 may be provided at the lower end of the panel assembly 30. The lower bracket 35 may form a lower surface of the panel assembly 30. The lower bracket 35 may be injection-molded with a plastic material and may form a structure coupled to the member 32 and a structure coupled to the back cover 39.

The lower bracket 35 may be coupled to the lower end of the member 32 and may extend from a left end of the lower end of the member 32 to a right end thereof. The lower bracket 35 may be exposed through a lower surface of the panel assembly 30 in the state of being mounted.

The back cover 39 may be coupled to the rear surface of the lower bracket 35. The back cover 39 may be coupled to the lower bracket 35 by fastening a screw. The rear surface of the light guide plate 33 may be supported by the front surface of the lower bracket 35. That is, when the back cover 39 is coupled, the lower bracket 35 may support the light guide plate 33 from the rear.

Thus, during a process in which the panel assembly 30 is assembled, right and left side ends of the light guide plate 33 may be fixed by the member 32, and the upper and lower ends of the light guide plate 33 may be supported by the upper bracket 34 and the lower bracket 35 from the rear.

The lighting device 36 may be mounted on the lower bracket 35. The lighting device 36 may be configured to emit for determining the front color and brightness of the panel assembly and to emit light toward the light guide plate 33. The lighting device 36 may be provided inside the lower bracket 35 and may be assembled and mounted with the lower bracket 35 in the state of being mounted on the lower bracket 35.

The back cover 39 may form a rear surface of the panel assembly 30 and may be coupled to the upper bracket 34 and the lower bracket 35. The back cover 39 may be formed of a metal material such as stainless or aluminum. The back cover 39 may be formed with a size corresponding to the size of the panel assembly 30 and may form an entire shape of the rear surface of the panel assembly 30.

The rear surface of the light guide plate 33 may be supported by a cover protrusion 391 protruding on the center of the back cover 39, from the rear. Thus, the light guide plate 33 may have the overall stable support structure and may be maintained in a stable mounting state in the state of being mounted the back cover 39. The upper bracket 34 and the lower bracket 35 may be provided at positions corresponding to an upper end and a lower end of the back cover 39.

Right and left side ends of a cover perimeter part 392, which form a perimeter of the back cover 39, may be in contact with the side part 322 of the member 32, and upper and lower ends of the cover perimeter part 392 may be in contact with the upper bracket 34 and the lower bracket 35, respectively.

A plurality of screws 399 may be coupled to the upper and lower ends of the cover perimeter part 392 and may be coupled to the upper bracket 34 and the lower bracket 35 through the back cover 39 to fixedly mount the back cover 39.

The structures of the light guide plate 33, the member 32, the back cover 39, the upper bracket 34, and the lower bracket 35 will be described below in more detail with reference to the drawings.

Figure 7:
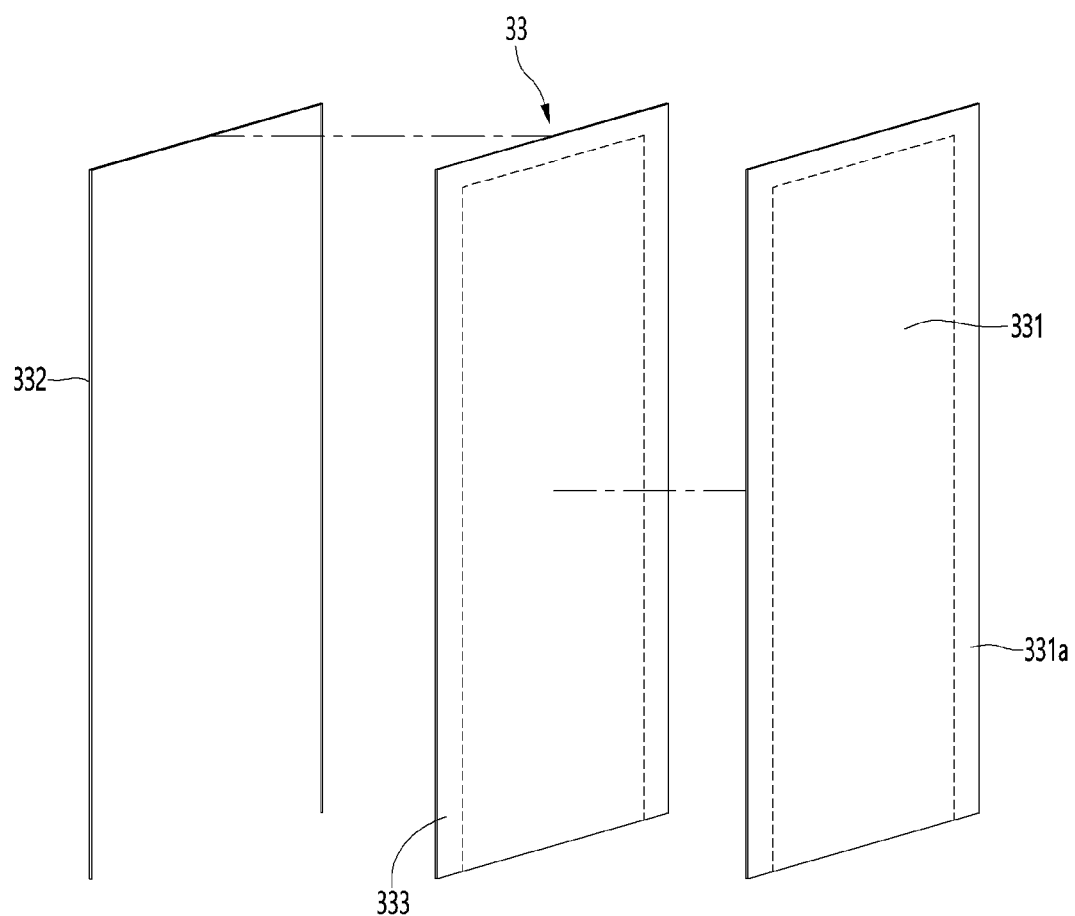
FIG. 7 is an exploded perspective view showing a coupling structure of a light guide plate, a reflective sheet, and a reflective member as one component of the panel assembly.

FIG. 7 is an exploded perspective view showing a coupling structure of a light guide plate, a reflective sheet, and a reflective member as one component of the panel assembly.

As shown in the drawing, the light guide plate 33 may be formed in a rectangular plate shape. The light guide plate 33 may be formed with a size corresponding to or somewhat smaller than the size of the front part 321 of the panel 31 and the member 32.

The light guide plate 33 may be formed with a thickness to be inserted into a side surface of the member 32, and in the state in which the light guide plate 33 is mounted on the member 32, a front surface of the light guide plate 33 may be in completely in contact with a rear surface of the front part 321 of the member 32, and thus a gap may not be generated therebetween.

The light guide plate 33 may be formed to reflect light of the lighting device 36, emitted from below, along the light guide plate 33 and to uniformly transfer the light forward, that is, to an entire surface of the panel 31.

To this end, a pattern for reflecting light emitted along the light guide plate 33 forward may be formed on the light guide plate 33. For example, the light guide plate 33 may be formed in such a way that the density of the pattern increases upward based on the center of the light guide plate 33 and the density of the pattern increases to the right and left sides from the center, and thus the overall brightness may be uniform.

In the lower end of the light guide plate 33, the pattern may not be formed to a position closest to the lighting device 36 or the density of the pattern may be formed relatively low. A pattern part 333 in which the density of the pattern is relatively high may be formed at a perimeter of the light guide plate 33 except for the lower end of the light guide plate 33.

Thus, it may be possible to have uniform brightness across the panel 31 by preventing a perimeter part of the panel 31, on which an adhesive member 313 is disposed, or a perimeter part of the panel 31, on which a coupling structure inside the panel assembly 30 is disposed, from being darkened due to increase in reflectance in the pattern part 333. For example, the pattern may be formed with a width of about 10 mm to 20 mm at an upper end and both side ends of the light guide plate 33 except for a lower end thereof. Pattern of a perimeter of the light guide plate 33 may have a different shape from a pattern of a central part of the light guide plate 33, thereby further improving light collection capability at the perimeter of the light guide plate 33.

Thus, light may be relatively focused at a perimeter of the panel 31, on which the adhesive member 313 is dispose, and thus the perimeter of the panel 31 may be prevented from darkening and the panel 31 may be entirely seen in color with the same brightness.

A reflective sheet 331 may be disposed on the rear surface of the light guide plate 33. The reflective sheet 331 may be formed with the same size of the size of the light guide plate 33 and may be formed like a sheet. The reflective sheet 331 may be in close contact with the rear surface of the light guide plate 33, and as necessary, may also be adhered to the rear surface of the light guide plate 33.

The reflective sheet 331 may be coated or patterned to cause a front surface thereof to reflect light, and the front surface of the reflective sheet 331 may be in contact with the rear surface of the light guide plate 33. Thus, light moved along the reflective sheet 331 may be reflected by the front surface of the reflective sheet 331 to be directed forward and may be reflected to the panel 31.

An edge reflector 331*a* may be further formed on the reflective sheet 331. The edge reflector 331*a* may be formed along a position corresponding to the adhesive member 313. In detail, the edge reflector 331*a* may be formed along the right and left side ends and the upper end of the reflective sheet 331, and the adhesive member 313 may be disposed in a region of the edge reflector 331*a*.

The region of the edge reflector 331*a* may have higher reflectance than the other part of the reflective sheet 331. For example, a pattern with higher density or a pattern with higher reflectance than the other part of the reflective sheet 331 may be formed on the edge reflector 331*a*.

Thus, the edge reflector 331*a* of the reflective sheet 331 may have higher light collection capability and reflectance than the other part and may allow light to be transmitted through the adhesive member 313 to illuminate the panel 31. That is, although the adhesive member 313 is provided, the panel 31 may entirely glow with uniform brightness.

Needless to say, the edge reflector 331*a* and the pattern part 333 may be formed together, and in this case, the edge reflector 331*a* and the pattern part 333 may have the same arrangement and the same width. As necessary, only any one of the edge reflector 331*a* and the pattern part 333 may be formed.

The reflective sheet 331 may be slidably inserted into the member 32 in the state of being in contact with the light guide plate 33 and may be maintained in the state of being in contact with the reflective sheet 331. To this end, the reflective sheet 331 may be configured to be maintained in the state of being in contact with the light guide plate 33 by static electricity or friction force.

A reflective member 332 may be further provided along an outer perimeter of the light guide plate 33. The reflective member 332 may be formed of the same material as that of the reflective sheet 331 and may direct light leaking through a perimeter surface of the light guide plate 33 again into the light guide plate 33 to further increase the reflection efficiency of the light guide plate 33.

Light leaking to the outside through a perimeter of the light guide plate 33 may be blocked by the reflective member 332, and thus light may also be prevented from leaking to the outside through the side part 322 of the member 32 formed of a transparent or translucent material, which is adjacent to an end of the light guide plate 33.

The reflective member 332 may be adhered to a perimeter of an outer surface of the light guide plate 33 by a tape or an adhesive, and a surface on which a pattern for reflecting light into the light guide plate 33 is formed may be adhered to a perimeter surface of the light guide plate 33.

The reflective member 332 may be provided on a part of the entire perimeter surface of the light guide plate 33. In detail, the reflective member 332 may be provided along an upper surface and right and left side surfaces of the perimeter of the light guide plate 33 except for a lower surface of the perimeter of the light guide plate 33, which faces the lighting device 36. The light guide plate 33 may be mounted on the member 32 in the state in which the reflective sheet 331 and the reflective member 332 are in contact with each other.

Figure 8:
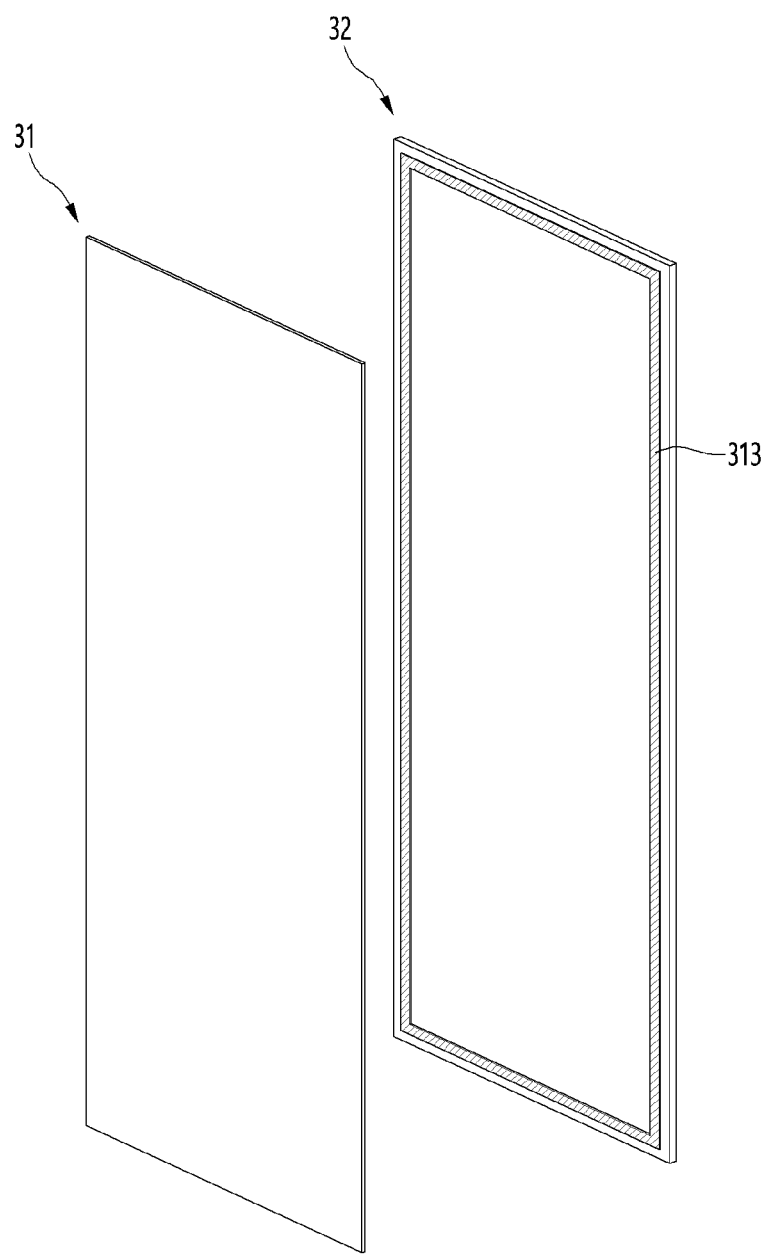
FIG. 8 is an exploded perspective view showing the case in which the front plate and the support member are dissembled, viewed from the front.
Figure 9:
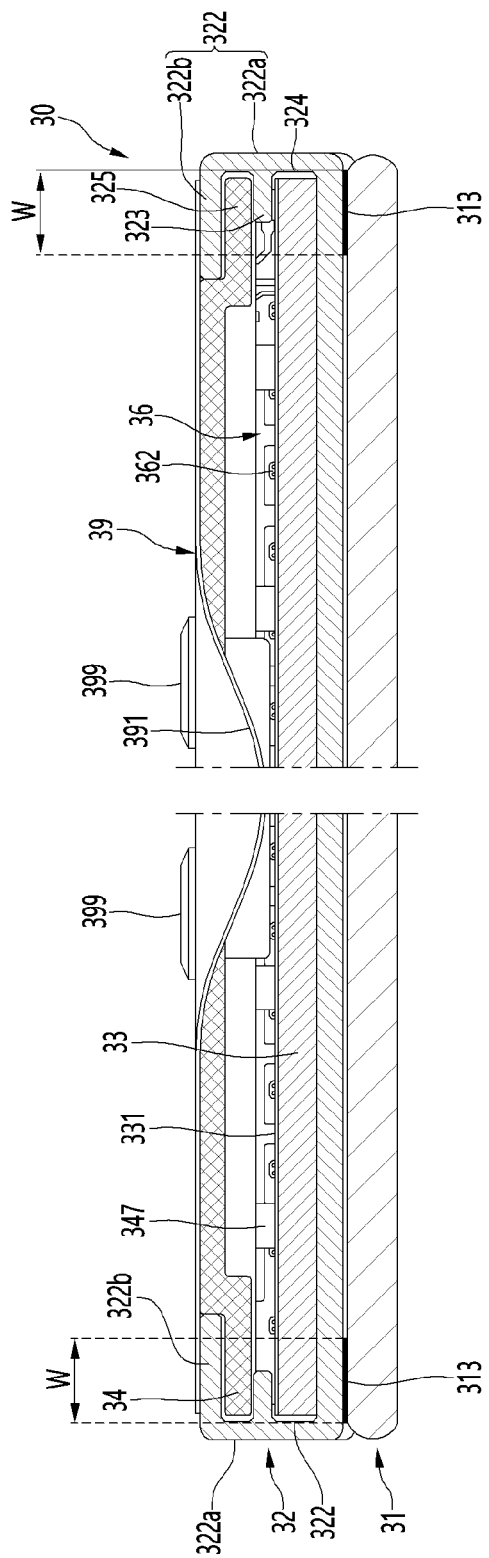
FIG. 9 is a cross-sectional view of the panel assembly.
Figure 10:
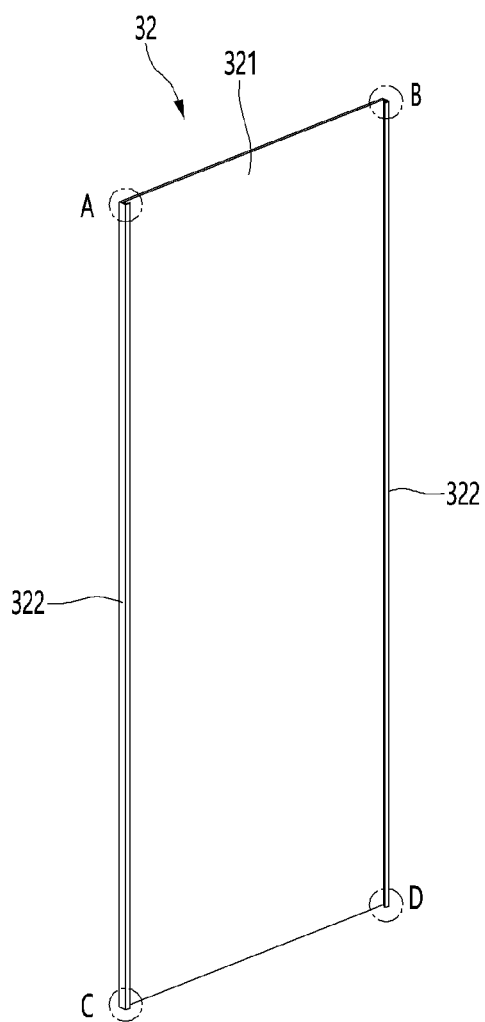
FIG. 10 is a perspective view of a component as one member of the panel assembly viewed from the rear.
Figure 11:
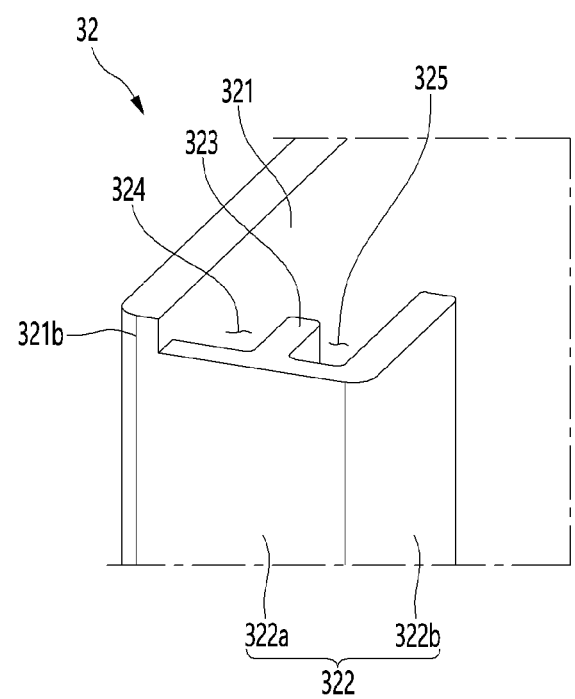
FIG. 11 is an enlarged view of a part "A" of FIG. 10.
Figure 12:
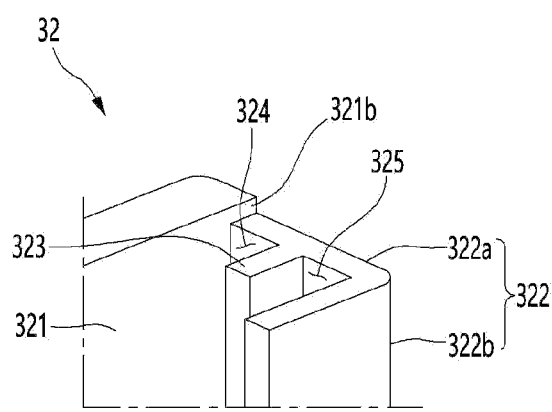
FIG. 12 is an enlarged view of a part "B" of FIG. 10.
Figure 13:
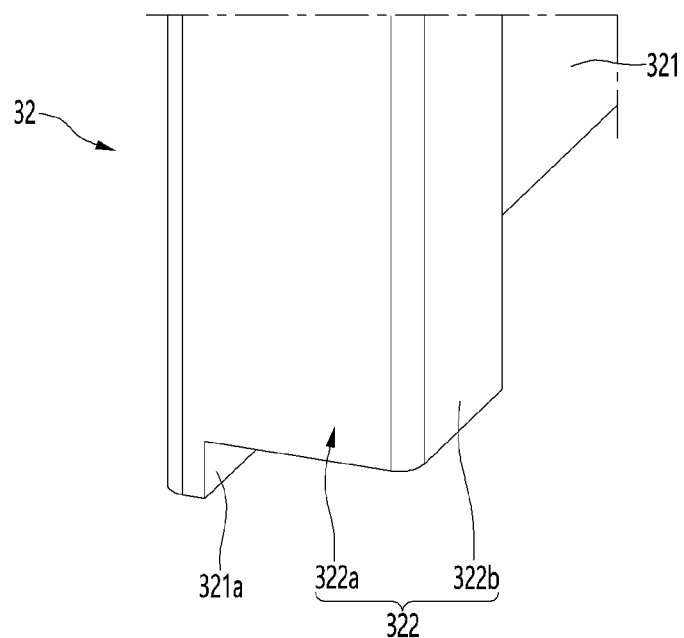
FIG. 13 is an enlarged view of a part "C" of FIG. 10.
Figure 14:
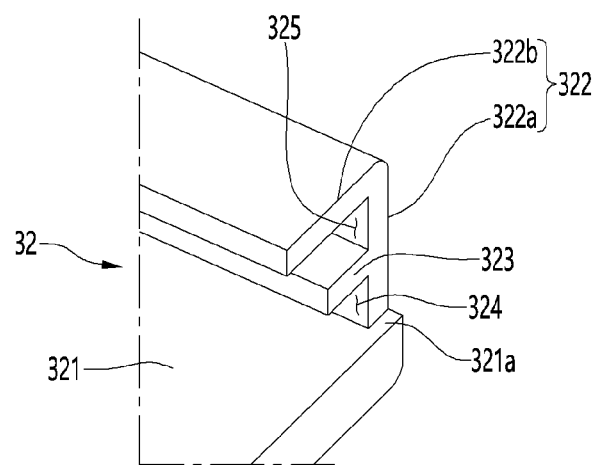
FIG. 14 is an enlarged view of a part "D" of FIG. 10.

FIG. 8 is an exploded perspective view showing the case in which the front plate and the support member are dissembled, viewed from the front. FIG. 9 is a cross-sectional view of the panel assembly. FIG. 10 is a perspective view of a component as one member of the panel assembly viewed from the rear. FIG. 11 is an enlarged view of a part "A" of FIG. 10. FIG. 12 is an enlarged view of a part "B" of FIG. 10. FIG. 13 is an enlarged view of a part "C" of FIG. 10. FIG. 14 is an enlarged view of a part "D" of FIG. 10.

As shown in the drawings, the member 32 may be entirely formed by injection molding of a resin material and may be formed of a transparent material, and thus light reflected forward through the light guide plate 33 may be transmitted and directed toward the panel 31.

The member 32 may include the front part 321 shaped like a plate, and the side part 322 that protrudes rearward from the right and left side ends of the front part 321. The front part 321 may be disposed between the panel 31 and the light guide plate 33, the front surface may support the panel 31, and the rear surface may support the light guide plate 33.

The front part 321 may be formed like a plate having a size corresponding to the panel 31, and the adhesive member 313 may be coated on the perimeter of the front part 321 to adhere the panel 31 to the member 32. In this case, the adhesive member 313 may be formed of a transparent or light-transmissive material, and the entire region of the panel 31, which contains a region on which the adhesive member 313 is coated, may glow.

For example, the right and left width of the front part 321 may be formed to have the same width as the right and left width of the panel 31. An upper end of the front part 321 may be positioned at a position corresponding to an upper end of the panel 31, and a lower end of the front part 321 may be positioned at a higher position than a lower end of the panel 31. That is, the remaining end of the front part 321 except for a lower end may be formed to correspond to a shape of the panel 31 and thus may entirely correspond to the size and shape of the panel 31.

The sealant 313 may be formed of a transparent or light-transmissible material, and the panel 31 may be configured in such a way that an entire area including an area to which the sealant 313 is applied shines.

Hereinafter, the sealant 313 for bonding the panel 31 and the member 32 will be described in detail.

The sealant 313 may be provided along an edge of a rear surface of the panel 31 or a front surface of the member 32, and the panel 31 and the member 32 may be fixed by the sealant 313.

The sealant 313 may be formed of a polyurethane resin having excellent thermal insulation performance as a main resin. Here, the main resin means that the polyurethane resin exceeds 50% by weight based on the total weight of components forming the sealant as 100% by weight.

The sealant 313 may have a density measured according to ASTM D 972 of 0.5 to 1.5 g/cm3, in detail, 1.1 to 1.3 g/cm3.

The sealant 313 may have a viscosity of 6,000 to 12,000 mPa·s measured using a Brookfield viscometer according to ASTM D 3236. Within this range, the sealant 313 may bond the panel 31 and the member 32 more firmly.

When the urethane resin is coated on the panel 31 or the member 32 as a main material and is cured, the urethane resin may be cured for at least 14 days at a temperature of 16 to 38° C. and a humidity of 30 to 60%. When the urethane resin is cured under these conditions, adhesion between the panel 31 and the member 32 may be enhanced. When the urethane resin is cured under these conditions, a tensile shear strength of at least 2.1 N/mm2 or more may be realized. The tensile shear strength may be measured according to ASTM D638.

The sealant 313 may be coated on the panel 31 or the member 32, and may be transparent or opaque in a cured state, and a color may also use a white series or a black series, but is not limited thereto.

Since the sealant 313 is provided along an edge of the panel 31, even if the sealant 313 uses an opaque or black series, a portion, light transmittance of which is lowered by the sealant 313, may be minimized.

The panel 31 may be formed to implement a specific color or pattern. That is, the panel 31 may be formed in such a way that light emitted from the lighting device 36 passes through the panel 31 to realize a color and that a specific color is also realized even when the lighting device 36 is turned off.

In this case, even if the sealant 313 is colored, the sealant 313 may be advantageously hidden by the color of the panel 31.

The sealant 313 may be discharged by a sealant discharging device equipped with a nozzle, and may be coated on the panel 31 or the member 32.

In this case, the sealant 313 may be coated spaced apart from an edge of the panel 31 or the member 32 by a set interval. The set interval may be about 3 to 6 mm from the outermost edge of the front plate or the support member in a state in which an outer edge of the sealant 313 is pressed against the panel 31 and the member 32.

In the process in which the panel 31 and the member 32 are coupled, the sealant 313 may be compressed. That is, the sealant 313 may be uniformly distributed on a surface of the panel 31 in a state in which the panel 31 and the member 32 are coupled, and thus light emitted from the lighting device 36 may be uniformly transmitted.

As the sealant 313 is uniformly spread in a state in which the panel 31 and the member 32 are coupled, a boundary between the applied sealant 313 and the panel 31 may become unclear.

In detail, when an adhesive tape is used to fix the panel 31 and the member 32, the thickness of the center and edge of the tape may be maintained constant, and thus a boundary with the front plate formed on the edge of the tape may define a line. In this case, there may be a problem in that the boundary line of the tape is transmitted by light and is visually recognized from the front of the panel 31.

However, in the case of the sealant 313, a liquefied sealant may be compressed and spread while the front plate and the support member are fixed, and a boundary between the sealant 313 and the panel 31 may become unclear. Accordingly, advantageously, a boundary line between the sealant 313 and the panel 31 may not be visible from the front of the panel 31.

After the sealant 313 is coated on the panel 31 in a liquid state, the sealant 313 may be cured in a state of being coupled to the member 32.

In a state in which the panel 31 and the member 32 are fixed, the sealant 313 may be formed with a width W of about 4 to 9 mm, in detail, 5 to 7 mm. Here, the width may refer to a distance W between outer and inner edges of the sealant 313.

When the width of the sealant 313 is less than 4 mm, coupling force between the panel 31 and the member 32 by the sealant 313 is lowered, and thus it may be possible to prevent the panel 31 from being separated from the member 32 or to prevent the panel 31 from flowing and being provided in a correct position.

When the width of the sealant 313 is greater than 9 mm, the amount of light transmitted through the panel 31 may be reduced by the sealant 313, and a portion coated with the sealant 313 may be darker than a portion that is not coated with the sealant 313.

The sealant 313 may be coated on an area of about 1 to 5%, in detail, 2 to 4% based on 100% of the total area of a rear surface of the panel 31 or a front surface of the member 32. Within this range, it may be possible to prevent the panel 31 and the member 32 from being separated and to prevent light transmission from being blocked by the sealant 313.

For example, a difference in light transmission between a portion of the panel 31, which is coated with the sealant 313, and a portion of the panel 31, which is not coated with the sealant 313, may be less than 10%, in detail, less than 5%, in more detail, less than 3%.

A difference in brightness between a portion of the panel 31, which is coated with the sealant 313, and a portion of the panel 31, which is coated with the sealant 313, may be less than 10%, in detail, less than 5%, in more detail, less than 3%.

An inner end of the sealant 313 coated on both side surfaces of the panel 31 or the member 32 may be positioned between a second part 323 and a third part 322*b* of the member 32.

In detail, in the state in which the panel 31 and the member 32 are adhered, the inner end of the sealant 313 may extend more inward than the inner end of the second extension 323. The inner end of the sealant 313 may be positioned outside the inner end of the third extension 322*b* of the member 32.

Here, the term 'inner' may refer to an end corresponding to a direction in which the sealant 313 extends from the member 32 based on a view of the member 32 from the front.

That is, a horizontal length of the sealant 313 coated on both side surfaces of the panel 31 or the member 32 may be approximately larger than a length by which the second extension 323 of the member 32 extends more inward than a first part 322*a*.

In addition, a horizontal length of the sealant 313 coated on both side surfaces of the panel 31 or the member 32 may be approximately shorter than a length by which the third extension 322*b* of the member 32 extends more inward than the first extension 322*a*.

In this structure, while the panel 31 and the member 32 are adhered more firmly without separating from each other, the front of the door 20 may glow uniformly when the lighting device 36 is turned on.

For example, from the front of the panel 31, a difference in light transmittance between a portion coated with the sealant 313 and a portion that is not coated with the sealant 313 may be 10% or less.

The sealant 313 may be coated along upper and lower ends of the member 32.

In the state in which the panel 31 and the member 32 are adhered, the sealant 313 coated on an upper end of the member 32 may be positioned above an upper end of a support rib 347.

An upper end of the sealant 313 coated along the upper end of the member 32 may be positioned below the upper end of the upper bracket 34 and may be positioned below an upper end of the panel 31.

The sealant 313 coated on a lower end of the member 32 may be coated up to, for example, a position at which the lower end of the sealant 313 corresponds to the lower end of the lower bracket 35.

The sealant 313 coated on the lower end of the panel 31 may be positioned above, for example, an upper end of the light source.

The lighting device 36 may be provided behind the lower end of the member 32, and in order to prevent the lighting device 36 from being damaged due to impact caused by frequent door opening, the sealant 313 may be further coated between the panel 31 and the lower bracket 35.

At this position, the panel 31 and the upper end of the member 32 may be firmly adhered while an area coated with the sealant 313 is minimized.

In this structure, the sealant 313 according to the present disclosure may be directly attached to an edge of the panel 31 or the member 32.

In detail, the panel 31 or the member 32 may not require a concave groove for guiding a position to which the sealant 313 is applied or for preventing the sealant 313 from being moved after being attached to the panel 31 or the member 32. Thus, an operation of assembling the panel 31 and the member 32 may be advantageously simplified.

Because the sealant 313 is coated only on the rear surface of the panel 31, a separate member and coupling structure such as a screw may not be required in order to mount the panel 31 on the door body 40.

Because the panel 31 is adhered to the member 32 by the sealant 313, there is no need for a separate trim member covering both side surfaces or edges of upper and lower ends of the panel 31.

That is, the panel 31 may be formed to correspond to an area of a front area of the panel assembly 30, which is exposed to the outside. A separate configuration from the panel 31 on an outer surface of the panel 31 may not define the front surface of the panel assembly 30.

Thus, an entire front surface of the panel 31, which is exposed to the outside in the state in which the panel assembly 30 is mounted, may be defined by the panel 31.

In other words, an edge of the front surface of the panel assembly 30 may be positioned to correspond to an edge of the panel 31. That is, the panel 31 may define a front appearance of the door 20, and when a user views the door 20 from the front, there is no portion covering a periphery of the door 20, and thus an improved outer appearance may be provided.

According to an embodiment of the present disclosure, although an example in which the sealant 313 is coated between the panel 31 and the member 32 has been described, the present disclosure is not limited thereto. For example, the sealant 313 may be directly coated between the panel 31 and the light guide plate 33.

The front part 321 may have a structure for connecting the side parts 322 at right and left sides. That is, the front part 321 may be continuously formed between the side parts 322, and the side part 322 at one side may extend to the side part 322 at the other side.

In the state in which the light guide plate 33 is mounted, the rear surface of the front part 321 may be maintained in the state of being in contact with the front surface of the light guide plate. Thus, the light guide plate 33 may always be maintained at a predetermined interval and may direct light of an entire part of the light guide plate 33 toward the panel 31 without being interfered.

In this case, the front part 321 may be molded to maintain a set flatness, and thus when the light guide plate 33 is mounted, the front part 321 may be in contact with the entire front surface of the light guide plate 33. Thus, it may be important to mold the front part 321 and the light guide plate 33 to prevent an irregular interval or gap from being formed therebetween.

According to the embodiment illustrated in the drawings, the panel 31 may be adhered to the front part 321 by the adhesive member 313. Thus, the panel 31 may be indirectly coupled to the front part 321 by the front part 321 and the adhesive member 313, and this may be considered as the state of being spaced apart from the front part 321. The light guide plate 33 may be disposed to be in contact with the rear surface of the front part 321. The front surface of the light guide plate 33 and the rear surface of the front part 321 may be in contact with each other, but may be in simple contact with each other rather than being completely adhered or attached to each other.

The side part 322 may be formed along the right and left side ends of the light guide plate 33. The side part 322 may be stepped with upper and lower ends of the light guide plate 33 and may be formed to match with side ends of the upper bracket 34 and the lower bracket 35.

The side part 322 may include a first part 322a extending rearward from the right and left side ends of the front part 321 and a second part 323 protruding to face each other in an internal surface of the first extension 322a at both ends. The side part 322 may further include a third part 322b at an end of the first extension 322a. That is, the side part 322 may include the first extension 322a and the second extension 323, and as necessary, may further include the third extension 322b.

The first extension 322a may extend perpendicularly to the front part 321 from the right and left side ends of the front part 321 and may form a side surface of the panel assembly 30. An internal space of the panel assembly 30 may be defined by the first extension 322a and may form a space for mounting at least the light guide plate 33 therein. In addition, the side part 322 may further form a space for mounting the upper bracket 34 and the lower bracket 35 therein.

The third extension 322b may be bent inward from an extending end of the first extension 322a. That is, one pair of the third extensions 322b that are formed on one pair of the first extensions 322a, respectively, may extend to face each other.

The third extension 322b may extend perpendicularly to the first extension 322a and may be formed to restrain both ends of the upper bracket 34 and the lower bracket 35. The third extension 322b may extend from an upper end of the first extension 322a to a lower end thereof and may support right and left side ends of the back cover 39.

A second part 323 may be further formed on an internal surface of the first extension 322a. The second extension 323 may be formed between the front part 321 and the third extension 322b and may extend perpendicularly to the first extension 322a. The second extension 323 may extend from an upper end of the first extension 322a to a lower end thereof. The right and left width of the second extension 323 may be shorter than that of the third extension 322b.

The second extension 323 may be positioned between the right and left side ends of the light guide plate 33 and the right and left side ends of the lower bracket 35. That is, the second extension 323 may be provided at the rear based on the light guide plate 33 and may be positioned at the front based on the right and left side ends of the upper bracket 34 and the lower bracket 35.

Thus, the second extension 323 may divide a space formed by the side part 322 into front and rear sides to form a space into which the light guide plate 33, the upper bracket 34, and the lower bracket 35 are slidably inserted.

In detail, the second extension 323 may be positioned between the front part 321 and the third extension 322b and may be formed in parallel to the front part 321 and the third extension 322b. The second extension 323 may partition a space between the front part 321 and the third extension 322b to form a first space 324 into which the light guide plate 33 is inserted, and a second space 325 into which the upper bracket 34 and the lower bracket 35 are inserted.

The first space 324 may be formed between the front part 321 and the second extension 323. A front-to-rear distance of the first space 324 may be formed with a size corresponding to the thickness of the light guide plate 33. Thus, the light guide plate 33 may be slidably moved into the first space 324, and the right and left side ends of the light guide plate 33 may be restrained at both side ends of the member 32. In this case, the front surface of the light guide plate 33 may be in contact with the rear surface of the front part 321.

Needless to say, the light guide plate 33 may be slidably inserted along the side part 322, and thus may not be in close contact with the rear surface of the front part 321, and accordingly, a fine gap may be formed and the light guide plate 33 may be slidably inserted thereinto. That is, the front part 321 and the light guide plate 33 may be in contact with each other without being limited thereto, and at least a portion of the light guide plate 33 may be spaced apart from the front part 321.

In the state in which the light guide plate 33 is inserted into the first space 324, the lower end of the light guide plate 33 may be positioned to face the lighting device 36. In particular, the light guide plate 33 may be disposed on the same extension line as the light source 362 of the lighting device 36, and in the state in which the light guide plate 33 is fixedly inserted into the first space 324, movement in forward and backward directions of the light guide plate 33 may be restrained.

That is, even if the door 20 is repeatedly opened and closed, the light guide plate 33 may be in contact with the front part 321, may be maintained at a predetermined interval from the panel 31, and may not deviate from a position at which the light guide plate 33 is originally installed. The state in which the light guide plate 33 is disposed on the same extension line as the light source 362 included in the lighting device 36 may be maintained, and thus it may be possible to ensure that light emitted from the light source 362 is directed toward an end of the light guide plate 33.

The second space 325 may be formed between the second extension 323 and the third extension 322b. The front-to-rear distance of the second space 325 may correspond to the thickness of an upper bracket front part 341 and a lower bracket front part 351. Thus, the upper bracket 34 and the lower bracket 35 may be inserted into the second space 325 from above and below and may be fixedly mounted on the upper and lower ends of the member 32.

The upper and lower ends of the side part 322 may be formed lower than the upper and lower ends of the front part 321, and the upper and lower ends of the side part 322 may be stepped based on the upper end of the front part 321.

In detail, an upper end protrusion 321b and a lower end protrusion 321a that further protrude compared with the upper and lower ends of the side part 322 may be formed on the upper and lower ends of the front part 321. Thus, the upper bracket 34 and the lower bracket 35 that are mounted on the upper and lower ends of the member 32 may be assembled with directivity to prevent misassembly, and the upper bracket 34 and the lower bracket 35 may be more firmly and fixedly mounted.

That is, when the upper bracket 34 is mounted, right and left sides of the upper bracket 34 may be supported by the upper end of the side part 322, and a front end of the upper bracket 34 may be supported by the upper end protrusion 321b. Thus, the upper bracket 34 may be simultaneously supported by the side part 322 and the front part 321 and may also have a temporary fixed structure even before the screws 399 is coupled. In the state in which the upper bracket 34 is completely mounted, the upper bracket 34 may be coupled to the front part 321 and the side part 322 to be prevented from being distorted or deformed.

When the lower bracket 35 is mounted, the right and left side ends of the lower bracket 35 may be supported by the lower end of the side part 322, and the front surface of the lower bracket 35 may be supported by the lower end protrusion 321a. Thus, the lower bracket 35 is simultaneously supported by the side part 322 and the front part 321 and may have a temporary fixed structure even before the screws 399 is coupled. In the state in which the lower bracket 35 is completely mounted, the lower bracket 35 may be coupled to the front part 321 and the side part 322 to be prevented from being distorted and deformed.

As such, the upper bracket 34 and the lower bracket 35 may be inserted into the second space 325, and simultaneously, may be accommodated on a stepped portion of the upper and lower ends of the side part 322 and the front part 321 to be firmly coupled to the member 32. In the state in which the upper bracket 34 and the lower bracket 35 are coupled to the member 32, the upper and lower ends of the panel assembly 30 may be formed.

Hereinafter, the aforementioned coupling structure of the member 32, the panel 31, and the light guide plate 33 will be described.

Figure 15:
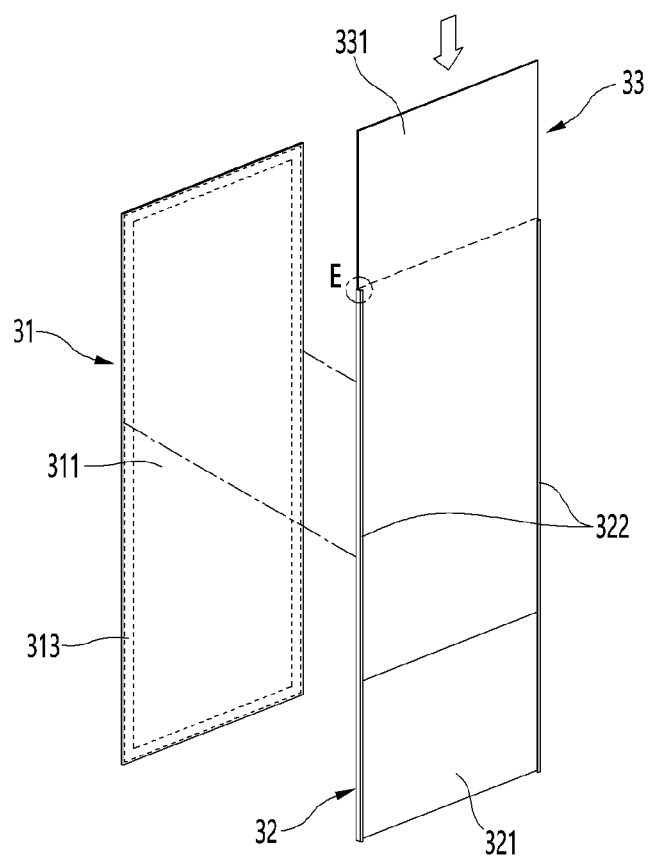
FIG. 15 is a diagram showing a coupling structure of the member, the panel, and the light guide plate.
Figure 16:
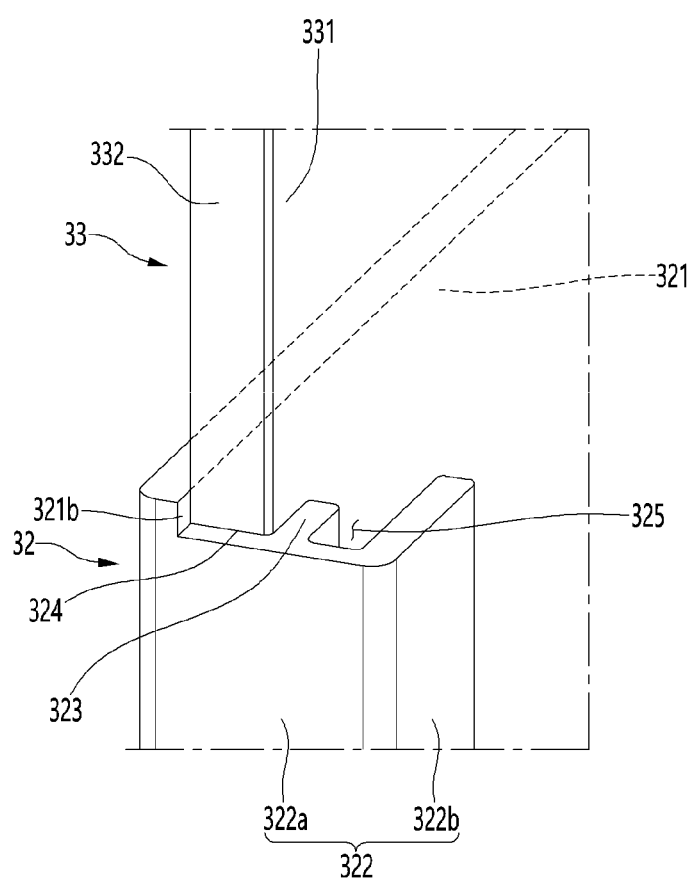
FIG. 16 is an enlarged view of a part "E" of FIG. 15.
Figure 17:
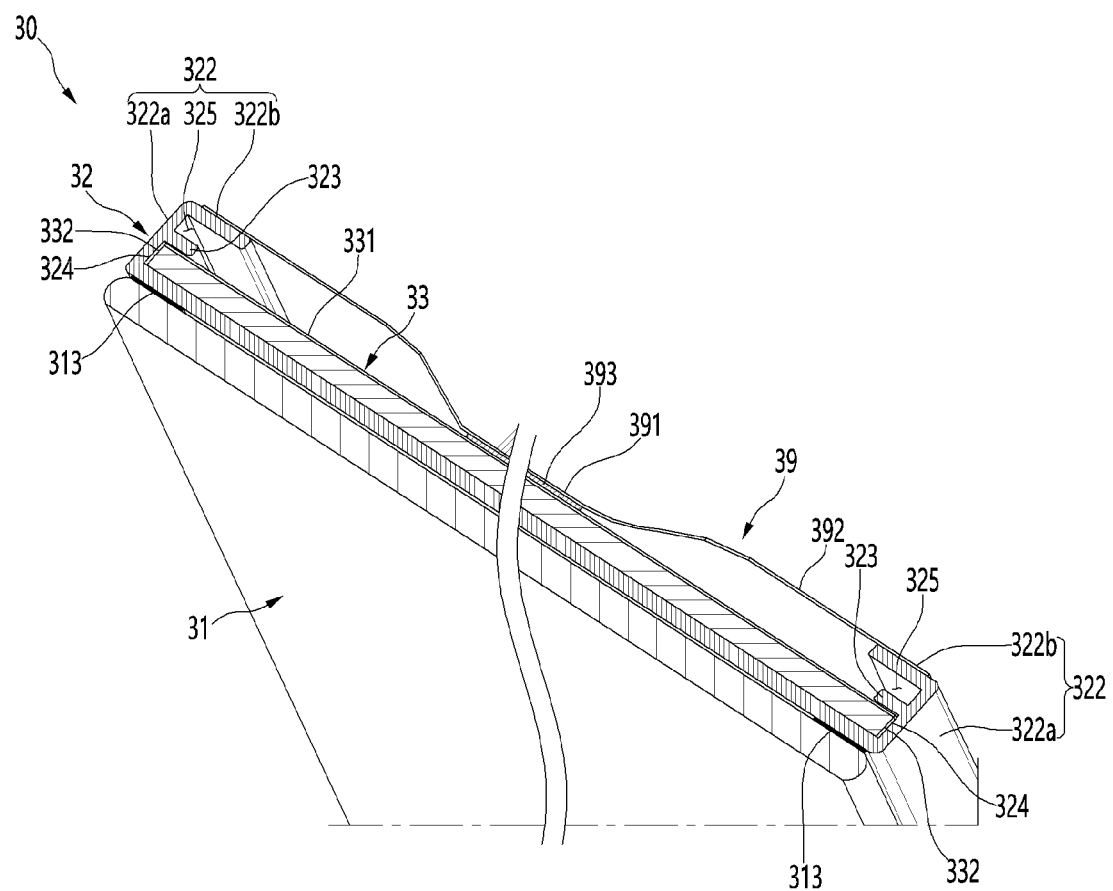
FIG. 17 is an exploded perspective view taken along XVII-XVII' of FIG. 3.
Figure 18:
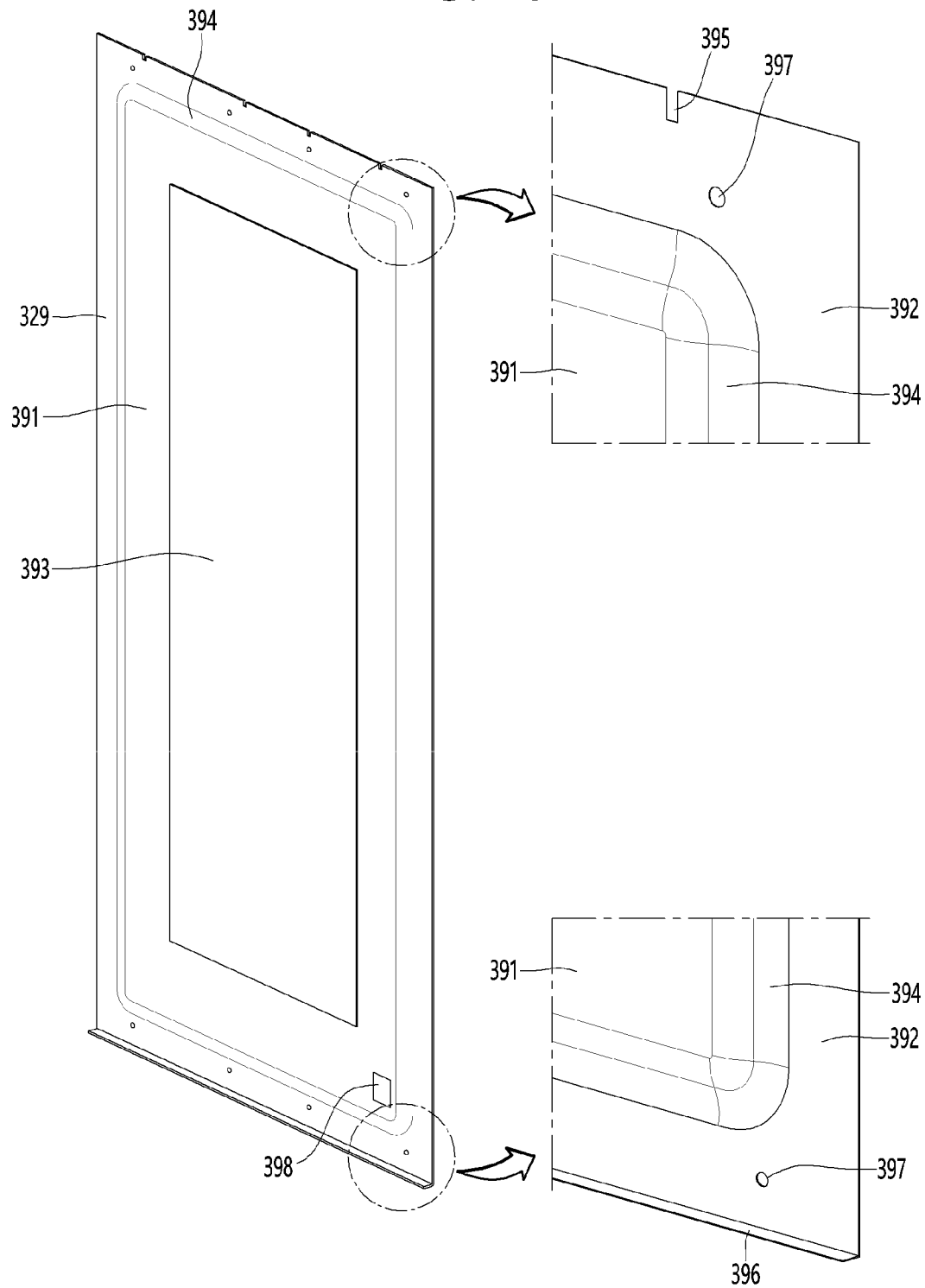
FIG. 18 is a perspective view of a back cover as one component of the panel assembly.

FIG. 15 is a diagram showing a coupling structure of the member, the panel, and the light guide plate. FIG. 16 is an enlarged view of a part "E" of FIG. 15. FIG. 17 is an exploded perspective view taken along XVII-XVII' of FIG. 3.

As shown in the drawings, the member 32 may be used to mount the panel 31 on the front part 321 and to mount the light guide plate 33 on the side part 322. That is, it may be possible to mount the panel 31 and the light guide plate 33 by a single component of the member 32. The panel 31 and the light guide plate 33 may be spaced apart in forward and rearward directions across the member 32 therebetween, and in this case, an interval between the panel 31 and the light guide plate may be maintained by as much as the thickness of the front part 321.

In detail, the member 32 may be formed of a light-transmissive material to transmit light reflected from the light guide plate 33 at the rear to the panel 31 in the front. The member 32 may be formed of a transparent or translucent material for transmitting light therethrough and may have color for transmitting light.

The member 32 may have the same cross-sectional structure in a vertical direction and thus may be simply molded by extrusion. Simultaneously, provided may be a structure for mounting the panel 31 and the light guide plate 33 using the front part 321 and the side part 322 that are formed by extrusion. Through the structure of the side part 322, even the upper bracket 34 and the lower bracket 35 may be mounted.

The front part 321 may have a size corresponding to the panel 31, and at least an upper end and a right and left side ends of the front part 321 may be formed in a plate shape corresponding to the right and left side ends of the panel 31. The adhesive member 313 for adhering the panel 31 to the front part 321 may be provided on a perimeter of a bottom surface of the panel 31. The adhesive member 313 may be formed along an entire perimeter of the panel 31, and the panel 31 may be firmly fixed to the front surface of the front part 321.

Thus, the front surface of the panel assembly 30 may be formed by the panel 31, and any structure for fixing the panel 31 and the light guide plate 33 may not be exposed. That is, the front surface of the panel assembly 30 may be formed by the panel 31, and the entire portion of the panel 31 may glow without a bezel or fixed structure to form an outer appearance of the entire front surface of the panel assembly 30 or the door 20.

The adhesive member 313 may be formed of a transparent or translucent material to transmit light reflected from the light guide plate 33 therethrough. For example, the adhesive member 313 may be formed by coating a transparent or translucent sealant and may be formed by an adhesive such as a transparent or translucent double-side tape.

The side part 322 may protrude rearward from the right and left side ends of the front part 321, and one pair of the side parts 322 may be opened to face each other. The side part 322 may be opened in a vertical direction, and the light guide plate 33 may be inserted into the side part 322 through an insertion space while being slidably moved in a vertical direction.

In this case, the insertion space of the light guide plate 33 may be formed between the rear surface of the front part 321 and the third extension. Thus, the light guide plate 33 may be inserted into the side part 322 in the state being in contact with the rear surface of the front part 321, and in the state in which the light guide plate 33 is in completely contact with the rear surface, the front surface of the light guide plate 33 may be in contact with the rear surface of the front part 321.

The reflective sheet 331 may be disposed on a rear surface of the light guide plate 33, and in the state in which the reflective member 332 is attached to the remaining perimeter surface except for a bottom surface, the light guide plate 33 may be inserted into the first space 324.

That is, both ends of the reflective sheet 331 may be accommodated inside the first space 324, and the reflective sheet 331 at right and left side surfaces of the light guide plate 33 may be accommodated therein. In particular, the reflective sheet 331 may prevent light from leaking the outside through the side part 322.

In the state in which the panel assembly 30 is assembled, the pattern part 333 of the light guide plate 33 and the edge reflector 331a of the reflective sheet 331 may be arranged at a position corresponding to a region in which the adhesive member 313 is disposed. That is, at least the adhesive member 313 may be positioned in an internal region of the pattern part 333 and/or the edge reflector 331a. Thus, light emitted forward through the light guide plate 33 may be transmitted more intensively to the adhesive member 313, and thus the panel 31 may glow with uniform brightness and color without shadow due to the adhesive member 313.

FIG. 16 is a perspective view of a back cover as one component of the panel assembly.

As shown in the drawing, the back cover 39 may be formed in a rectangular plate shape to form a rear surface of the panel assembly 30. The back cover 39 may be formed of a metal material such as steel or aluminum and may form the overall shape by a foaming process.

The back cover 39 may include the cover protrusion 391 that entirely protrudes forward, and the cover perimeter part 392 formed along a perimeter of the cover protrusion 391.

The cover protrusion 391 may form most of the area of the back cover 39 except for the cover perimeter part 392 and may protrude forward to support the light guide plate 33 from the rear. In this case, a protruding front surface of the cover protrusion 391 may be formed in a flat shape with a uniform height to support most of the area of the light guide plate 33. The cover protrusion 391 may protrude when the back cover 39 is molded and may be formed to be recessed forward viewed from the rear.

Thus, in the state in which the panel assembly 30 is mounted on the door body 40, a space may be formed between a rear surface of the panel assembly 30 and a front surface of the door body 40. That is, when heat generated during an operation of the lighting device 36 conducted along the rear surface of the panel assembly 30, i.e., the back cover 39 is transferred through the back cover 39, a space for heat dissipation through the rear surface of the panel assembly 30 may be formed.

A buffer member 393 may be further provided on the cover protrusion 391. The buffer member 393 may be formed of an elastically deformable material and may be formed in the form of a sheet to be attached to the cover protrusion 391. For example, the buffer member 393 may be formed of an expandable material or a foaming material and may be in close contact with the light guide plate 33 to support the light guide plate 33.

Even if impact is applied in a process in which the door 20 is opened and opened, the buffer member 393 may prevent the light guide plate 33 from shaking and alleviate impact transferred to the light guide plate 33 to protect the light guide plate 33. Even when the light guide plate 33 is deformed while being compressed or expanded by heat, a space in which the light guide plate 33 is deformable may be provided.

A wire entrance 398 through which the wire 381 connected to the lighting device 36 enters and exits may be formed at one corner of the cover protrusion 391.

The cover perimeter part 392 may be formed along the perimeter of the cover protrusion 391. The cover perimeter part 392 may form a perimeter surface of the back cover 39, that is, upper and lower ends and right and left side ends of the back cover 39.

A width of the cover perimeter part 392 may be formed to be longer than at least a width of the third extension 322b and lengths of the upper bracket front part 341 and the lower bracket front part 351. Thus, right and left side ends of the cover perimeter part 392 may be supported by the third extension 322b of the member 32, and the upper end and the lower end may be coupled to the upper bracket 34 and the lower bracket 35, respectively.

The cover perimeter part 392 and the cover protrusion 391 may be conned to each other by a cover connector 394. The cover connector 394 may be inclined or rounded in a forward direction from the cover perimeter part 392 toward the cover protrusion 391. Load applied to the cover protrusion 391 may be distributed by the cover connector 394.

A cover screw hole 397 may be formed in upper and lower ends of the cover perimeter part 392. The cover screw holes 397 may be coupled to fasten the screws 399 for mounting the back cover 39, and the plurality of cover screw holes 397 may formed at a predetermined interval along the upper and lower ends of the cover perimeter part 392. The cover screw holes 397 may be formed at positions corresponding to bracket screw holes 346 and 356 formed in the upper bracket 34 and the lower bracket 35.

A protrusion opening 395 may be formed on an upper end of the cover perimeter part 392, that is, an upper end of the back cover 39. The protrusion opening 395 may be formed to cause a mounting protrusion 343 protruding on the upper bracket 34 to pass therethrough in order to mount the panel assembly 30. The protrusion opening may be formed to be recessed downward from the upper end of the back cover 39 and may be cut to cause the mounting protrusion 343 to pass therethrough. The protrusion openings 395 may be formed with the number corresponding to the positions of the mounting protrusions 343, and the plurality of protrusion openings 395 may be arranged at a predetermined interval along the upper end of the back cover 39.

A cover bent part 396 may be formed on a lower end of the cover perimeter part 392, that is, a lower end of the back cover 39. The cover bent part 396 may be inserted into the lower cap deco 45 and may be in contact with a right supporter 37 that supports the lighting device 36. Heat of the lighting device 36 transferred through the right supporter 37 may be transferred to the entire of the back cover 39.

The cover bent part 396 may extend forward vertically from the lower end of the cover perimeter part 392 and may extend from a left side end of the back cover 39 to a right side end thereof. The cover bent part 396 may extend with an extension length to be in contact with a lower surface of the right supporter 37.

Figure 19:
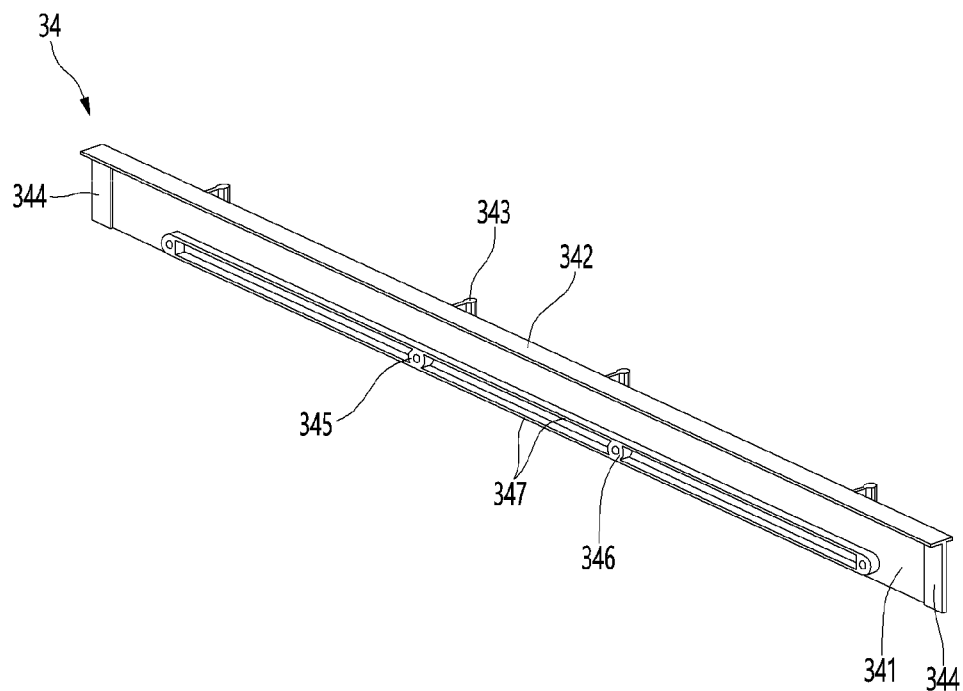
FIG. 19 is a perspective view of an upper bracket as one component of the panel assembly viewed from the front.
Figure 20:
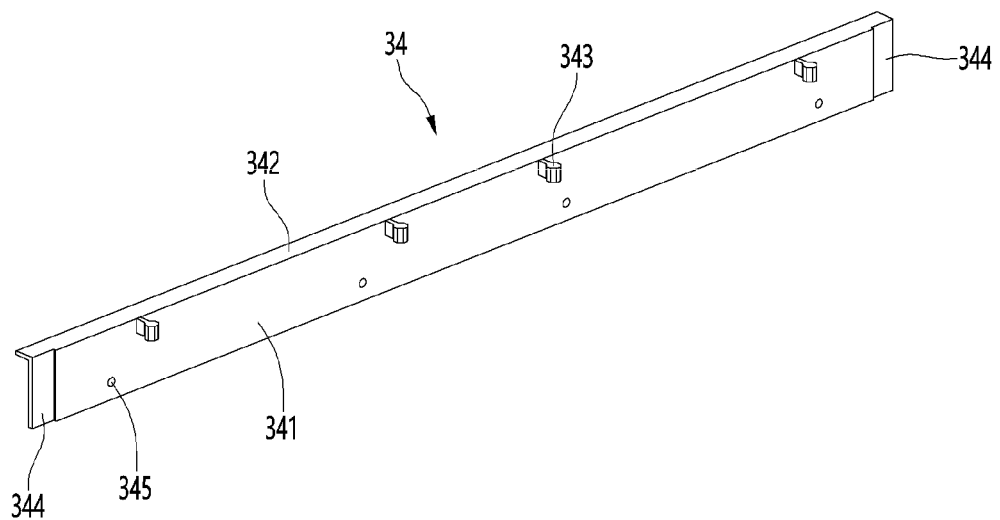
FIG. 20 is a perspective view of the upper bracket viewed from the rear.
Figure 21:
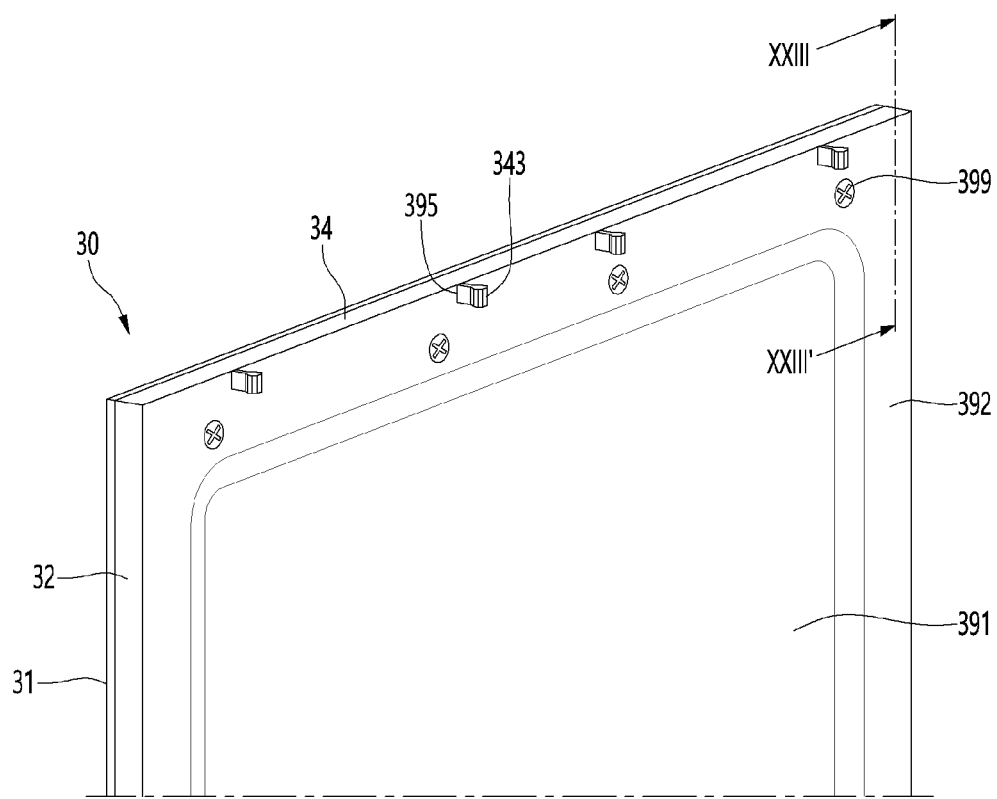
FIG. 21 is a partial enlarged view showing a shape of an upper part of a panel assembly in the state in which the upper bracket is coupled to the panel assembly.
Figure 22:
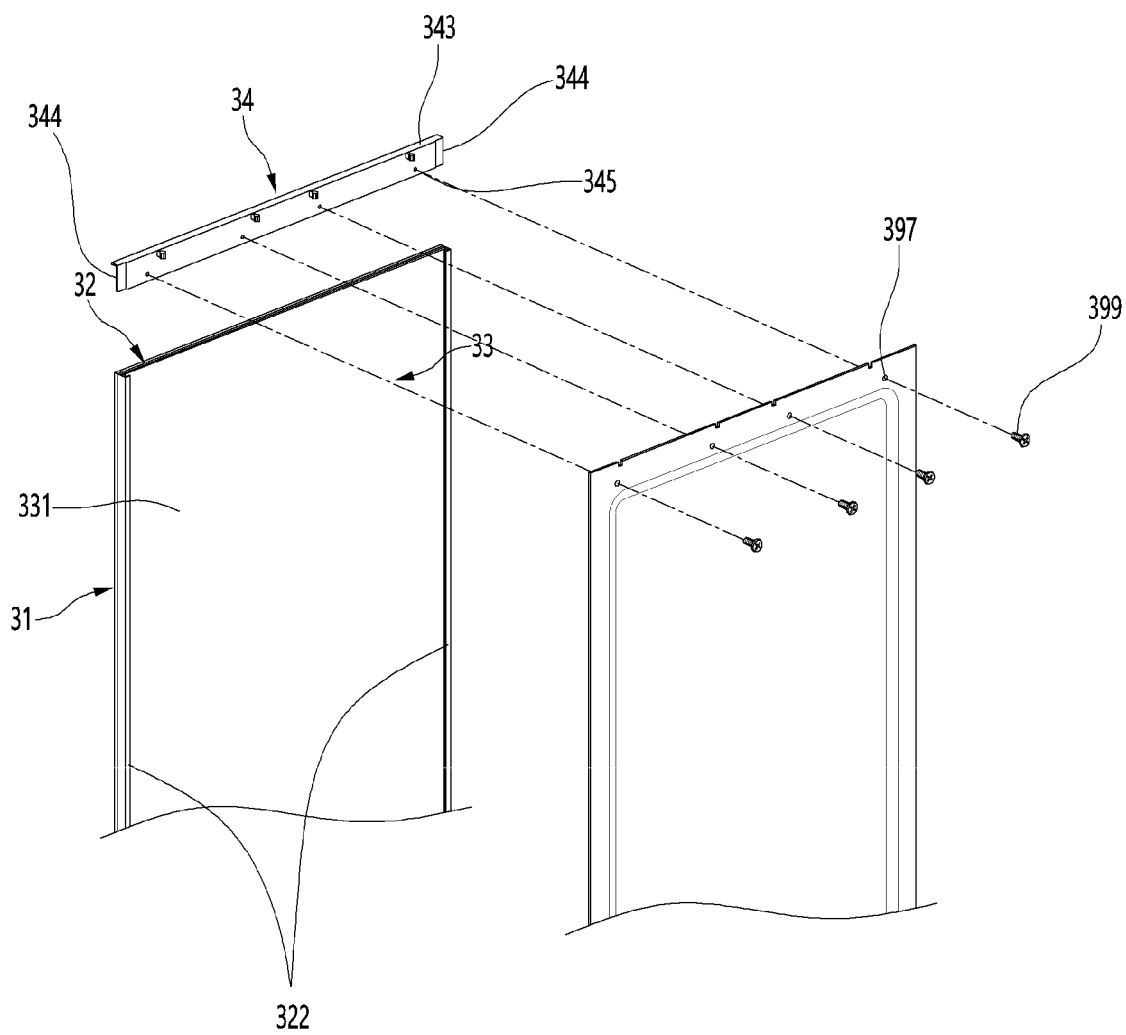
FIG. 22 is an exploded perspective view showing a coupling structure of the member, an upper bracket, and a back cover.
Figure 23:
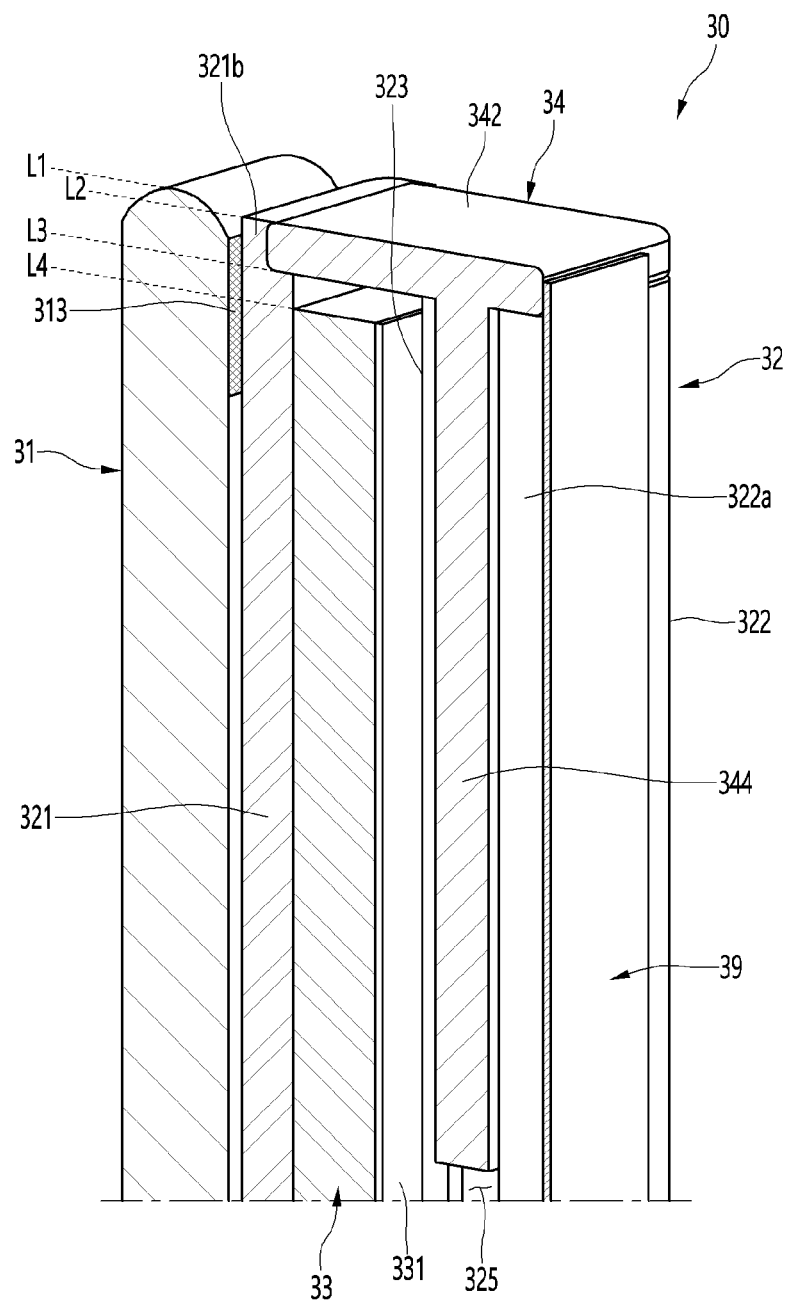
FIG. 23 is an exploded perspective view taken along XXIII-XXIII' of FIG. 21.
Figure 24:
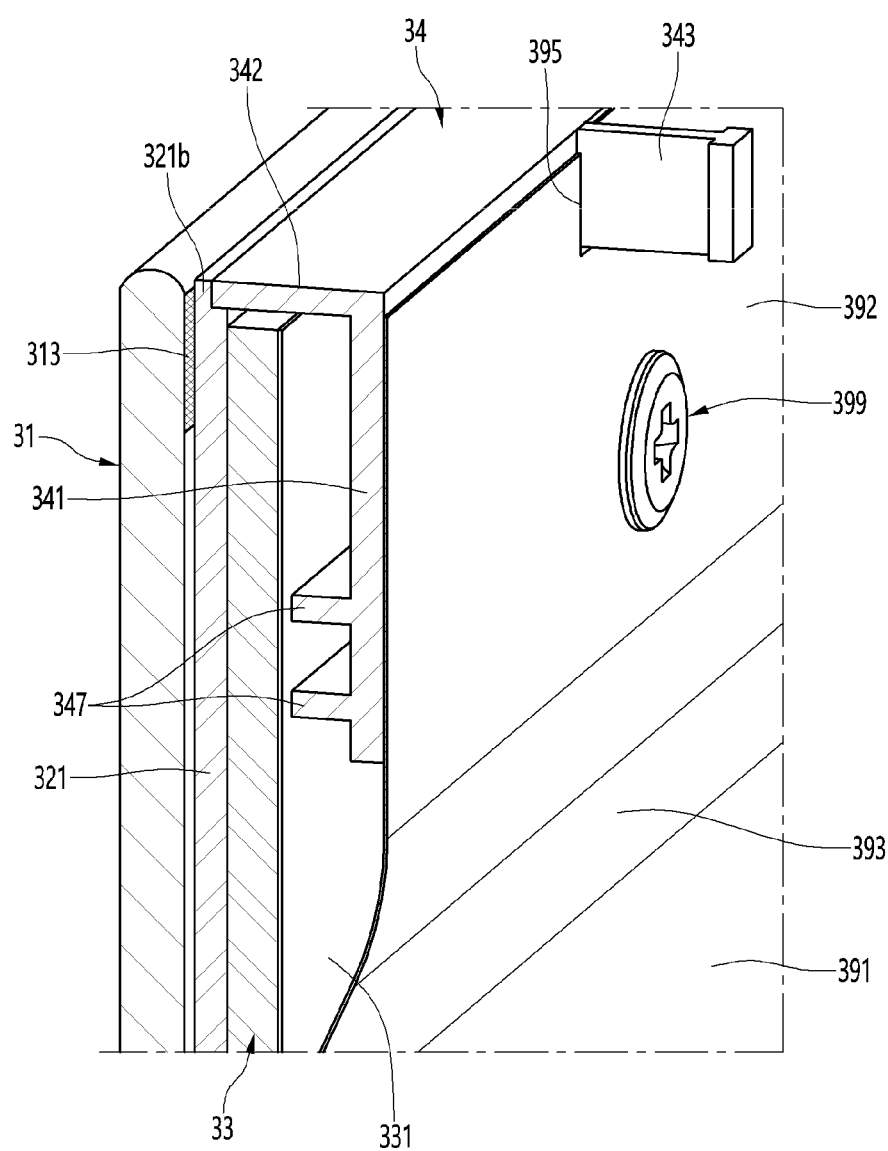
FIG. 24 is an exploded perspective view taken along XXIV-XXIV' of FIG. 3.
Figure 25:
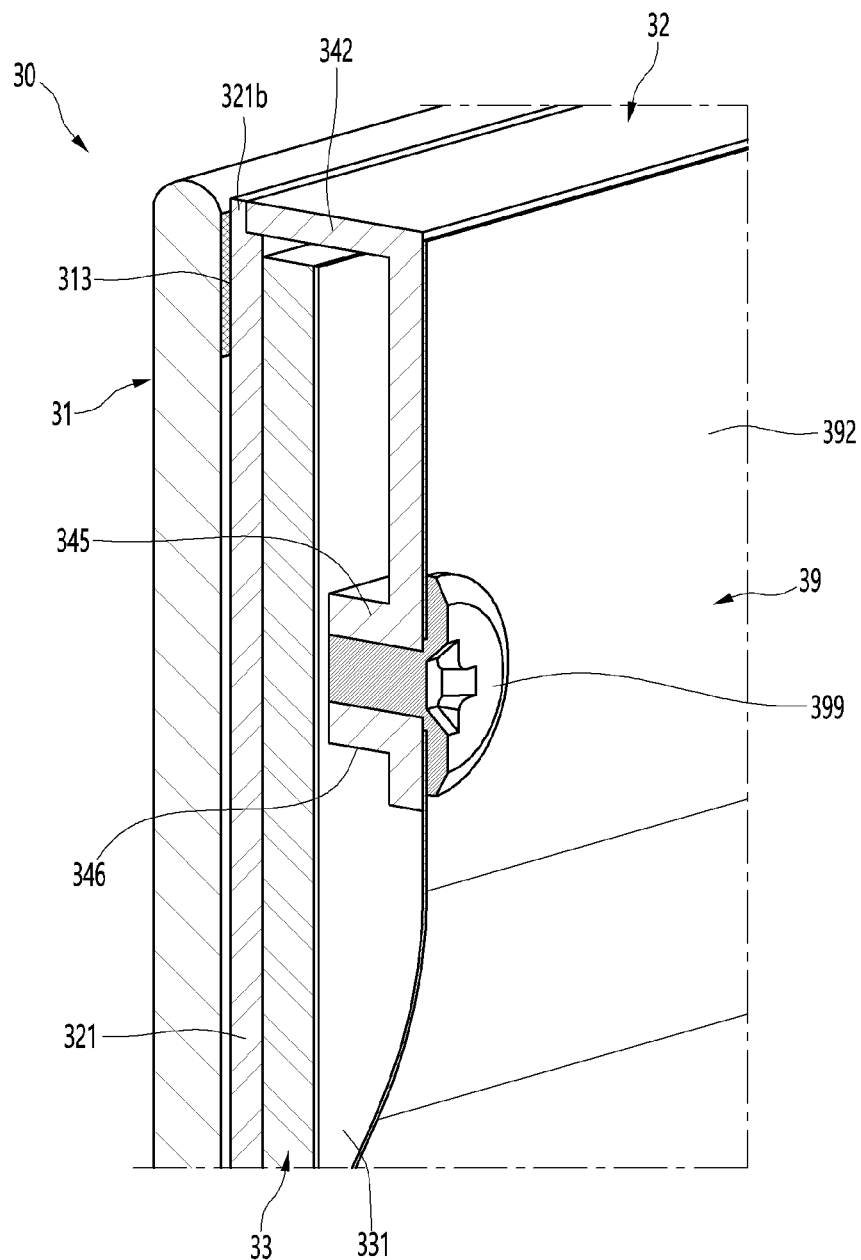
FIG. 25 is an exploded perspective view taken along XXV-XXV' of FIG. 4.
Figure 26:
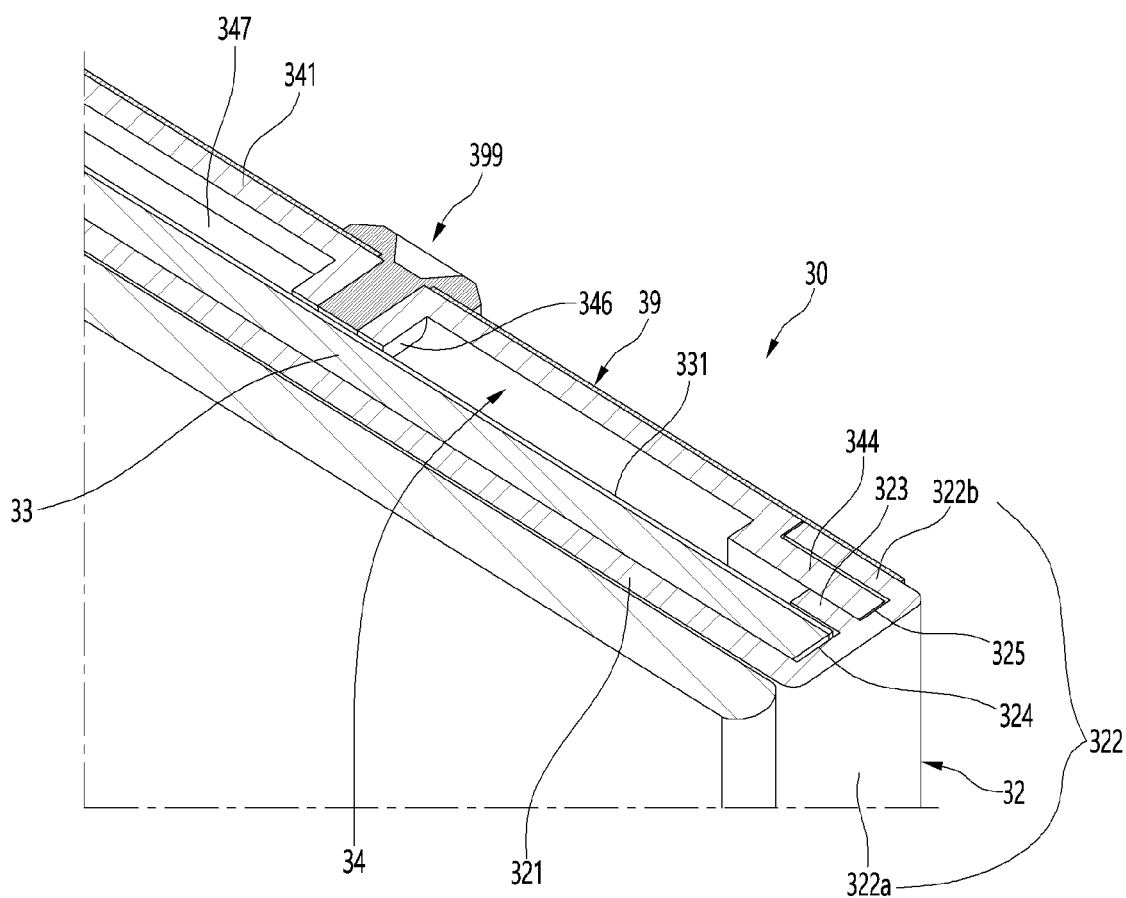
FIG. 26 is an exploded perspective view taken along XXVI-XXVI' of FIG. 3.

FIG. 19 is a perspective view of an upper bracket as one component of the panel assembly viewed from the front. FIG. 20 is a perspective view of the upper bracket viewed from the rear. FIG. 21 is a partial enlarged view showing a shape of an upper part of a panel assembly in the state in which the upper bracket is coupled to the panel assembly. FIG. 22 is an exploded perspective view showing a coupling structure of the member, an upper bracket, and a back cover. FIG. 23 is a perspective view taken along XXIII-XXIII' of FIG. 21. FIG. 24 is an exploded perspective view taken along XXIV-XXIV' of FIG. 3. FIG. 25 is an exploded perspective view taken along XXV-XXV' of FIG. 4. FIG. 26 is an exploded perspective view taken along XXVI-XXVI' of FIG. 3.

As shown in the drawings, the upper bracket 34 may have a length corresponding to the right and left direction length of the panel assembly 30. The upper bracket 34 may broadly include the upper bracket front part 341 and an upper bracket upper part 342.

The upper bracket front part 341 may be formed with a shape corresponding to the front surface of the upper bracket 34 and may be formed in parallel to the panel 31 and the light guide plate 33 to extend vertically.

An upper side part 344 stepped forward may be formed on right and left side ends of the upper bracket front part 341. The upper side part 344 may be stepped with a front part of the upper bracket and may be positioned at the front based on the upper bracket front part 341.

The upper side part 344 may be formed with a thickness corresponding to the width of the second space 325 and may be slidably inserted downward from an upper part of the second space 325.

The mounting protrusion 343 protruding rearward may be formed on the rear surface of the upper bracket front part 341. The mounting protrusion 343 may be used to mount the panel assembly 30 and may protrude by a predetermined length on the upper bracket front part 341 to be coupled to a protrusion mount 431 of the upper cap deco 43.

The plurality of mounting protrusions 343 may be formed at a predetermined interval along the upper bracket 34 and may be formed at positions corresponding to the protrusion openings 395. The mounting protrusion 343 may protrude from an upper end of the rear surface of the upper bracket front part 341. Thus, when the back cover 39 is mounted, the mounting protrusion 343 may protrude through the protrusion opening 395 of the back cover 39.

A plurality of upper bracket bosses 346 may be formed on the front surface of the upper bracket front part 341. The upper bracket boss 346 may be used to couple the screws 399 and may have an upper bracket screw hole 345 formed in a central part thereof, to which the screws 399 is coupled. The upper bracket screw hole 345 may be formed through the upper bracket front part 341 and may be formed at a position corresponding to the cover screw hole 397. Thus, when the back cover 39 is mounted, the screws 399 may be coupled to sequentially pass through the cover screw hole 397 and the upper bracket screw hole 345.

The upper bracket boss 346 may protrude forward and may protrude to a position that is in contact with the rear surface of the light guide plate 33. Thus, when the upper bracket 34 is mounted, a protruding end of the upper bracket boss 346 may support the light guide plate 33 from the rear. That is, when the panel assembly 30 is assembled, the upper bracket 34 may support the upper end of the light guide plate 33 from the rear.

Support ribs 347 for connecting the plurality of upper bracket bosses 346 may be formed on the front surface of the upper bracket front part 341. One pair of the support ribs 347 may be disposed vertically, and the plurality of upper bracket bosses 346 may be positioned between one pair of the support ribs 347.

In detail, the support rib 347 at an upper part among one pair of the support ribs 347 may extend to connect upper ends of the plurality of upper bracket bosses 346, and the support rib 347 at a lower part among one pair of the support ribs 347 may extend to connect lower ends of the plurality of upper bracket bosses 346.

The support ribs 347 may protrude with the same height as a protruding height of the upper bracket boss 346. Thus, when the panel assembly 30 is assembled, the support ribs 347 may support the light guide plate 33 from the rear with the upper bracket boss 346.

The upper bracket upper part 342 may be formed on the upper end of the upper bracket front part 341. The upper bracket upper part 342 may extend in a direction perpendicular to the upper bracket front part 341.

In detail, the upper bracket upper part 342 may extend forward on the upper end of the upper bracket front part 341. The front end of the upper bracket upper part 342 may extend to be in contact with the front part 321 of the member 32. The right and left side ends of the upper bracket upper part 342 may be accommodated on the stepped upper end of the side part 322 of the member 32.

Thus, the upper bracket 34 may be fixedly coupled to the upper end of the member 32 and may be fixed to the back cover 39 by the screws 399 to restrain upward movement of the light guide plate 33 and may form a shape of an upper surface of the panel assembly 30.

As shown in FIG. 20, in the state in which the upper bracket 34 is mounted, the upper end of the upper bracket 34 may be positioned at the same height L2 as the upper end of the member 32. In this case, upper ends of the upper bracket 34 and the member 32 may be formed lower than a height L1 of the upper end of the panel 31. When viewed from the front of the refrigerator 1, components behind the panel 31 may not protrude toward the upper end of the panel 31 and an front appearance may be formed by the panel 31. That is, an outer appearance of the entire front surface of the door 20 may be formed by color represented by the panel 31.

In the state in which the upper bracket upper part 342 is accommodated on the upper end of the side part 322 of the member 32, an upper surface of the upper bracket 34 may have the same height L2 as the upper end of the member 32. Thus, the height L3 of the upper end of the side part 322 may be formed lower than the height L2 of the upper end of the member 32. In this case, a difference between a height L3 of the upper end of the side part 322 and the height L2 of the upper end of the member 32 may correspond to the thickness of the upper bracket upper part 342.

A height L4 of the upper end of the light guide plate 33 may lower than the upper bracket upper part 342. The light guide plate 33 may be disposed below the upper bracket upper part 342 to be spaced apart from the upper part 342 and may be formed to have a set gap G1 with the light guide plate 33 not to be interfered with the light guide plate 33 when the light guide plate 33 extends. Thus, the height L4 of the upper end of the light guide plate 33 may be lower than the height L3 of the upper bracket upper part 342 and the side part 322.

The upper bracket 34 may be inserted downward from an upper part through an open upper surface of the bracket insertion space 325. In this case, the upper bracket front part 341 may be positioned inside the member 32 and may be positioned between the side parts 322 at both left and right sides. In particular, both left and right ends of the upper bracket front part 341, that is, the upper side parts 344 may be inserted into the bracket insertion space 325 to fixedly mount the upper bracket 34 to the upper end of the member 32.

In the state in which the upper side part 344 is fully inserted into the bracket insertion space 325, the upper bracket upper part 342 may be accommodated on the upper end of the side part 322. The front end of the upper bracket upper part 342 may be hidden by the upper end protrusion 321b protruding upward from the upper end of the front part 321.

Because the upper side part 344 is inserted into the bracket insertion space 325 positioned behind the light guide plate 33, no shading may be generated on the panel 31 when light is reflected by the light guide plate 33. That is, the upper bracket 34 may not be exposed out of the panel 31 in the state of being fixedly mounted on the member 32 and may not block light reflected by the light guide plate 33.

When the upper bracket 34 is inserted, the upper support 347 protruding on the front surface of the upper bracket front part 341 may support an upper end of a rear surface of the light guide plate 33 or an upper part close to the upper end.

The upper support 347 may be formed to connect the plurality of upper bracket bosses 346, and thus may entirely support the upper end of the light guide plate 33. In particular, the upper support 347 may be formed as a pair of ribs spaced apart up and down to more stably support the light guide plate 33 from the rear. The upper support 347 may connect the plurality of upper bracket bosses 346 to reinforce the strength of the upper bracket 34.

The upper bracket boss 346 may protrude at the same height as the upper support 347, and thus the upper bracket boss 346 may support the upper end of the light guide plate 33 from the rear with the upper support 347. As such, the upper part of the light guide plate 33 may be supported only by the structure in which the upper bracket 34 is inserted into the member 32.

The screw 399 passing through the upper end of the back cover 39 may be coupled to the upper bracket boss 346 to firmly fix the upper bracket 34. The upper bracket 34 may be inserted into the member 32 to be primarily fixed thereto, and may be connected to the lower bracket 35 by the back cover 39 to be secondarily fixed thereto by the screw 399.

The upper bracket 34 may be maintained to be firmly mounted, and thus it may be ensured to maintain the state in which the upper part of the light guide plate 33 is supported by the upper bracket 34, in more detail, the upper support 347. Thus, in a process in which the door 20 is repeatedly opened and closed or the light guide plate 33 contracts and expands due to heat, the light guide plate 33 may also be maintained at a mounting position and in a state of being aligned with the light source 362.

Figure 27:
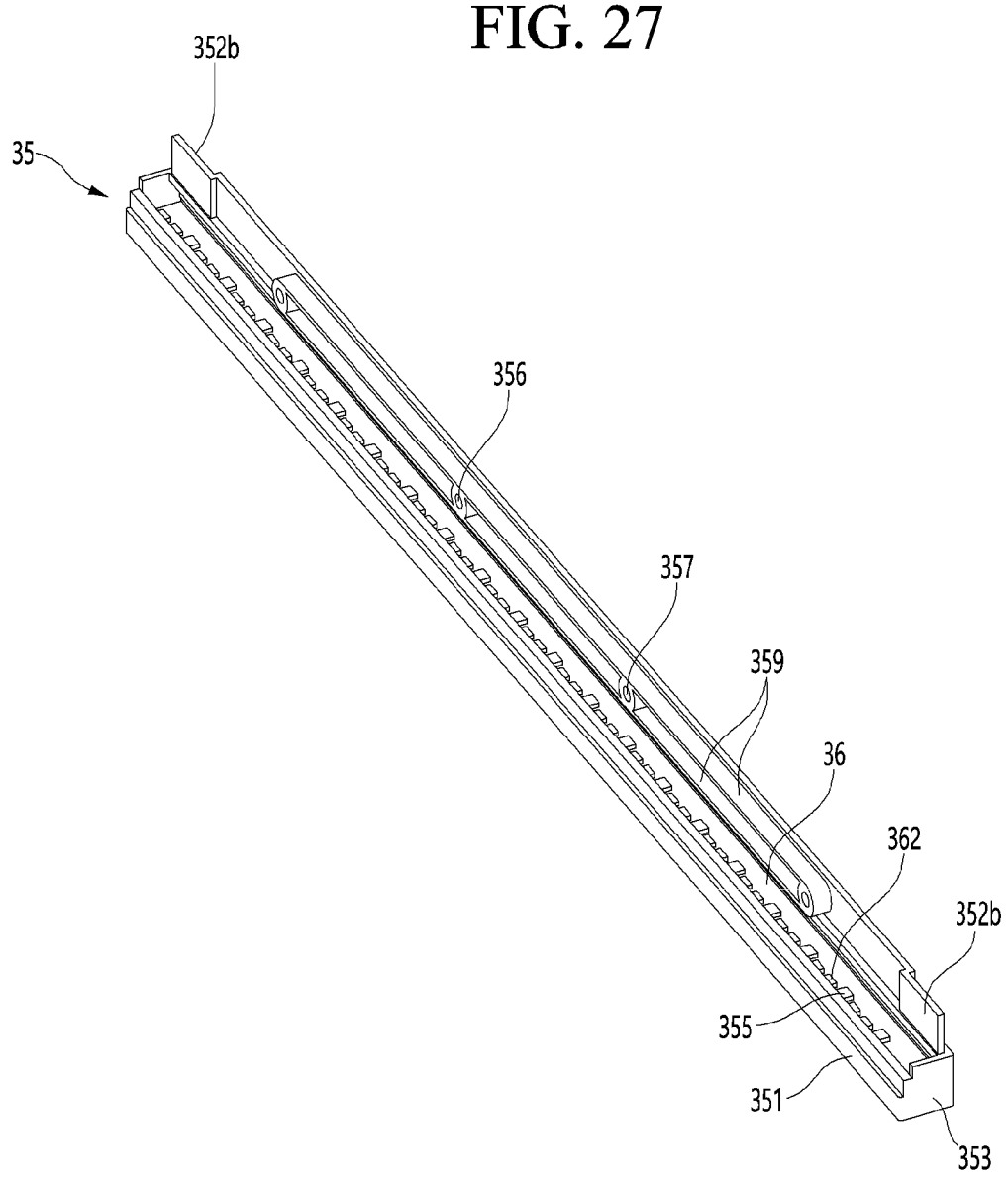
FIG. 27 is a perspective view in which a lower bracket, a lighting device, and a right supporter as components of panel assembly are coupled.
Figure 28:
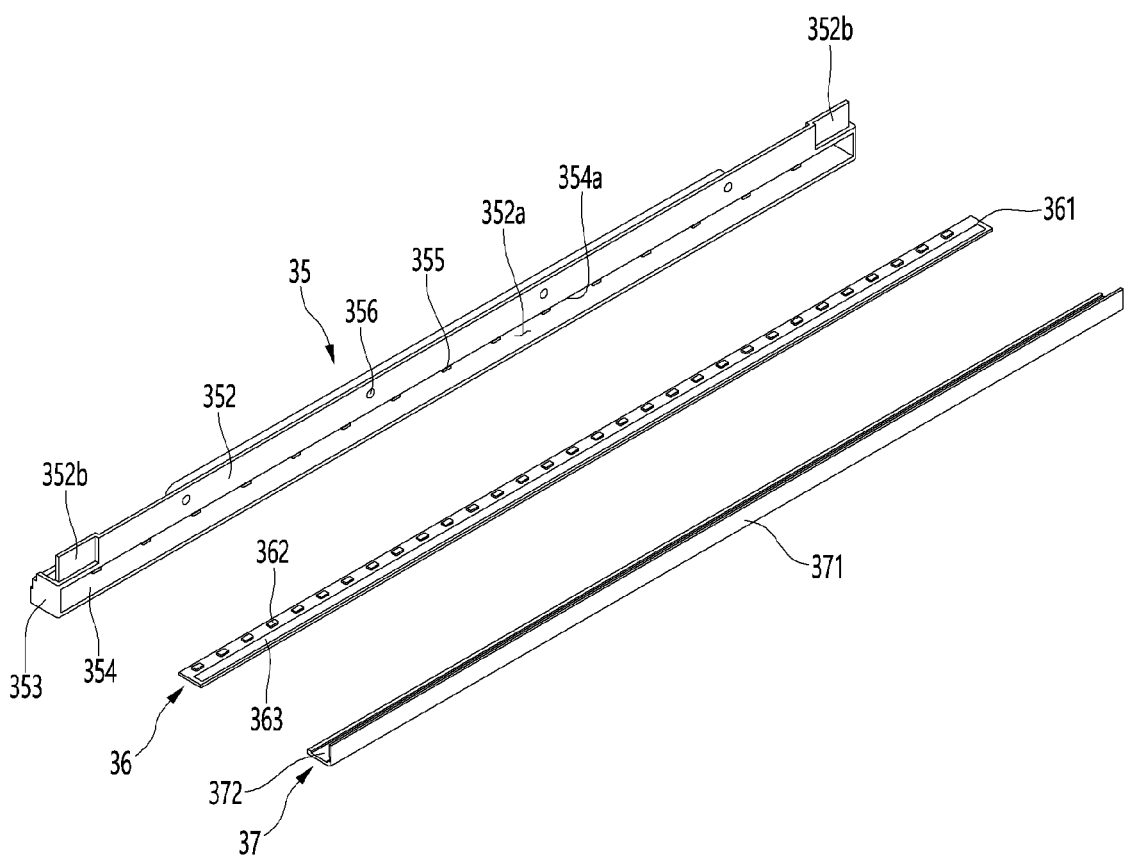
FIG. 28 is an exploded perspective view showing a coupling structure of the lower bracket, the lighting device, and the right supporter viewed from the rear.
Figure 29:
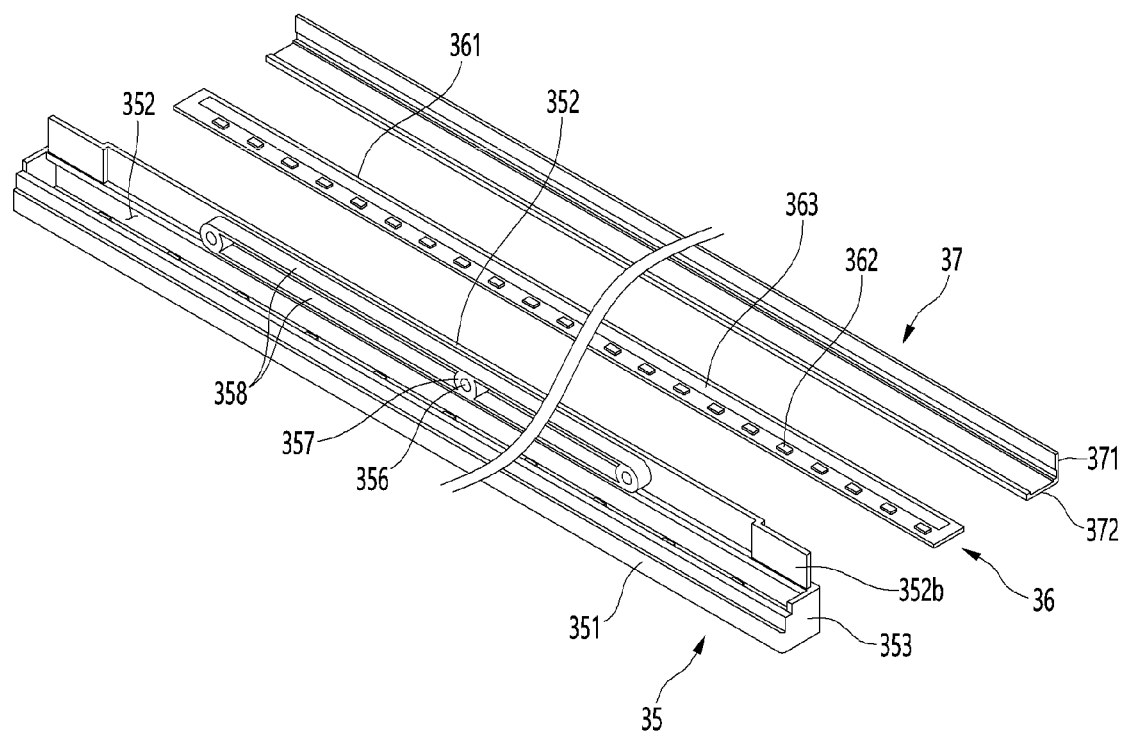
FIG. 29 is an exploded perspective view showing a coupling structure of the lower bracket, the lighting device, and the right supporter from the front.
Figure 30:
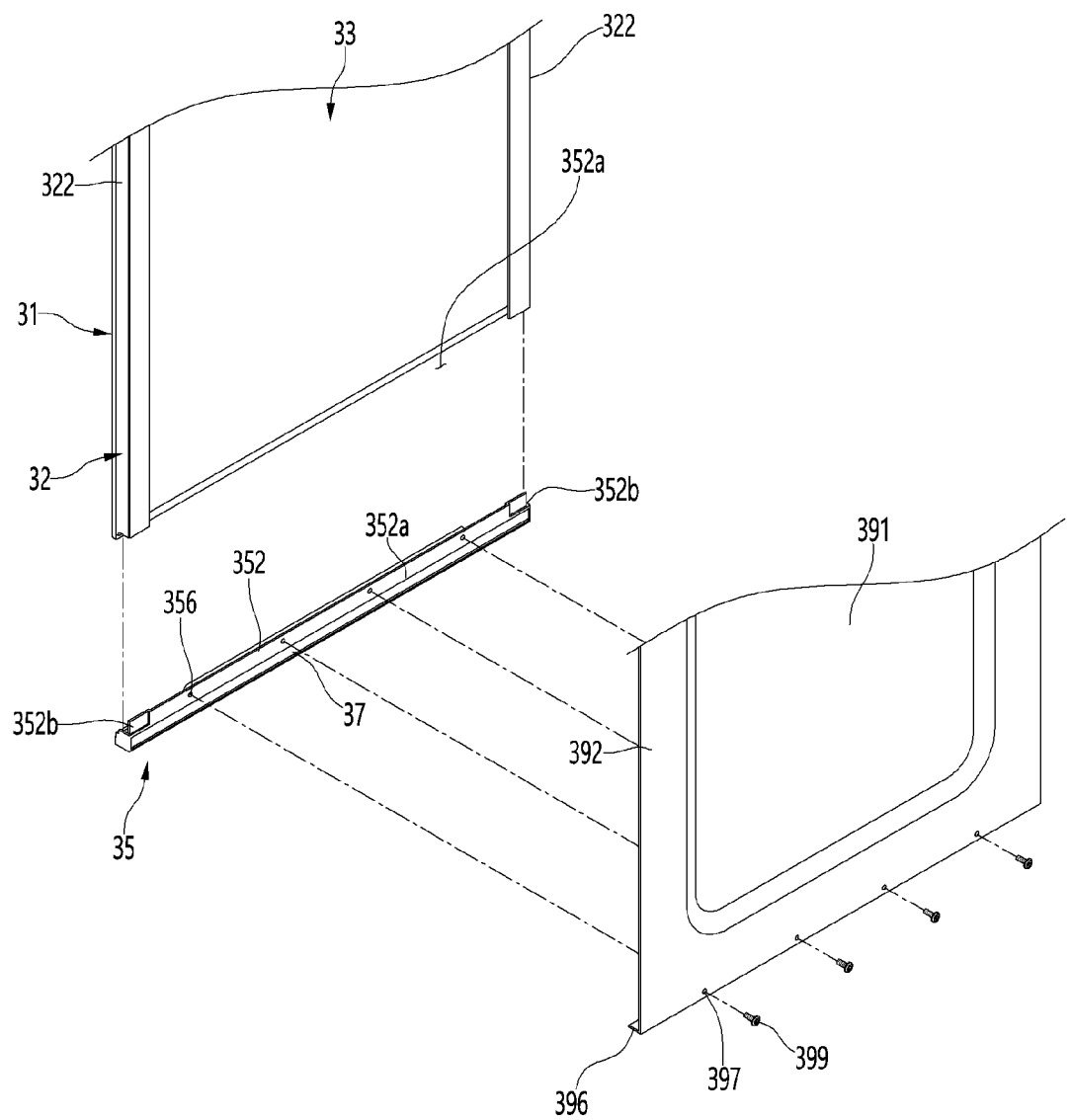
FIG. 30 is a partial exploded perspective view showing a coupling structure of the member, a lower bracket, and a back cover.
Figure 31:
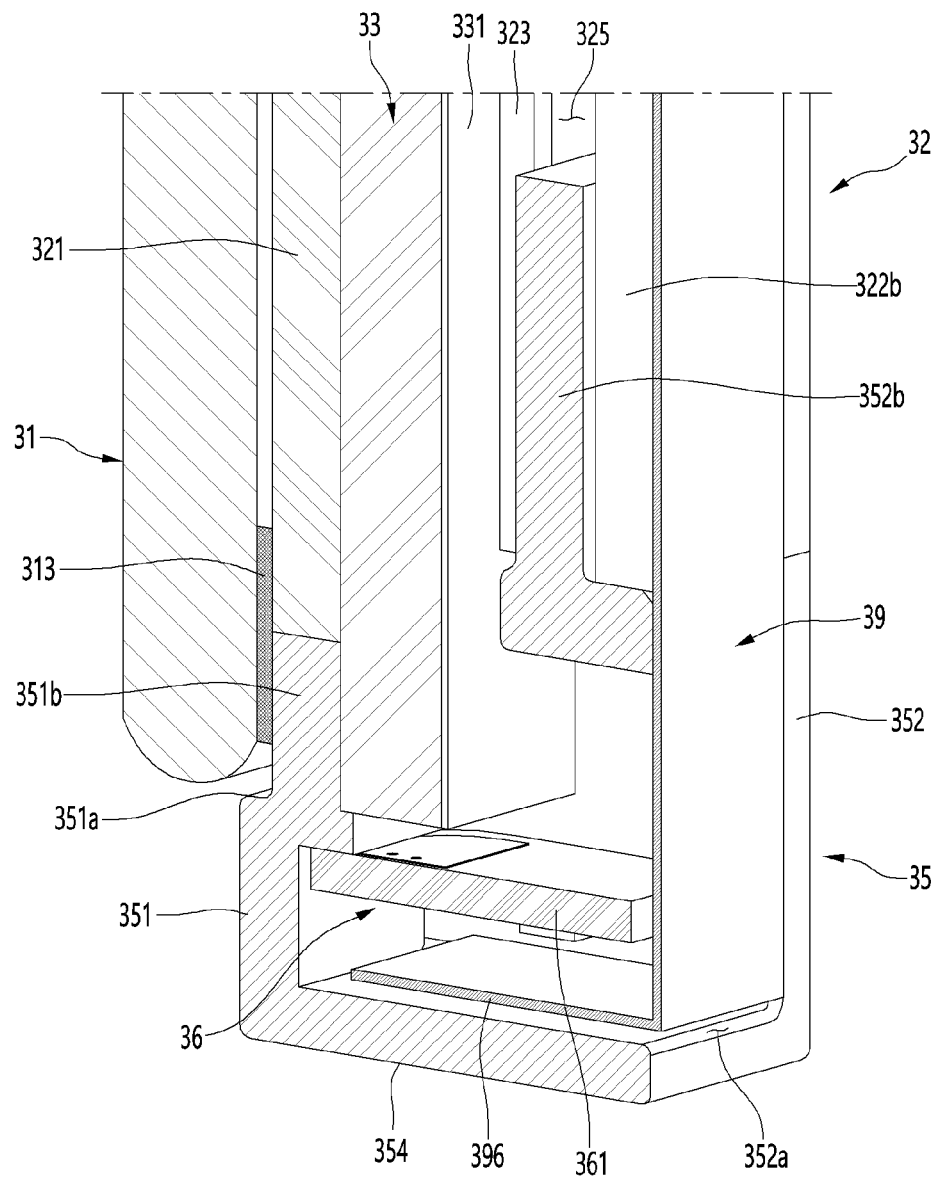
FIG. 31 is an exploded perspective view taken along XXXI-XXXI' of FIG. 3.
Figure 32:
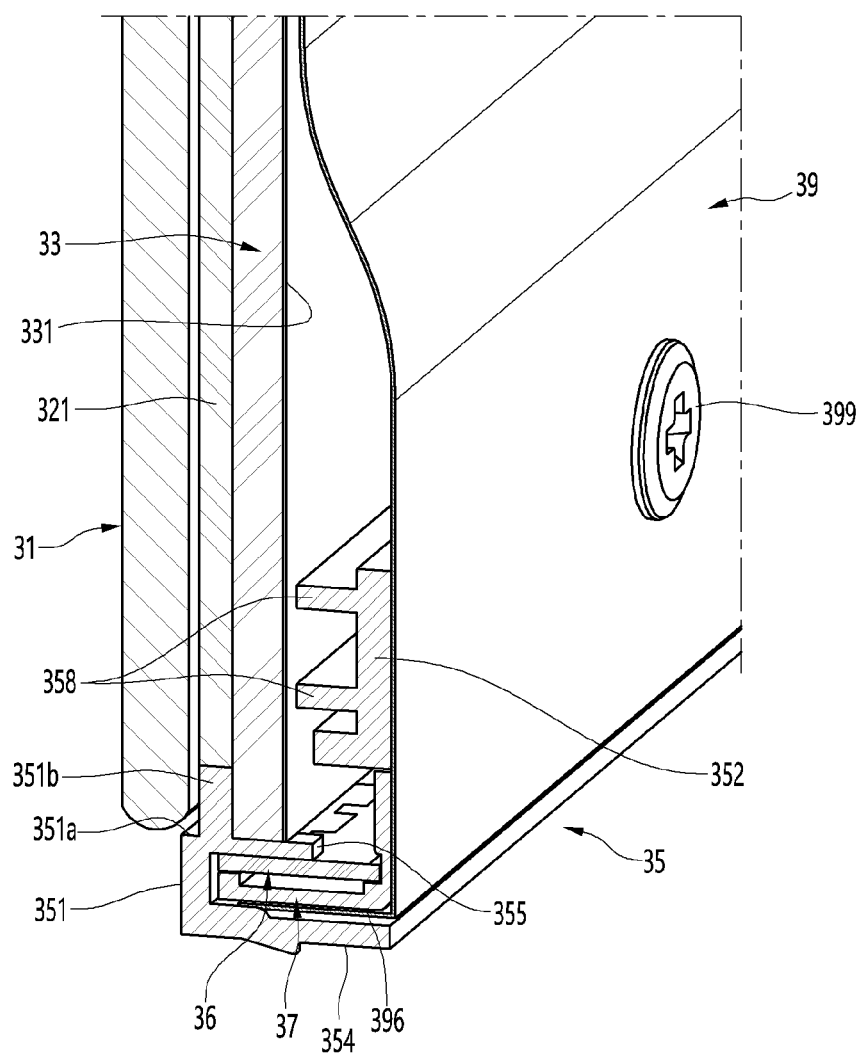
FIG. 32 is an exploded perspective view taken along XXXII-XXXII' of FIG. 4.
Figure 33:
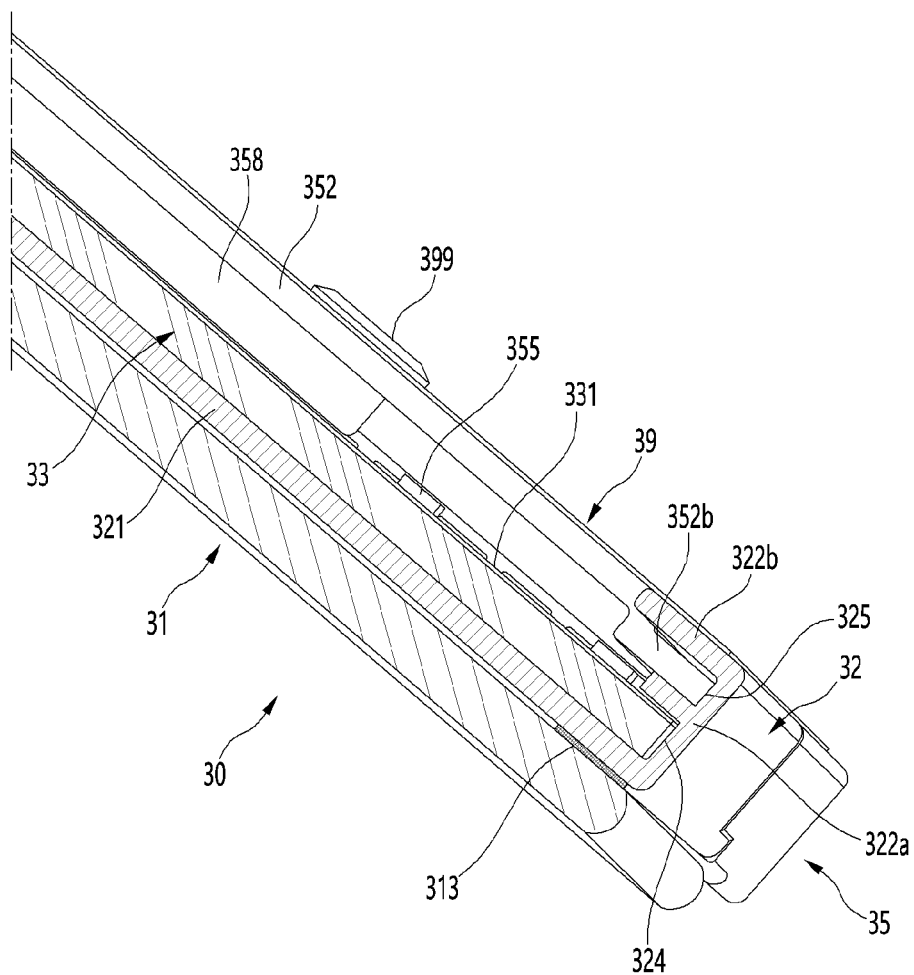
FIG. 33 is an exploded perspective view taken along XXXIII-XXXIII' of FIG. 3.
Figure 34:
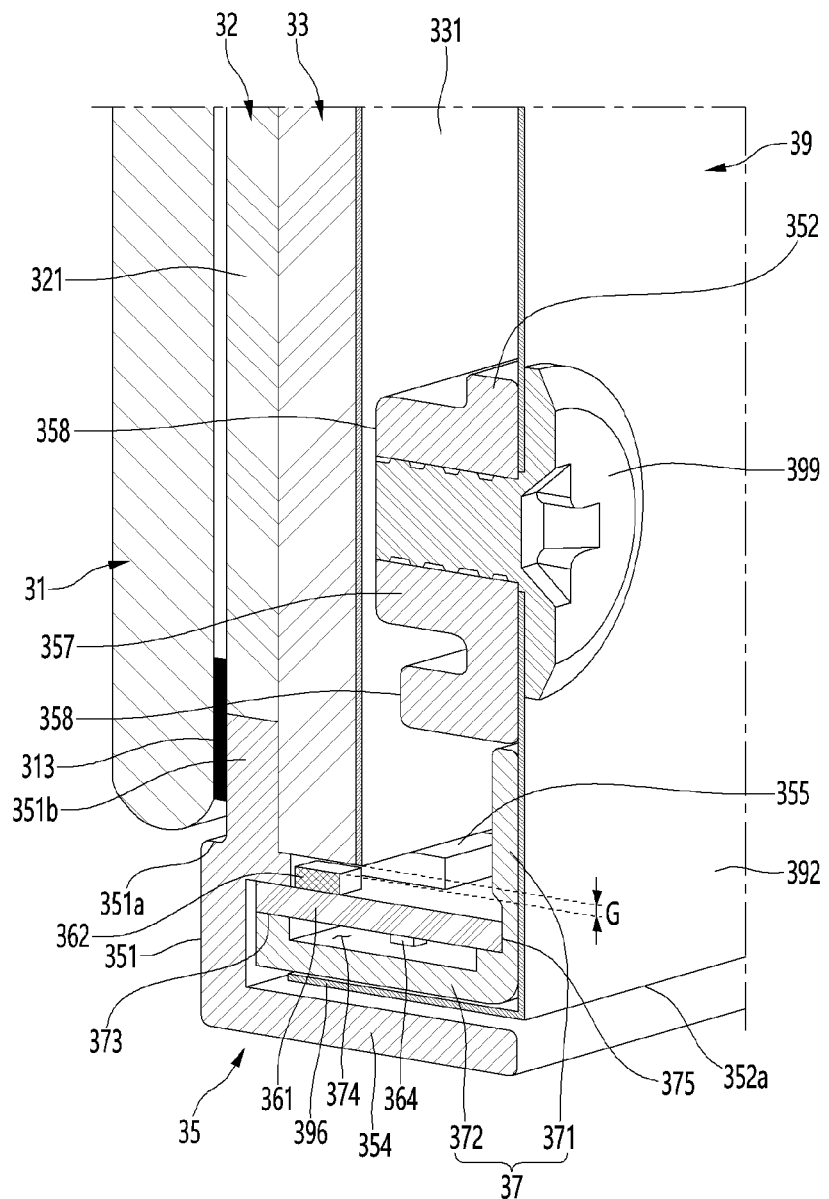
FIG. 34 is a perspective view taken along XXXIV-XXXIV' of FIG. 4.
Figure 35:
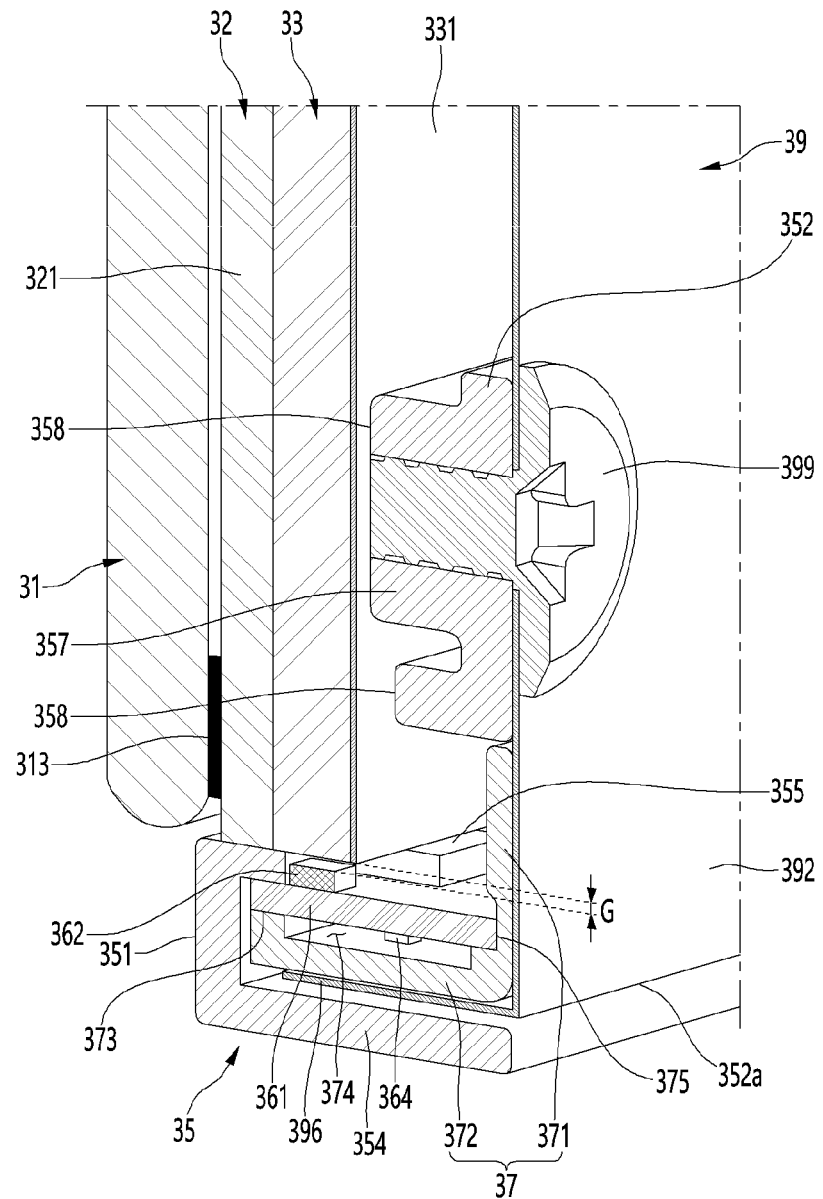
FIG. 35 is an exploded perspective view showing another example of the lower bracket.

FIG. 27 is a perspective view in which a lower bracket, a lighting device, and a right supporter as components of panel assembly are coupled. FIG. 28 is an exploded perspective view showing a coupling structure of the lower bracket, the lighting device, and the right supporter viewed from the rear. FIG. 29 is an exploded perspective view showing a coupling structure of the lower bracket, the lighting device, and the right supporter from the front. FIG. 30 is a partial exploded perspective view showing a coupling structure of the member, a lower bracket, and a back cover. FIG. 31 is an exploded perspective view taken along XXXI-XXXI' of FIG. 3. FIG. 32 is an exploded perspective view taken along XXXII-XXXII' of FIG. 4. FIG. 33 is an exploded perspective view taken along XXXIII-XXXIII' of FIG. 3. FIG. 34 is a perspective view taken along XXXIV-XXXIV' of FIG. 4.

As shown in the drawings, the lower bracket 35 may have a corresponding to the right and left direction length of the panel assembly 30. The lower bracket 35 may broadly include the lower bracket front part 351, a lower bracket rear part 352, a lower bracket side part 353, and a lower bracket lower part 354.

The lower bracket front part 351 form a shape of the front surface of the lower bracket 35 and may support the panel 31. A portion of the lower bracket front part 351 may protrude below the panel 31 and may be inserted into the lower end of the door body 40, that is, the lower cap deco 45 to fix the lower bracket 35.

The lower bracket front part 351 may include a bracket stepped part. The bracket stepped part may include a first stepped part 351a for supporting a lower end of the panel 31 and a second stepped part 351b for supporting the panel 31 from the rear.

The first stepped part 351a may be stepped rearward on the front surface of the lower bracket front part 351, and the second stepped part 351b may extend upward from the rear end of the first stepped part 351a. In the state in which the panel 31 is mounted, the adhesive member 313 may be coated on the second stepped part 351b, and thus the panel 31 may be firmly fixed.

The upper end of the second stepped part 351b may be coupled to the lower end of the member 32, and thus the front surface of the second stepped part 351b and the front part 321 of the member 32 may be positioned on the same plane.

The second stepped part 351b may support the panel 31, and simultaneously, may prevent the lighting device 36 or a lighting spot (which may also be referred to as light formation or a hot spot) generated by the lighting device 36 from being exposed.

That is, the second stepped part 351b may protrude above an upper end of a light source of the lighting device 36 and may protrude with a set height to prevent the lighting device 36 from being exposed forward. The second stepped part 351b may hide a region generated due to intensive light irradiation at the lower end of the light guide plate 33 and the lower end of the panel 31, which are very adjacent to the lighting device 36, to prevent a lighting spot from being formed on the panel 31. The second stepped part 351b may be formed to be transparent or translucent, and as necessary, may be formed with specific color. Thus, the second stepped part 351b may also be referred to as a shield.

The lower bracket side part 353 may form a side surface of the lower bracket 35 and may protrude above the lower bracket front part 351. The lower bracket side part 353 may protrude above the second stepped part 351b, and thus a stepped portion of a lower end of the side surface of the member 32 may be coupled to engage each other with the lower bracket front part 351 and the lower bracket side part 353.

The lower bracket rear part 352 may be formed on a rear end of the lower bracket side part 353. The lower bracket rear part 352 may form a rear surface of the lower bracket 35 and may fixedly mount the lower bracket 35 on the member 32. The lower bracket rear part 352 may be formed in parallel to the panel 31 and the light guide plate 33 and may extend in a vertical direction. A rear surface part of the lower bracket 35 may protrude above the lower bracket front part 351 and the lower bracket side part 353.

A lower side part 352b stepped forward may be formed on right and left side ends of the lower bracket rear part 352. The lower side part 352b may be stepped with the lower bracket rear part 352 and may be positioned in the front of the lower bracket front part 351.

The lower side part 352b may be formed with a thickness corresponding to the width of the second space 325 and may be slidably inserted upward from a lower part of the second space 325.

In the state in which the light guide plate 33 is mounted on the side part 322, the lower bracket 35 may be mounted at a lower end of the member 32. In detail, the lower bracket 35 may be inserted upward from a lower part through an open lower surface of the bracket insertion space 325.

In this case, the lower bracket rear part 352 may be disposed inside the member 32 and may be disposed between the side parts 322 at both left and right sides. In particular, both left and right ends of the lower bracket rear part 352, that is, the lower side parts 352*b* may be inserted into the bracket insertion space 325 to fixedly mount the lower bracket 35 on the upper end of the member 32.

In the state in which the lower side part 352*b* is fully inserted into the bracket insertion space 325, the lower bracket side part 353 may be accommodated on the lower end of the side part 322. The lower bracket 35 may be stepped with a shape corresponding to a lower stepped surface of the member 32, and the lower bracket 35 and the member 32 may be coupled to each other.

Because the lower side part 352*b* is inserted into the bracket insertion space 325 positioned behind the light guide plate 33, no shading may be generated on the panel 31 when light is reflected by the light guide plate 33. That is, the lower bracket 35 may not be exposed out of the panel 31 in the state of being fixedly mounted on the member 32 and may not block light reflected by the light guide plate 33.

When the lower bracket 35 is inserted, the lower support 358 protruding on the front surface of the lower bracket rear part 352 may support a lower end of the rear surface of the light guide plate 33 or a lower part close to the lower end.

A plurality of lower bracket bosses 357 may be formed on the front surface of the lower bracket rear part 352. The lower bracket bosses 357 may be used to couple the screws 399 thereto, and a lower bracket screw hole 356 to which the screw 399 is coupled may be formed at the center of the lower bracket boss 357. The lower bracket screw hole 356 may be formed through the lower bracket rear part 352 and may be formed at a position corresponding to the cover screw hole 397. Thus, when the back cover 39 is mounted, the screws 399 may be coupled to sequentially pass through the cover screw hole 397 and the lower bracket screw hole 356.

The lower bracket boss 357 may protrude forward and may protrude to be in contact with the rear surface of the light guide plate 33. Thus, when the lower bracket 35 is mounted, a protruding end of the lower bracket boss 357 may support the light guide plate 33 from the rear. That is, when the panel assembly 30 is assembled, the lower bracket 35 may support the upper end of the light guide plate 33 from the rear.

The lower support 358 may be formed to connect the plurality of lower bracket bosses 357, and thus may entirely support the lower end of the light guide plate 33. In particular, the lower support 358 may be formed as a pair of ribs spaced apart up and down to more stably support the light guide plate 33 from the rear. The lower support 358 may connect the plurality of lower bracket bosses 357 to reinforce the strength of the lower bracket 35.

The lower bracket boss 357 may protrude at the same height as the lower support 358, and thus the lower bracket boss 357 may support the lower end of the light guide plate 33 from the rear with the lower support 358. As such, the lower part of the light guide plate 33 may be supported only by the structure in which the lower bracket 35 is inserted into the member 32.

The screw 399 passing through the lower end of the back cover 39 may be coupled to the lower bracket boss 357 to firmly fix the lower bracket 35. The lower bracket 35 may be inserted into the member 32 to be primarily fixed thereto, and may be connected to the upper bracket 34 by the back cover 39 to be secondarily fixed thereto by the screw 399.

The lower bracket 35 may be maintained to be firmly mounted, and thus it may be ensured to maintain the state in which the lower part of the light guide plate 33 is supported by the lower bracket 35, in more detail, the lower support 358. Thus, in a process in which the door 20 is repeatedly opened and closed or the light guide plate 33 contracts and expands due to heat, the light guide plate 33 may also be maintained at a mounting position and in a state of being aligned with the light source 362.

An upper end of the back cover 39 connected to the upper bracket 34 and the lower bracket 35 by the screw 399 may be maintained to be supported by the upper bracket front part 341, a lower end of the back cover 39 may be maintained to be supported by the lower bracket rear part 352, and both left and right ends of the back cover 39 may be maintained to be supported by a second surface 322B of the side part 322. Thus, the back cover 39 may shield a space between the side parts 322 at both left and right sides, and the upper bracket 34 and the lower bracket 35 and may define the rear surface of the panel assembly 30.

A support rib 358 for connecting the plurality of lower bracket bosses 357 may be formed on the front surface of the lower bracket rear part 352. One pair of the support ribs 358 may be disposed in a vertical direction, and the plurality of the lower bracket bosses 357 may be positioned between one pair of the support ribs 358.

In detail, the support rib 358 at an upper part of one pair of the support ribs 358 may extend to connect upper ends of the plurality of lower bracket bosses 357, and the support rib 358 at a lower part of one pair of the support ribs 358 may extend to connect lower ends of the plurality of lower bracket bosses 357.

The support rib 358 may protrude with the same height as a protruding height of the lower bracket boss 357. Thus, when the panel assembly 30 is assembled, the support rib 358 may support the light guide plate 33 from the rear with the lower bracket boss 357.

Thus, the lower bracket 35 may be fixedly coupled to the upper end of the member 32 and may be in the state of being fixed to the back cover 39 by the screw 399, and thus may restrain downward movement of the light guide plate 33 and may form the shape of a lower surface of the panel assembly 30.

A bracket opening may be formed in the lower bracket rear part 352. The bracket opening 352*a* may extend from a left side end of the lower bracket rear part 352 to a right side end and may be formed at a position facing the lower bracket front part 351.

The bracket opening 352*a* may be positioned below the support rib 358. The bracket opening 352*a* may be formed to be opened in a rear surface of a space in which the lighting device 36 is mounted. The lower end of the bracket opening 352*a* may be positioned at the lower bracket lower part 354. Thus, the lighting device 36 may enter and exit through the bracket opening 352*a* and the right supporter 37 for supporting the lighting device 36 may also enter and exit therewith. The bracket opening 352*a* may be shielded by the back cover 39.

The lower bracket lower part 354 may form a lower surface of the lower bracket 35 and may be connected to a lower end of the lower bracket front part 351, a lower end of the lower bracket side part 353, and a lower end of the lower bracket rear part 352. The lower bracket lower part 354 may form a bottom surface of a space in which the lighting device 36 is mounted.

A bracket rib 354a for supporting the lighting device 36 or the right supporter 37 from below may be formed on the lower bracket lower part 354. The bracket rib 354a may extend rearward from the lower bracket front part 351 and may protrude upward to support the right supporter 37 on which the lighting device 36 is mounted.

A light guide plate support 355 protruding rearward may be formed on the lower bracket front part 351. The plurality of light guide plate supports 355 may protrude rearward at a constant interval along the lower bracket front part 351.

In this case, the light guide plate support 355 may extend to restrain the lighting device 36 from above. The light guide plate support 355 and the lower bracket lower part 354 may restrain the lighting device 36 from above and below to restrain upward and downward movement of the lighting device 36.

An upper surface of the light guide plate support 355 may protrude to support a lower end of the light guide plate 33 and may protrude rearward at a height corresponding to the first stepped part 351a of the bracket stepped part.

The lighting device 36 may be provided within the lower bracket 35. The lighting device 36 may include a substrate 361 and the light source 362. The substrate 361 may be formed in a plate shape to be accommodated within the lower bracket 35 and may extend from one end of the lower bracket 35 to the other end. The plurality of light sources 362 may be arranged at a constant interval on the substrate 361.

The light source 362 may be disposed to emit light toward the lower end of the light guide plate 33. The substrate 361 may provide a space in which the light source 362 extends from a left side end of the light guide plate 33 to the other side end. The left side end and the right side end of the substrate 361 may be in contact with the lower bracket side part 353 within the lower bracket 35 and may restrain right and left movement.

The light source 362 may be disposed in a forward biased position based on the center of the substrate 361. In this case, the light source 362 may be positioned below the lower end of the light guide plate 33 in a vertical direction, that is, may be positioned to face the lower end of the light guide plate 33.

A circuit 363 of the substrate 361 may be concentrated in a position biased to the rear based on the center of the substrate 361. The circuit 363 may be used for an operation of the lighting device 36, and the light source 362 may be disposed at a rearward position to face the light guide plate 33.

An example of the light source 362 may include an LED. The light source 362 may include an RGB LED for emitting light with various colors under control of the controller 13. That is, the light source 362 may emit light with various colors under control of the controller 13, and thus the panel 31 may glow with color set by the controller 13. According to color of the panel 31, color of the front appearance of the refrigerator 1 may be determined.

The light source 362 may include an LED for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the panel 31 to glow with desired color.

The light sources 362 may be mounted at a constant interval on the substrate 361 and an appropriate number of light sources 362 may be arranged to cause the panel 31 to glow with set brightness. For example, the light sources 362 may be arranged at an interval of 6.3 mm to 7.0 mm, brightness thereof may reach a target brightness of the panel 31, and an entire surface of the panel 31 may glow with uniform brightness equal to or greater than 80%. An interval between the light sources 362 may be smaller than the right and left width of the light guide plate support 355, and thus the light guide plate support 355 may be disposed between the light sources 362.

Devices 364 protruding downward may be further provided on the lower surface of the substrate 361.

The right supporter 37 may be provided within the lower bracket 35. The right supporter 37 may support the lighting device 36 within the lower bracket 35. The right supporter 37 may dissipate heat generated by the lighting device 36 by conduction.

The right supporter 37 may be formed of a metal material and may be molded by extrusion to have the same cross-sectional structure in a longitudinal direction, and may be formed with a size to enter and exit through the bracket opening 352a.

The right supporter 37 may include a first supporting part 372 for supporting the lighting device 36 and a second supporting part 371 in contact with the back cover 39.

The first supporting part 372 may be disposed on the lower bracket lower part 354 within the lower bracket 35. The first supporting part 372 may be supported by the bracket rib 354a from below. Substrate supports 373 for supporting a front end and a rear end of the substrate 361 may be formed on a front end and a rear end of the first supporting part 372.

A supporter recess 374 may be formed on the first supporting part 372. The supporter recess 374 may be recessed between one pair of the substrate supports 373 and may provide a space in which devices of the lower surface of the substrate 361 are accommodated when the substrate 361 is supported by the first supporting part 372.

The second supporting part 371 may extend upward from the rear end of the first supporting part 372. A substrate accommodation groove 375 may be formed on the lower end of the second supporting part 371. The substrate accommodation groove 375 may be recessed to accommodate the rear end of the substrate 361. In the state in which the substrate 361 is mounted on the right supporter 37, the rear end of the substrate 361 may be in close contact with an internal side of the substrate accommodation groove 375.

In the state in which the panel assembly 30 is assembled, the back cover 39 may be coupled to the lower bracket 35 by fastening the screws 399. In this case, the cover bent part 396 of the lower end of the back cover 39 may be inserted into the bracket opening 352a. Thus, in the state in which the back cover 39 is mounted, the cover bent part 396 may surface-contact the entire lower surface of the first supporting part 372, and the lower end of the cover perimeter part 392 of the back cover 39 may surface-contact the entire rear surface of the second supporting part 371, and thus heat of the lighting device 36, transferred through the right supporter 37, may be dissipated through the back cover 39.

The lower bracket 35 may have a structure in which the shield, that is, the second stepped part 351b is not formed, and hereinafter, another example of the lower bracket 35 will be described with reference to drawings.

FIG. 25 is an exploded perspective view showing another example of the lower bracket.

As shown in the drawing, the lower bracket 35 may be provided on a lower end of the panel assembly 30. The lower bracket 35 may be mounted on a lower end of the member 32 and may protrude below the lower end of the panel 31.

The lighting device 36 including the substrate 361 and the light source 362 may be provided within the lower bracket 35. The lighting device 36 may be supported by the right supporter 37, and the lighting device 36 may be fixed to the inside of the lower bracket 35 to emit light to an end of the light guide plate 33. Thus, the light source 362 may be positioned below the lower end of the panel 31, thereby preventing the lower end of the panel 31, adjacent to the light source 362, from being excessively brightened.

The upper end of the lower bracket front part 351 may be supported by the lower end of the front part 321 of the member 32. That is, the upper end of the lower bracket front part 351 may be bent rearward to support the lower end of the front part 321. In this case, the lower end of the front part 321 may correspond to the lower end of the panel 31 or may be somewhat high.

The panel 31 may be mounted on the front surface of the front part 321. The panel 31 may be adhered by the adhesive member 313, and the adhesive member 313 may be coated along a perimeter of the panel 31 to be adhered to a perimeter of the front part 321.

The light guide plate 33 may be disposed behind the front part 321. The light guide plate 33 may be in contact with a rear surface of the front part 321. Needless to say, the light guide plate 33 may be inserted along the side part 322 of the member 32, and thus may be spaced apart from the front part 321 at a fine gap rather than being in close contact with the front part 321.

The lower end of the light guide plate 33 may be supported by the light guide plate support 355 protruding rearward from the lower bracket front part 351. Thus, the lower end of the light guide plate 33 may be maintained to be spaced apart from the upper surface of the light source 362 by a set interval G.

The rear surface of the panel assembly 30 may be formed by the back cover 39. The lower end of the back cover 39 may be formed by the cover bent part 396, and the cover bent part 396 may be inserted into the lower bracket 35 through the bracket opening 352a to support the right supporter 37 from below.

The screws 399 may be coupled to the back cover 39 and may be coupled to the lower bracket screw hole 356 through the cover screw hole 397. Components of the panel assembly 30 as well as the back cover 39 may be maintained to be firmly coupled by fastening the screws 399.

Hereinafter, the structure of the panel assembly 30 in the state of being assembled will be described in more detail with reference to drawings.

Figure 36:
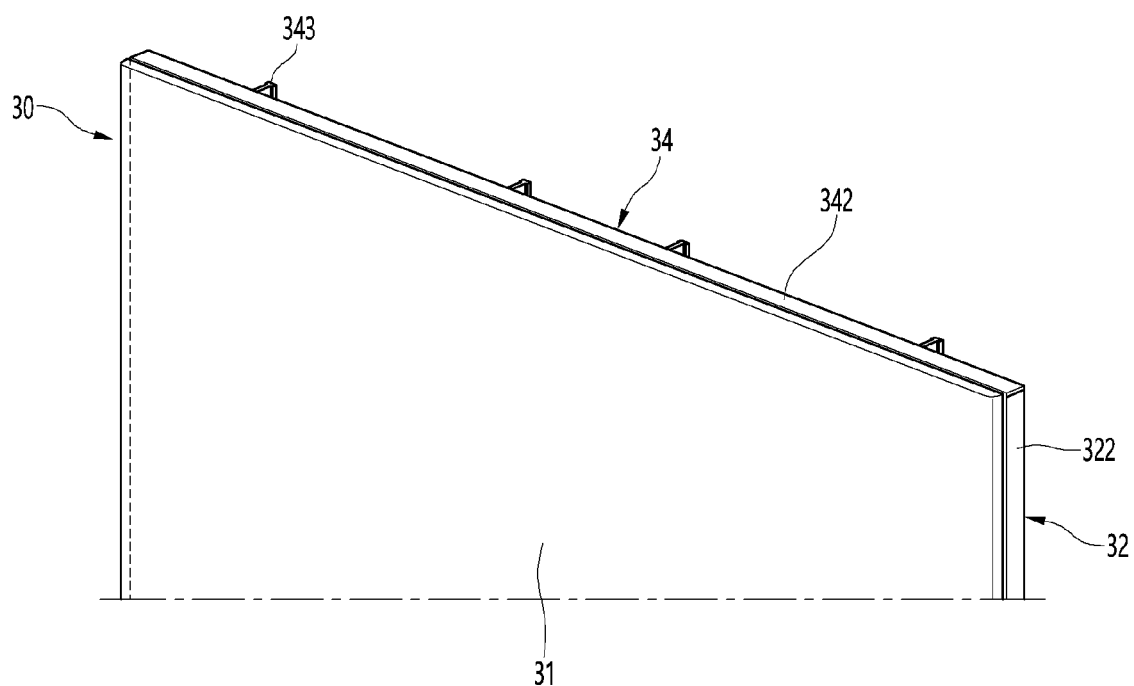
FIG. 36 is a partial perspective view of an upper part of the panel assembly.
Figure 37:
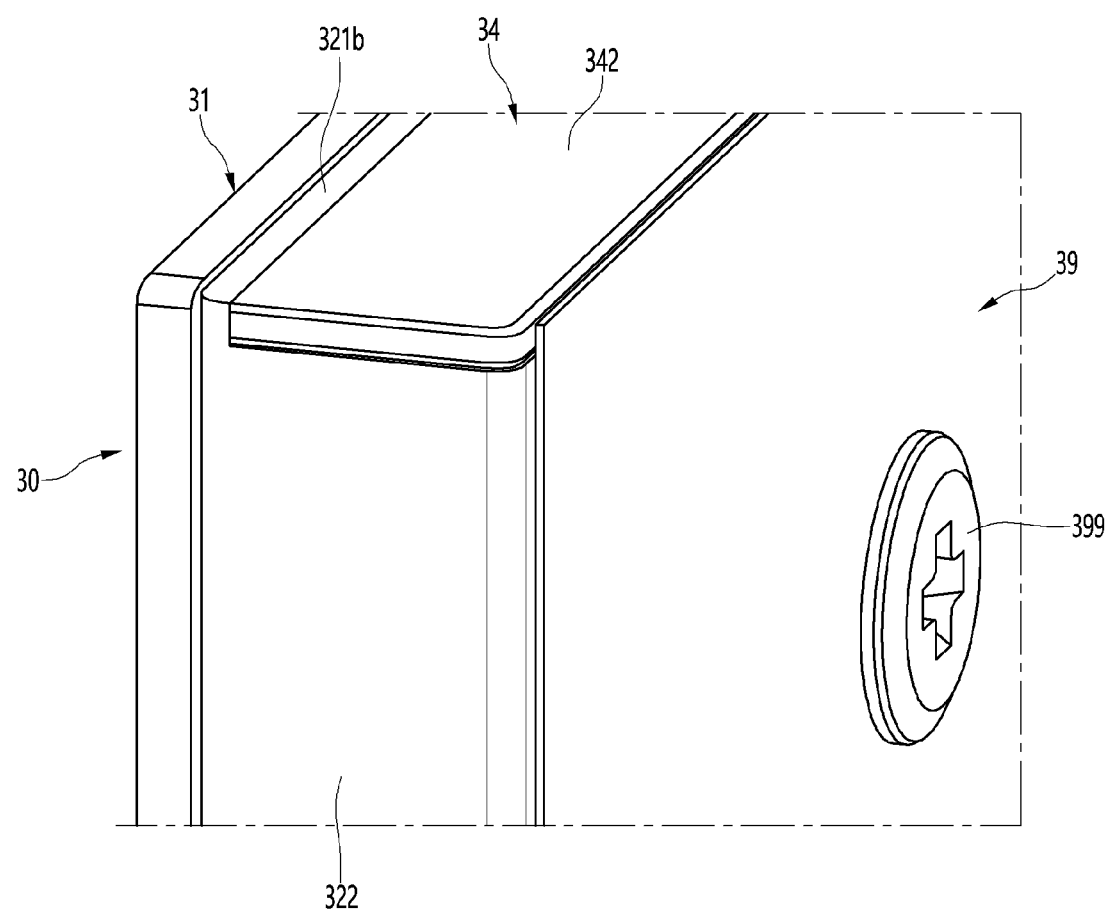
FIG. 37 is a partial perspective view of a structure of an upper corner of the panel assembly.
Figure 38:
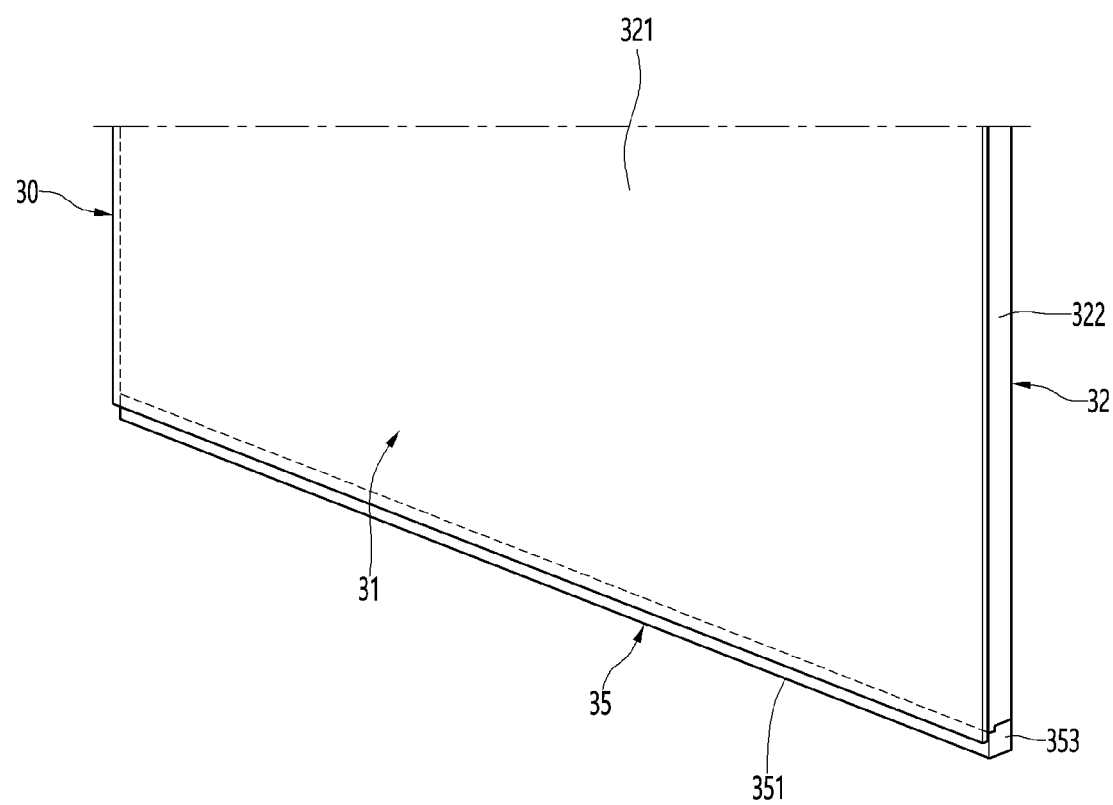
FIG. 38 is a partial perspective view of a lower part of the panel assembly.
Figure 39:
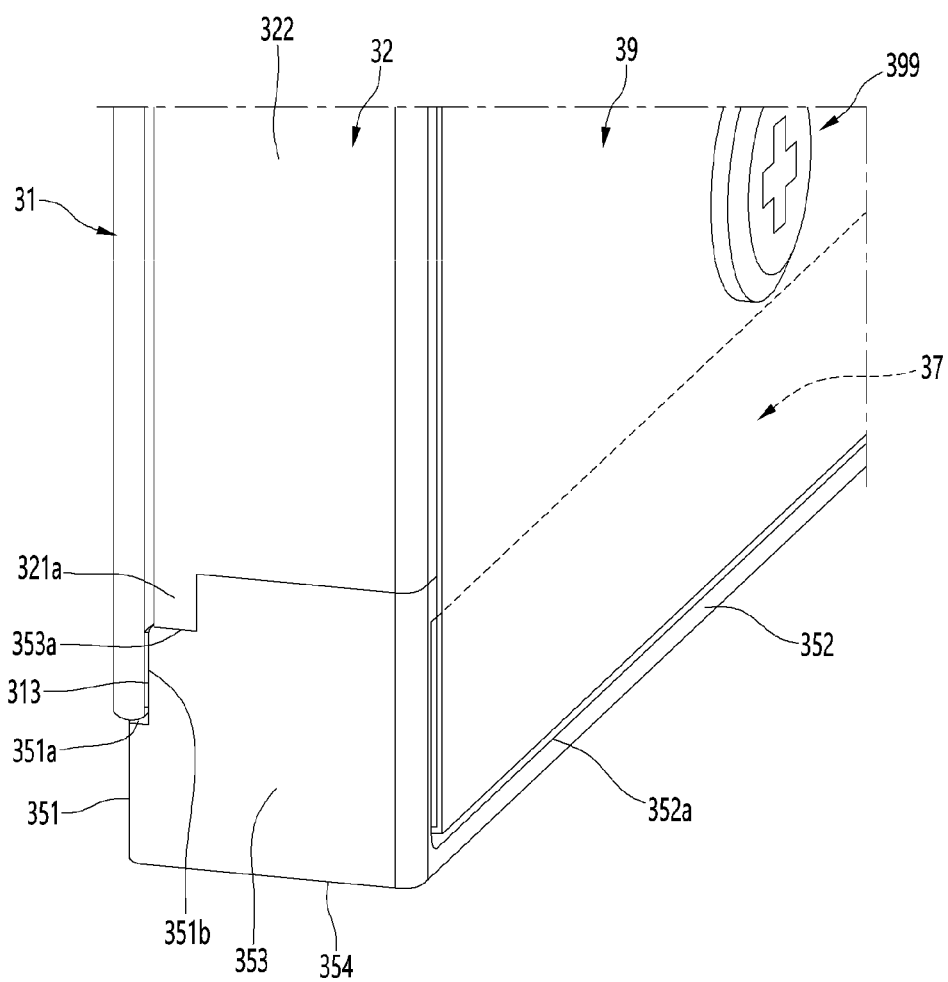
FIG. 39 is a partial perspective view of a structure of a lower corner of the panel assembly.

FIG. 36 is a partial perspective view of an upper part of the panel assembly. FIG. 37 is a partial perspective view of a structure of an upper corner of the panel assembly. FIG. 38 is a partial perspective view of a lower part of the panel assembly. FIG. 39 is a partial perspective view of a structure of a lower corner of the panel assembly.

As shown in the drawings, the panel 31 may be adhered to a front surface of the member 32 to form a front surface of the panel assembly 30. In this case, an upper end and right and left side ends of the member 32 may positioned at positions corresponding to an upper end and right and left side ends of the panel 31 to be prevented from being exposed to the outside viewed from the front.

In the state in which the panel assembly 30 is completely assembled, an outer appearance of the front surface may be formed by the panel 31 viewed from the front. There may be no component exposed forward other than the panel 31 among components of the panel assembly 30, and thus the entire panel assembly 30 may be seen as formed by the panel 31. In this state, the front appearance of the refrigerator 1 or a home appliance may be formed by color of the panel 31 or color glowing on the panel 31.

The upper bracket 34 may be mounted on the upper end of the member 32. A side surface of the upper bracket 34 may be accommodated on the upper end of the front part 321 and the upper end of the side part 322. The upper surface of the upper bracket 34 may be formed with a height corresponding to the upper end protrusion 321b. Thus, the upper surface of the upper bracket 34 may form an upper surface of the panel assembly 30 with the upper end protrusion 321b. Viewed from the front, the upper bracket 34 may not be exposed to the outside by being hidden by the panel 31 and the upper end protrusion 321b.

The side part 322 may be exposed in a side direction to form a side appearance of the panel assembly 30. The side part 322 may shield the light guide plate 33 disposed therein to prevent the light guide plate 33 from being exposed to the outside.

The lower bracket 35 may be mounted on the lower end of the member 32. The lower bracket 35 may extend downward based on the panel 31. Thus, as shown in FIG. 24, the lighting device 36 may be disposed inside the lower bracket 35, and the upper end of the lighting device 36 may be disposed below the panel 31. The lighting device 36 may be disposed below the panel 31, thereby preventing a light source from being exposed or preventing a lighting spot from being formed on the panel 31.

The lower bracket 35 exposed downward may be shielded by a deco member 451 mounted on the lower cap deco 45 or the lower cap deco 45 when the panel assembly 30 is mounted on the door body 40. Thus, the lower bracket 35 may not be exposed forward based on the panel assembly 30, and a front appearance of the panel assembly 30 may be formed by the panel 31.

A side surface of the lower bracket 35 may be supported by the lower end of the side part 322 and the lower end protrusion 321a. The first stepped part 351a and the second stepped part 351b of the lower bracket 35 may support the panel 31. The lower bracket 35 may be in contact with both the member 32 and the panel 31.

In this case, the upper end of the lower bracket front part 351 on which the second stepped part 351b is formed may protrude upward based on the lower end of the panel 31. Thus, the second stepped part 351b, i.e., the shield may block light emitted from the lighting device 36 mounted inside the lower bracket 35 from being directly directed to the panel 31.

The back cover 39 may be coupled to the upper bracket 34 and the lower bracket 35 by fastening the screws 399, and the right and left side ends of the back cover 39 may be in contact with a rear end of the side part to be supported thereby.

In the state in which the back cover 39 is mounted, a rear surface of the panel assembly 30 may be formed, and the back cover 39 may shield the right supporter 37 exposed through the bracket opening 352a and the bracket opening 352a.

Viewed from the front, an outer appearance of the panel assembly 30 may be formed by the panel 31, and a side appearance of the panel assembly 30 may be formed by the member 32. The upper bracket 34 and the lower bracket 35 may be accommodated on the upper and lower ends of the member 32 to be shielded by the panel 31. Thus, an outer appearance of the panel assembly 30 may be entirely determined by the panel 31, and in particular, color of the panel assembly 30 may be determined according to a color change of the panel 31.

The light guide plate 33 may be disposed within the member 32, and the lighting device 36 may be accommodated inside the lower bracket 35, and thus the panel assembly 30 may have a slim overall structure.

Hereinafter, operations of the refrigerator 1 and the panel assembly 30 having the above structure will be described in more detail with reference to drawings.

Figure 40:
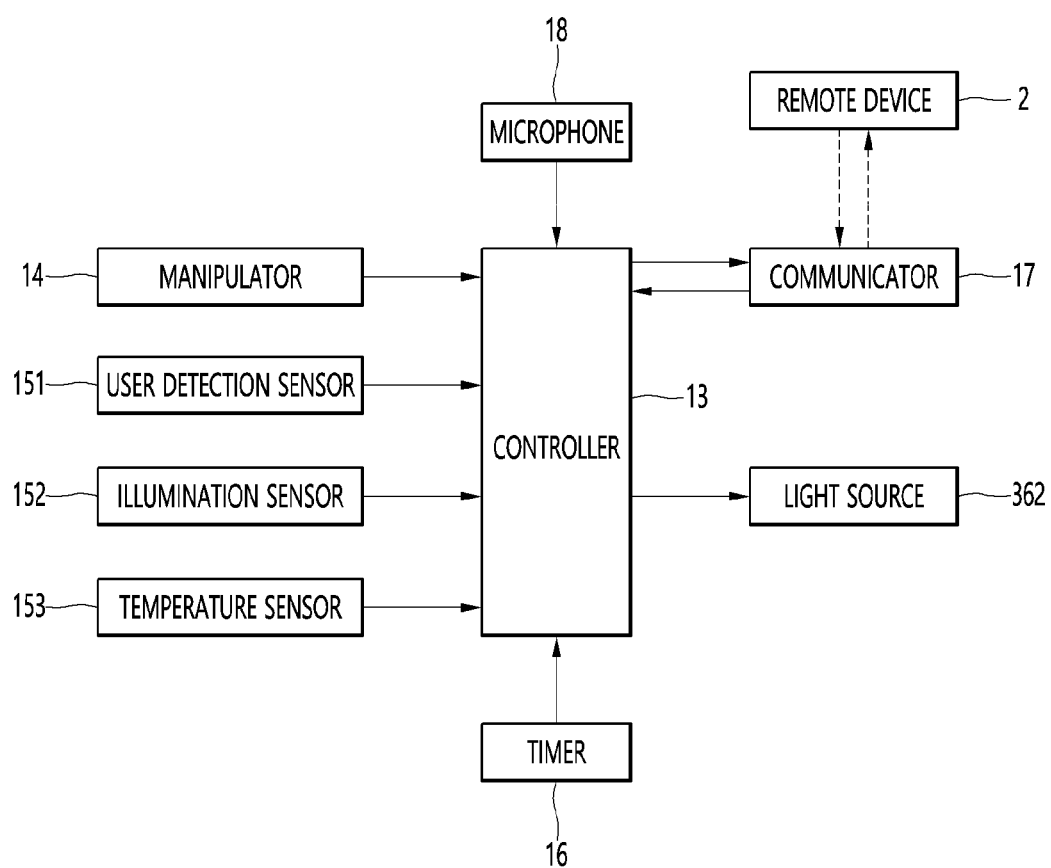
FIG. 40 is a block diagram showing a flow of a control signal of the refrigerator.
Figure 41:
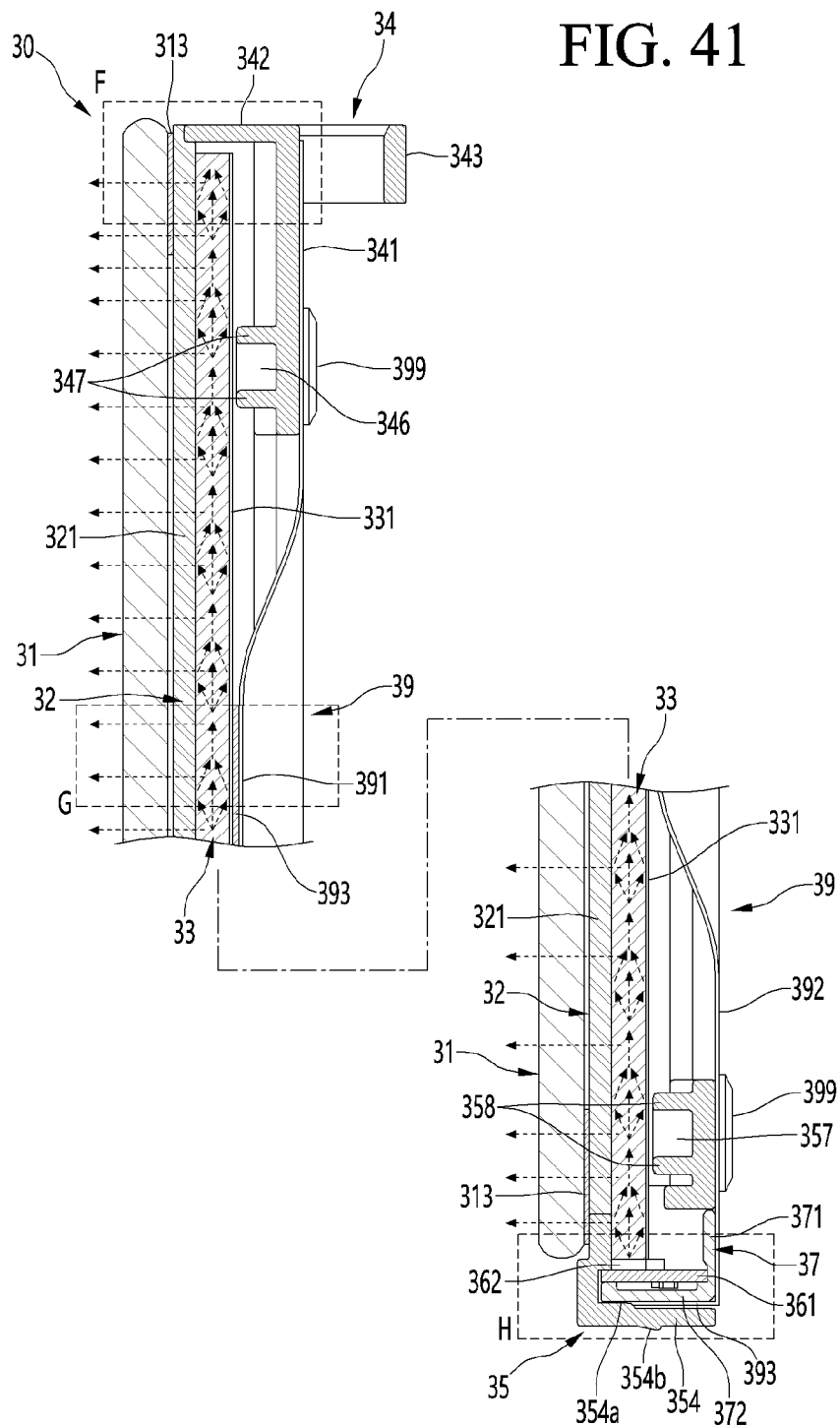
FIG. 41 is a cross-sectional view showing a lighting state of the panel assembly.
Figure 42:
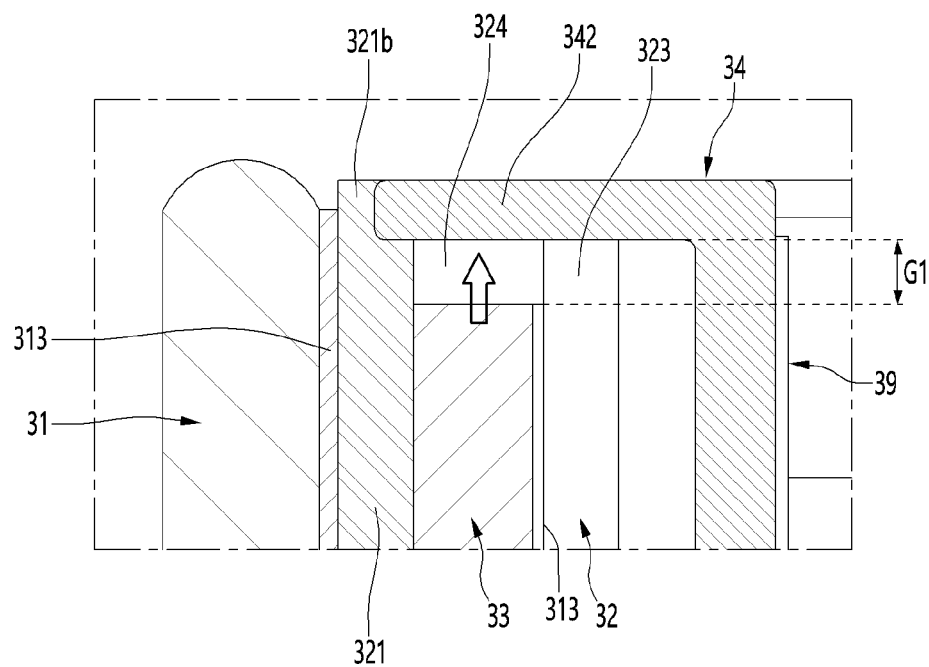
FIG. 42 is an enlarged view of a part "F" of FIG. 41.
Figure 43:
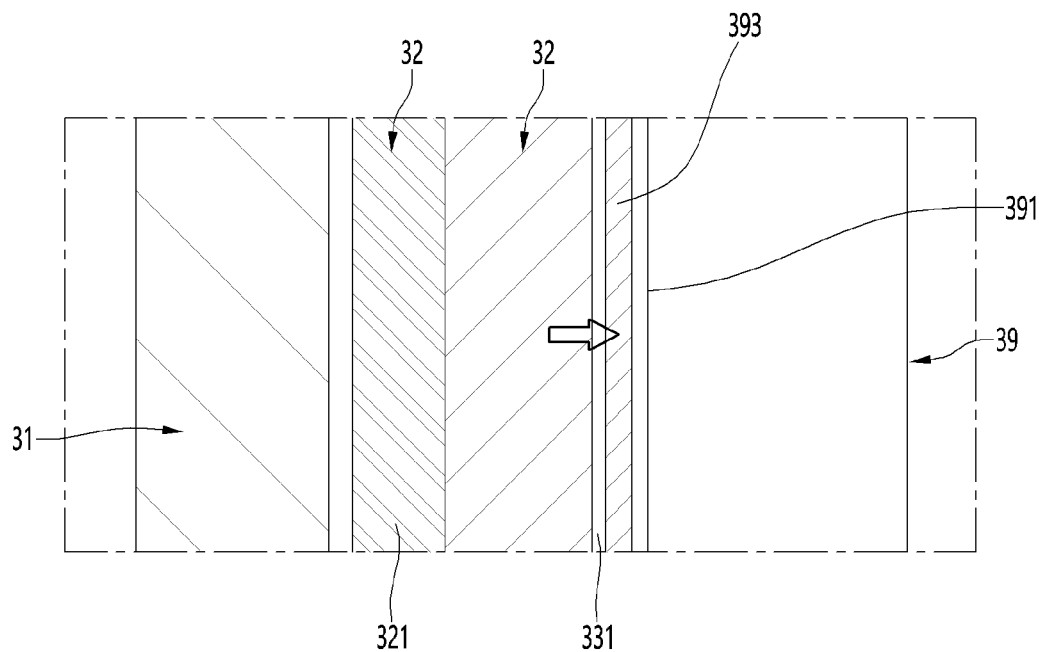
FIG. 43 is an enlarged view of a part "G" of FIG. 41.
Figure 44:
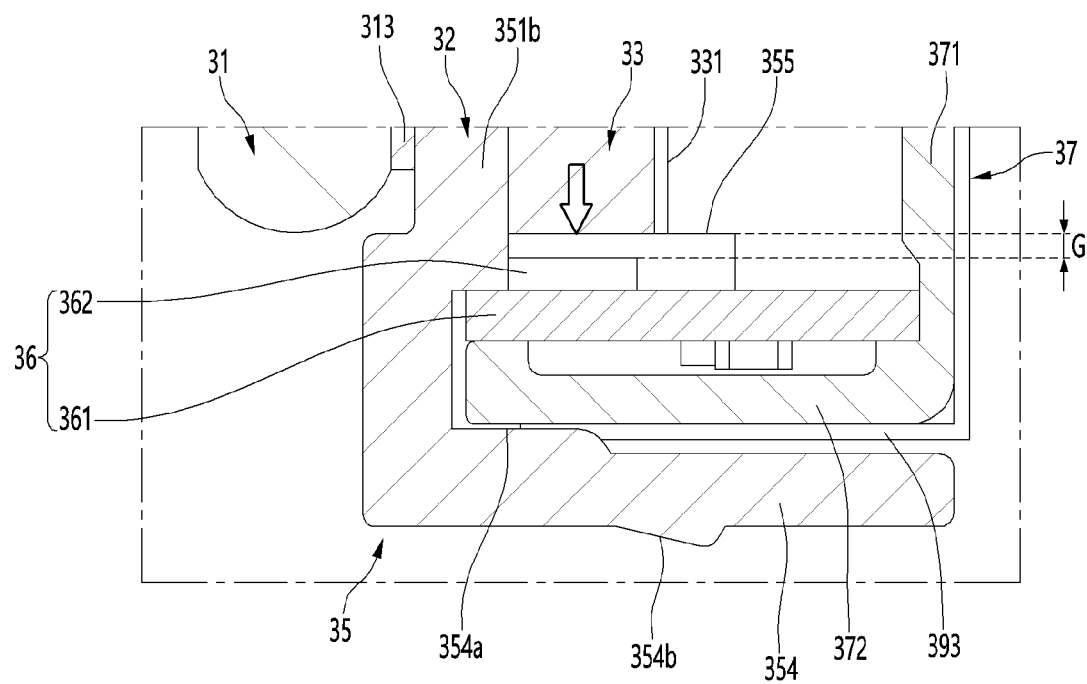
FIG. 44 is an enlarged view of a part "H" of FIG. 41.

FIG. 40 is a block diagram showing a flow of a control signal of the refrigerator. FIG. 41 is a cross-sectional view showing a lighting state of the panel assembly. FIG. 42 is an enlarged view of a part "F" of FIG. 41. FIG. 43 is an enlarged view of a part "G" of FIG. 41. FIG. 44 is an enlarged view of a part "H" of FIG. 41.

As shown in the drawings, in the refrigerator 1 according to an embodiment of the present disclosure, a front surface of the door 20 may glow via an operation of the lighting device 36. The front surface of the door 20 may be turned on or off and may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or manipulation may be input by touching and manipulating the panel 31. That is, the user may directly manipulate the manipulator 14 to set an operation of the lighting device 36 and may turn on or off the lighting device 36.

The user may set the overall operation state of the lighting device 36, such as an operation time and an operation condition of the lighting device 36 and emission color of the light source 362 through manipulation of the manipulator 14. As necessary, the manipulator 14 may be configured as a display for information display and manipulation.

The lighting device 36 may also be manipulated and set through a remote device 2 spaced apart from the refrigerator 1. The refrigerator 1 may communicate with the remote device 2 through a communicator 17 connected to a controller 13, and the user may manipulate an operation of the lighting device 36 through the remote device 2.

The communicator 17 may communicate with the remote device 2 using various methods. For example, the communicator 17 may have a communicable structure using at least one method such as wired, wireless, or short distance communication (Bluetooth, Wi-Fi, Zigbee, and NFC). The remote device 2 may be various devices that are capable of communicating, such as a dedicated terminal, a mobile phone, a tablet, a portable PC, a desktop PC, a remote control, or a Bluetooth speaker.

The user may manipulate and set the overall operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The lighting device 36 may also be operated by a sensor. The sensor may be, for example, a user detection sensor 151 for detecting proximity of the user. For example, the user detection sensor 151 may use various devices for detecting user approaching near the refrigerator, such as an infrared sensor, an ultrasonic sensor, or a laser sensor.

The sensors 15 may be disposed at various positions for detecting proximity of the user, such as one side of the cabinet or one side of the door 20, and may be disposed at various positions for detecting proximity of the user. A plurality of sensors may be disposed at different positions.

Thus, when the user approaches the refrigerator 1 by a set distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 35.

In detail, when the user detection sensor 151 detects that the user is very close to the refrigerator 1, the lighting device 36 may be turned off or the brightness may be gradually dimmed to prevent glare of the user. When the user moves away from the refrigerator 1 again, the lighting device 35 may be turned on again or may return to an original brightness.

The sensor may be an illumination sensor 152. The illumination sensor 152 may detect illumination of an indoor space and may be disposed at the same position as a position at which the user detection sensor 151 is disposed.

The lighting device 36 may be operated according to a detected illumination of the illumination sensor 152. For example, when the detected illumination of the illumination sensor 152 is equal to or less than a set illumination and the lighting device 36 is dimmed, the controller 13 may turn on the lighting device 36, and when the detected illumination of the illumination sensor 152 is equal to or greater than the set illumination and the lighting device 36 becomes brighter, the controller 13 may turn off the lighting device 36.

The sensor may include both the illumination sensor 152 and the user detection sensor 151, and the illumination sensor 152 and the user detection sensor 151 may be operated in a complex way to cause the controller 13 to turn off the lighting device 36.

For example, in the state in which the illumination sensor 152 is detected to be equal to or greater than the set illumination, the lighting device 36 may be maintained in an off state irrespective of whether the user detection sensor 151 detects this. In the state in which the illumination sensor 152 is detected to be equal to or less than the set illumination, when the user detection sensor 151 detects proximity of the user, the lighting device 36 may be turned on.

The sensor may be an inside temperature sensor 153. The controller 13 may be connected to the inside temperature sensor 153. The inside temperature sensor 153 may detect a temperature inside the refrigerator and may transfer the detected temperature to the controller 13, and the controller 13 may cause the light source 362 to glow with set color according to the temperature inside the refrigerator and may intuitively display the temperature and state inside the refrigerator through front color of the door 20.

The lighting device 36 may include the state in which brightness is adjusted in addition to an on state and an off state. That is, according to an operation state of the refrigerator 1, the controller 13 may adjust the operation state of the refrigerator 1 by changing brightness of the lighting device 36.

The controller 13 may be connected to a microphone 18. Thus, the light source 362 may glow with set color according to a voice signal received from the microphone 18, and an input state of the voice signal or a setting state of a function may also be displayed through the front color of the door 20.

For example, when receiving a temperature control signal of the user through the microphone 18, the controller 13 may adjust a set temperature inside the refrigerator, and may operate the lighting device 36 to change color of the front surface of the door 20 to color corresponding to the corresponding temperature. In another example, when music is input through the microphone 18, the lighting device 36 may also be controlled to change the front color of the door 20 in response to play of music, and the front surface of the refrigerator the door 20 may be continuously changed in color with an equalizer while interacting with the played music.

The lighting device 36 may be turned off at a time set by a timer 16. That is, the lighting device 36 may be turned on according to a time when the user is mainly active and may be maintained off outside the set time range. In addition, the lighting device 36 may be turned off during the day and on during night irrespective of actual illumination.

Irrespective of an operation state of the refrigerator 1, the brightness and color of the front surface of the door 20 may be adjusted only according to user settings.

The operation state of the lighting device operated by the controller is now described. As shown in FIG. 30, when the lighting device 36 is turned on according to an instruction of the controller 13, light emitted from the light source 362 may be directed toward the lower end of the light guide plate 33. In this case, light emitted from the light source 362 may glow with color selected by the controller 13. That is, the light source 362 may be an RGB LED and may emit light with color determined by the controller 13 to cause a surface of the panel 31 to glow with specific color.

Light incident through the lower end of the light guide plate 33 may be diffused and reflected along the light guide plate 33 and may be moved along the light guide plate 33. In this case, light guided by the light guide plate 33 may be reflected forward by the reflective sheet 331 and may be transmitted to the outside through the panel 31. Light may also be reflected by a perimeter surface the light guide plate 33 to maximize the reflection efficiency of the inside of the light guide plate 33 due to the reflective member 332 disposed on the perimeter of the light guide plate 33.

Through reflection of the reflective sheet 331 and the reflective member 332, light guided through the light guide plate 33 may be entirely emitted forward to cause the panel 31 to entirely glow, and the front surface of the door 20 may glow with set brightness or color.

The lighting device 36 may be disposed on the lower end of the panel assembly 30, and the light source 362 may emit light upward. The lighting device 36 may be fixed to be prevented from being moved inside the lower bracket 35. Thus, even if the door 20 is repeatedly opened and closed, the lighting device 36 may be maintained at an exact position, and the panel 31 may be ensured to glow with set brightness by directing light emitted from the light source 362 toward the lower end of the light guide plate 33.

In particular, the light guide plate 33 may be supported from below by its own weight, and thus the set interval G may be maintained between the lower end of the light guide plate 33 and the upper end of the light source 362. Thus, light emitted from the light source 362 may be effectively incident on the lower end of the light guide plate 33, and the brightness of the panel 31 may be ensured and the panel 31 may glow with uniform brightness.

The lighting device 36 may be positioned below the upper end of the lower bracket 35. Thus, viewed from the front, the lighting device 36 may be prevented from being exposed, and a lighting spot (a hot spot) may be prevented from being formed adjacent to the light source 362, thereby improving the quality of a front appearance of the door 20 and preventing glare of the user.

In the state in which the light guide plate 33 is in contact with the front part 321 of the member 32, the lower end may be restrained by the light guide plate support 355 and right and left sides may be retrained by the side part 322. The upper end of the light guide plate may be maintained to be spaced apart from the upper bracket upper part 342 by the set gap G1.

Thus, when the lighting device 36 is turned on for a long time and heats up, the light guide plate 33 may be restrained not to extend downward and right and left, but may extend upward within the set gap G1. Thus, in the state in which the lighting device 36 is turned on for a long time, a constant interval with the panel 31 may also be maintained. An interval between the light guide plate 33 and the panel 31, and thus uniform and constant brightness of the panel 31 may be ensured.

When the lighting device 36 is turned on, the front surface of the door 20 may glow brightly. A difference in light transmittance between a portion of the panel 31, which is not coated with the sealant 313, and a portion coated with the sealant 313 may not be recognized by a user.

The sealant 313 may maintain a transparent or opaque state in the state in which the panel 31 and the member 32 are adhered. The sealant 313 may be spread thinly between the panel 31 and the member 32. Due to this spreadability, the sealant 313 may transmit light guided through the light guide plate 33.

Thus, when the lighting device 36 is turned on, light may also be transmitted through the portion coated with the sealant 313, and the front surface of the door 20 may be implemented with set color.

The light guide plate 33 may be formed with a pattern for guiding the light to a position corresponding to a position at which the sealant 313 is coated rather than a central portion. In this case, on a front surface of the door 20, the user may not recognize a color difference implemented by the lighting device 36 between a position at which the sealant 313 is coated and a position at which the sealant 313 is not coated.

Figure 45:
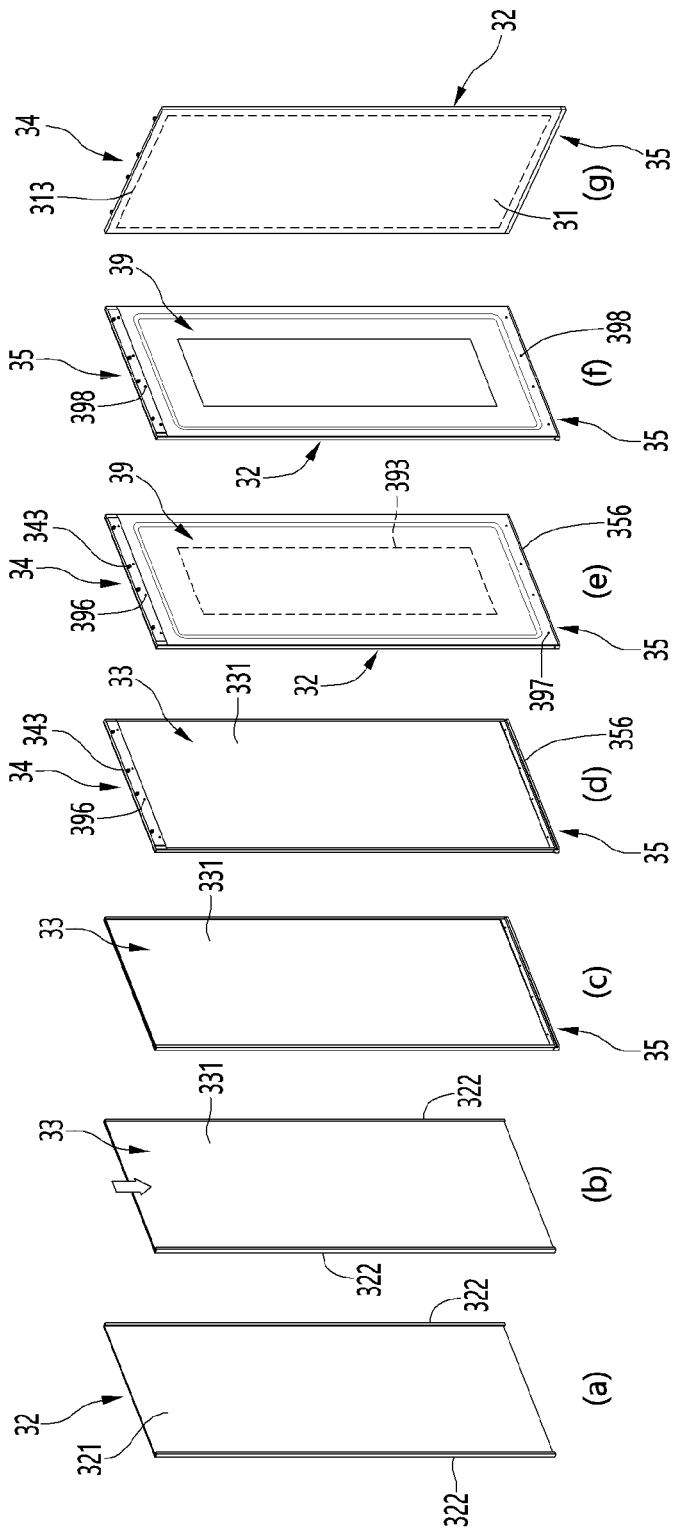
FIG. 45 is a diagram sequentially showing an assembling process of the panel assembly.

FIG. 45 is a diagram sequentially showing an assembling process of the panel assembly.

As shown in the drawing, in order to assemble the panel assembly 30, the member 32 may be first molded. For example, the member 32 may be extrusion-molded. In addition, the member 32 may be disposed to position the front part 321 to face forward. [(a) of FIG. 45]

In the state in which the member 32 is disposed, the light guide plate 33 may be mounted on the member 32. The reflective sheet 331 may be disposed on the rear surface of the light guide plate 33 and may be mounted on the member 32 in a state in which the reflective member 332 is disposed on an upper surface and both left and right side surfaces except for a lower surface of a peripheral surface.

In this case, left and right ends of the light guide plate 33 may be fixed to the side parts 322 at both left and right side surfaces of the member 32. The left and right both ends of the light guide plate 33 may be slidably inserted into the light guide plate insertion space 324 to constrain the light guide plate 33. In this case, the front surface of the light guide plate 33 may be in close contact with the rear surface of the front part 321. [(b) of FIG. 45]

In the state in which the light guide plate 33 is mounted on the member 32, the lower bracket 35 may be mounted at the lower end of the member 32. The lower bracket 35 may be assembled in the state in which the lighting device 36 and the right supporter 37 are mounted. Needless to say, in the state in which the lower bracket 35 is mounted on the member 32, the lighting device 36 and the right supporter 37 may also be assembled on the lower bracket 35.

In the state in which the lighting device 36 and the right supporter 37 are mounted inside the lower bracket 35, the lighting device 36 may be positioned at a set position, and the light source 362 may be positioned to face the lower end of the light guide plate 33. [(c) of FIG. 45]

The upper bracket 34 may be mounted at the upper end of the member 32. The upper bracket 34 and the lower bracket 35 may be mounted in any order from each other, but the lower bracket 35 may be first mounted according to the characteristics of a structure in which the light guide plate 33 is supported by the lower bracket 35. [(d) of FIG. 45]

In the state in which the upper bracket 34 and the lower bracket 35 are inserted into the member 32 and is primarily fixed, the back cover 39 may be mounted. The back cover 39 may be in contact with the upper bracket 34, the lower bracket 35, and the side parts 322 at both left and right sides of the member 32 and may define the rear surface of the panel assembly 30. [(e) of FIG. 45]

In the state in which the back cover 39 is disposed, the screw 399 may be coupled to fixedly mount the back cover 39. The screw 399 may be coupled along the upper bracket 34 and the lower bracket 35 to constrain the upper end of the back cover 39 and the lower end of the back cover 39. [(f) of FIG. 45]

In the state in which the back cover 39 is completely fixed and mounted, the panel 31 may be finally mounted on the front surface of the member 32, that is, the front part 321. The panel 31 may be supported by the front part 321 and a portion of a front surface of the lower bracket 35. The panel 31 may have a rear surface adhered to the member 32 and the lower bracket 35 in such a way that an entire front surface of the panel 31 is exposed.

To this end, the sealant 313 may be coated around the rear surface of the panel 31, and the panel 31 may be adhered the member 32 and the lower bracket 35 by the sealant 313. Needless to say, if necessary, the sealant 313 may be coated on the entire surface rather than the peripheral surface of the panel 31, or may be partially provided at a plurality of points.

The sealant 313 may be formed of a transparent or translucent material, and thus light reflected forward from the light guide plate 33 may pass through the sealant 313 to illuminate the end of the panel 31.

When the panel 31 is completely adhered, the panel assembly 30 may be completely assembled. Since the panel 31 is mounted at a final stage of an assembly process, the panel 31 with a high weight may be easily managed. Since movement and processing of the panel 31 may be minimized, the panel 31 may also be prevented from being damaged. Handling of other components under assembly may be easily performed by assembling the panel 31 last. [(g) of FIG. 45]

When the panel assembly 30 needs to be dissembled, the panel assembly 30 may be dissembled in a reverse order of the above-described process.

Hereinafter, a change in a front appearance of the door 20 according to an operation of the lighting device 36 will be described with reference to drawings.

Figure 46:
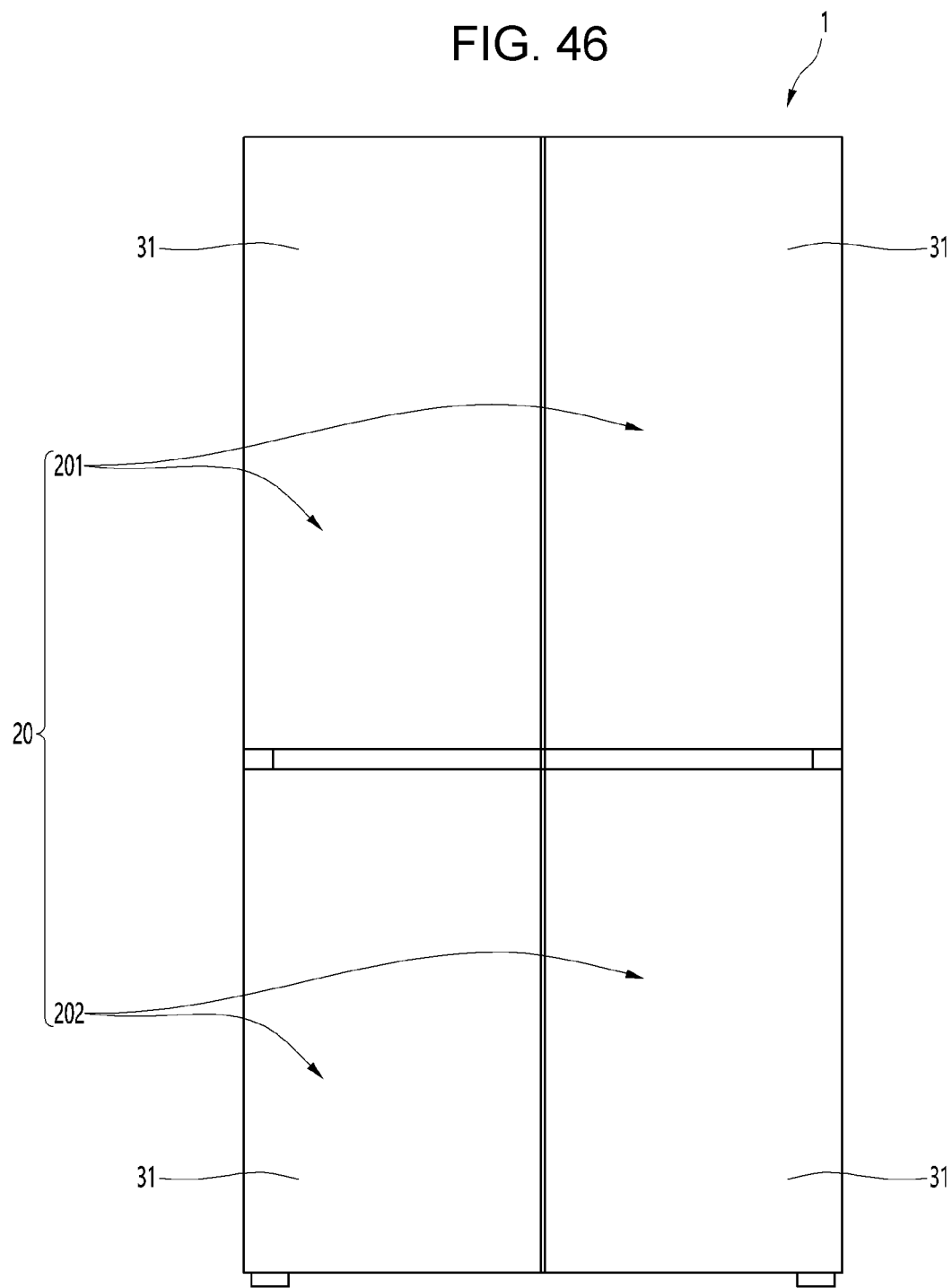
FIG. 46 is a front view showing a front appearance of a refrigerator in the state in which the lighting device is turned off.
Figure 47:
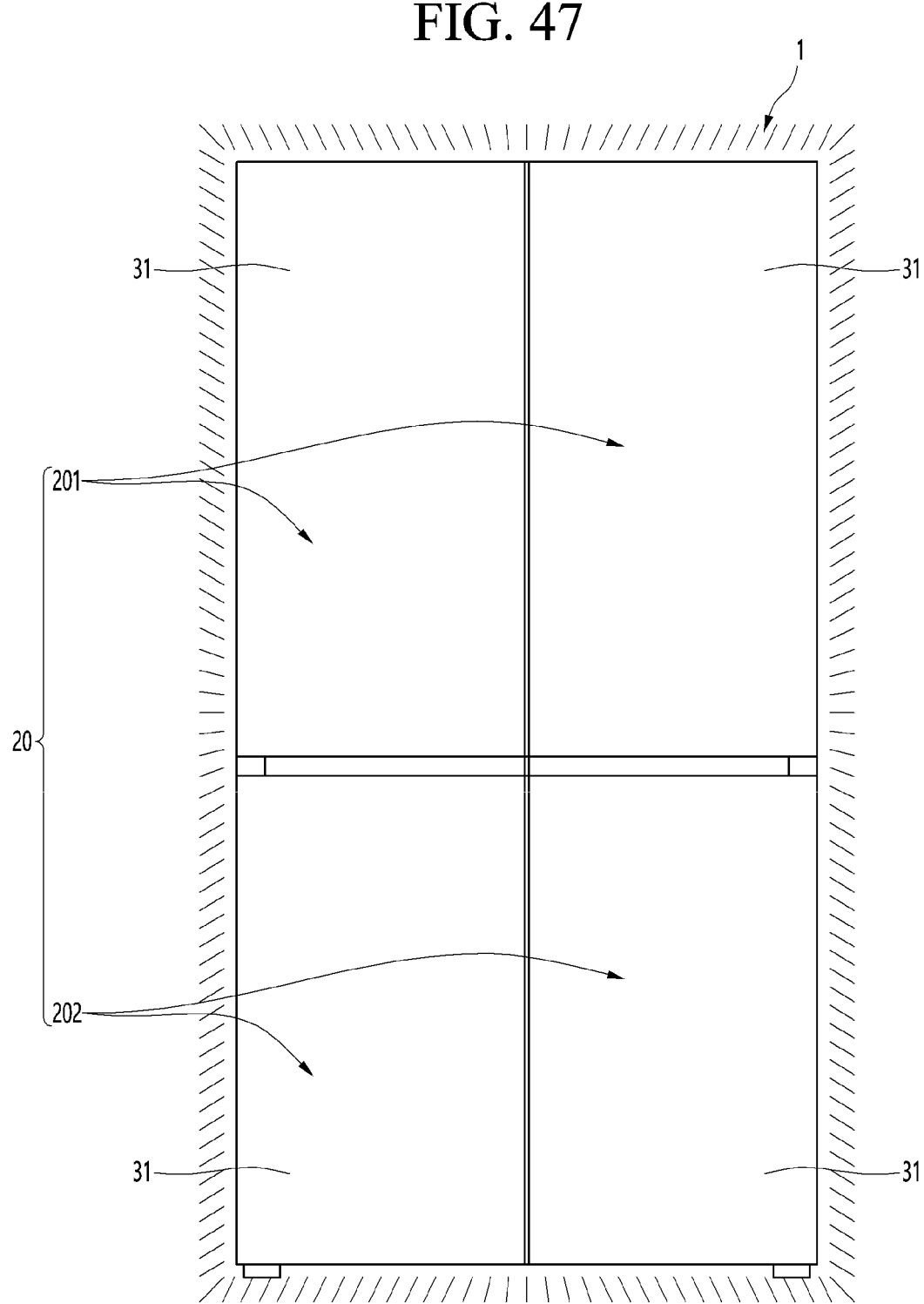
Figure 48:
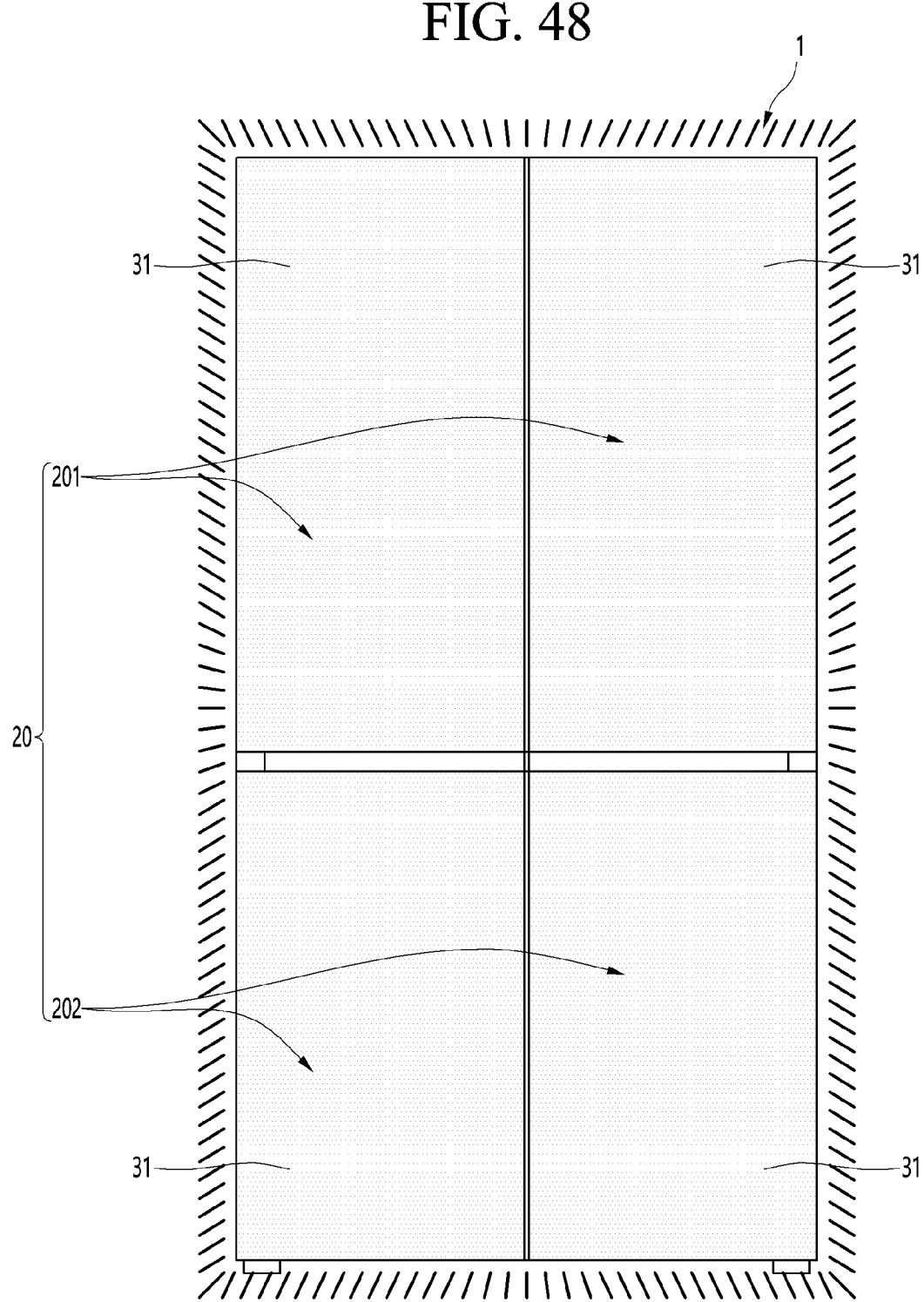
FIG. 48 is a front view showing a front appearance of a refrigerator in the state in which color of the lighting device is changed.
Figure 49:
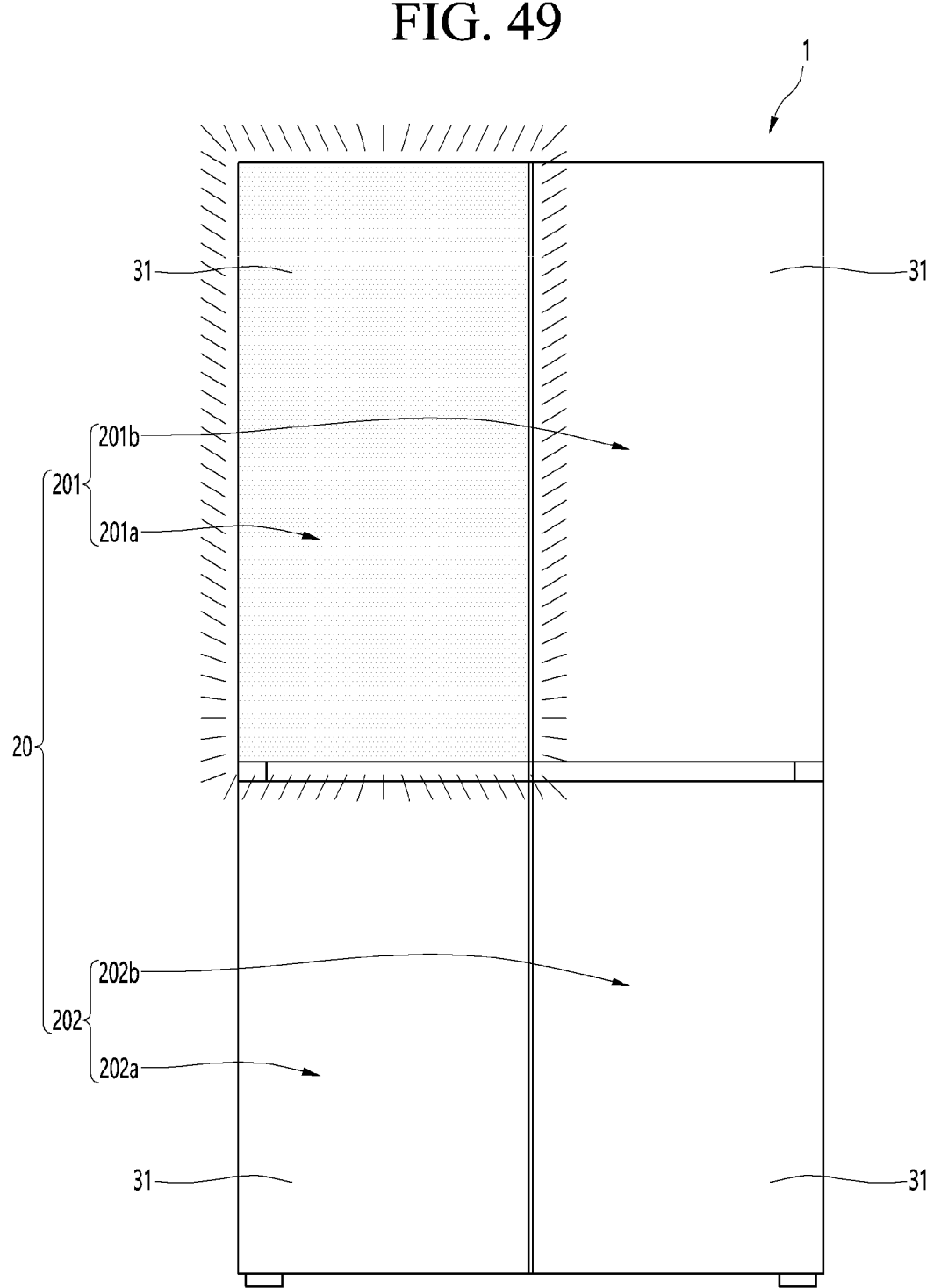
FIG. 49 is a front view showing a front appearance of a refrigerator in the state in which some of a plurality of doors emits light.
Figure 50:
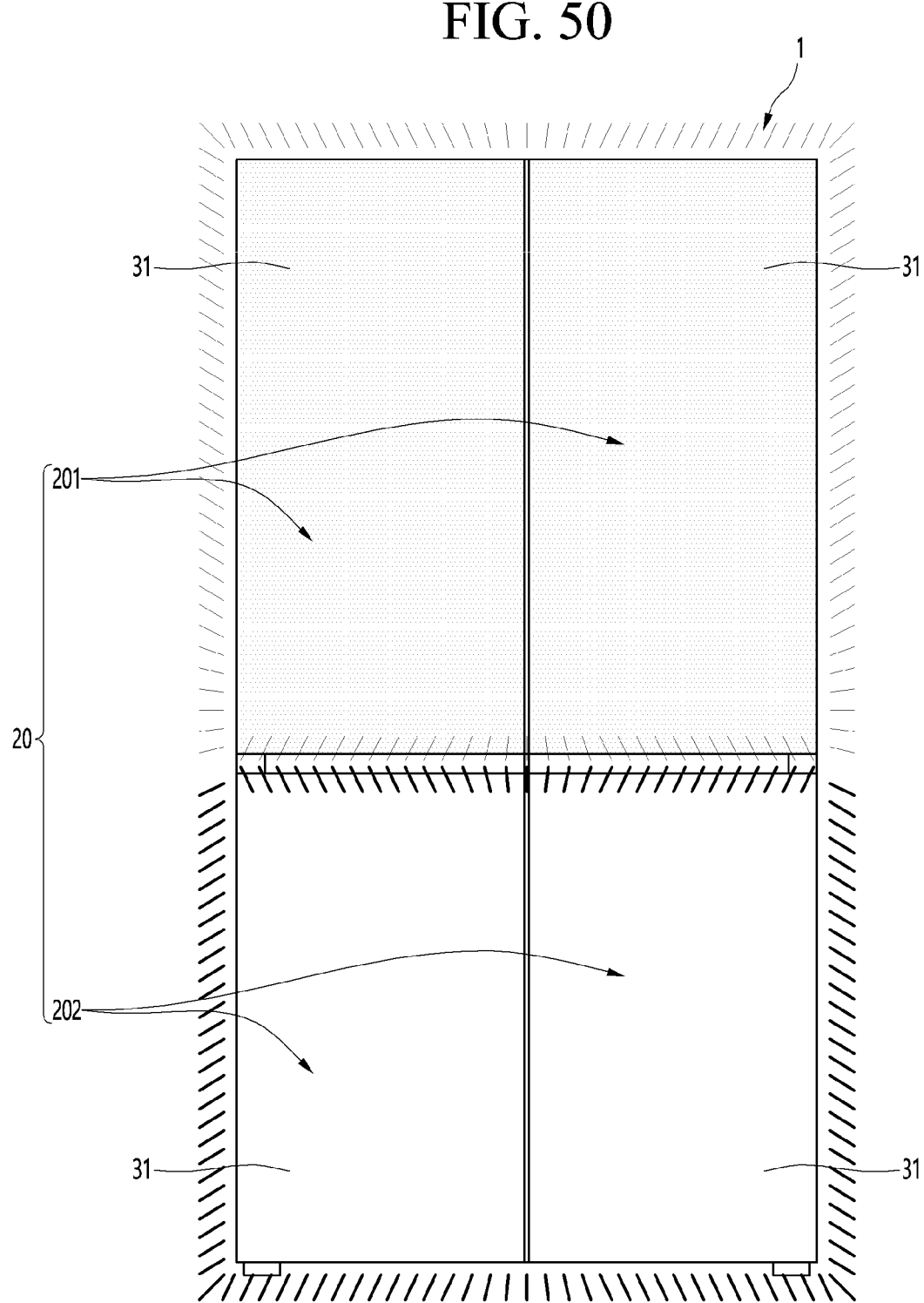
FIG. 50 is a front view showing a front appearance of a refrigerator in the state in which each of a refrigerating compartment door and a freezing compartment door emits light among the doors.

FIG. 46 is a front view showing a front appearance of a refrigerator in the state in which the lighting device is turned off. FIG. 47 is a front view showing a front appearance of a refrigerator in the state in which the lighting device is turned on. FIG. 48 is a front view showing a front appearance of a refrigerator in the state in which color of the lighting device is changed. FIG. 49 is a front view showing a front appearance of a refrigerator in the state in which some of a plurality of doors emits light. FIG. 50 is a front view showing a front appearance of a refrigerator in the state in which each of a refrigerating compartment door and a freezing compartment door emits light among the doors.

The lighting device 36 may be turned on to cause the front surface of the door 20 to glow brightly, and the front surface of the door 20 may glow with set color by light emitted from the plurality of light sources 362. In this case, the front color of the door 20 may be different color or brightness from in the state in which the lighting device 36 is turned off For example, as shown in FIG. 46, in the state in which the lighting device 36 is turned off, the front surface of the door may not glow and may be seen with original color of the panel assembly 30.

That is, the front color of the door 20 may be seen as color of the panel 31, and the texture and pattern formed on the panel 31 may be seen. In this case, the color of the panel 31 may be color with a brightness greater than 0 and may be formed in a color other than black. The color of the front surface of the door 20 in the state in which the lighting device 36 is turned may also be referred to as a first color.

Thus, the front surface of the door 20 may be seen with color of the panel 31, and in this case, components inside the panel assembly 30 may be seen through the panel 31 and may not be seen to the outside by the color of the panel 31.

In this state, the lighting device 36 may be turned on, and when the lighting device 36 is turned on, the front surface of the door 20 may glow with color set by the controller 13.

For example, as shown in FIG. 47, the controller 13 may instruct the front surface of the door 20 to glow with a second color different from the first color, and the lighting device 36 may cause the light source 362 to glow with the second color according to the instruction of the controller 13.

When the light source 362 glows with the second color, light of the second color may be transmitted through the front surface of the panel 31 by light reflected by the light guide plate 33, and the front surface of the door 20, that is, the front appearance of the refrigerator 1 may have the second color.

In the state in which the front appearance of the refrigerator 1 glows with the second color, when the controller 13 instructs change in color of the front surface of the refrigerator 1, and the front surface of the door 20 may glow with color that is reset by the controller 13.

For example, as shown in FIG. 48, the controller 13 may instruct the front surface of the door 20 to glow with a third color different from the first color and the second color, and the lighting device 36 may cause the light source 362 to glow with the third color according to the instruction of the controller 13.

When the light source 362 glows with the third color, light with the third color may be transmitted through the front surface of the panel 31 by light reflected by the light guide plate 33, and the front appearance of the front surface of the door 20, that is, front appearance of the refrigerator 1 may have the third color.

Some of the plurality of doors 20 forming the front appearance of the refrigerator 1 may emit light or the plurality of doors 20 may independently emit light to form the front appearance of the refrigerator 1 with set color.

For example, as shown in FIG. 49, the refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201a of the refrigerating compartment door 201 may glow. That is, the left refrigerating compartment door 201a among the left refrigerating compartment door 201a and the right refrigerating compartment door 201b may glow. Needless to say, any one of the freezing compartment doors 202 may glow.

As necessary, the left refrigerating compartment door 201a and the right refrigerating compartment door 201b may glow with different colors. At least two of the doors 20 may be sequentially changed in color and at least two of the doors 20 may be sequentially turned on or off In this case, the lighting device 36 included in the panel assembly 30 may be controlled by the controller 13 according to the aforementioned various conditions.

The refrigerating compartment door or the freezing compartment door among the doors may be controlled to glow with different colors.

For example, as shown in FIG. 50, the controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed.

Thus, through the front color of the door 20, the user may intuitively recognize an operation state of each storage space as well as may distinguish between the refrigeration compartment and the freezing compartment.

Hereinafter, a method of manufacturing a member according to an embodiment of the present disclosure will be described in more detail with reference to drawings.

Figure 51:
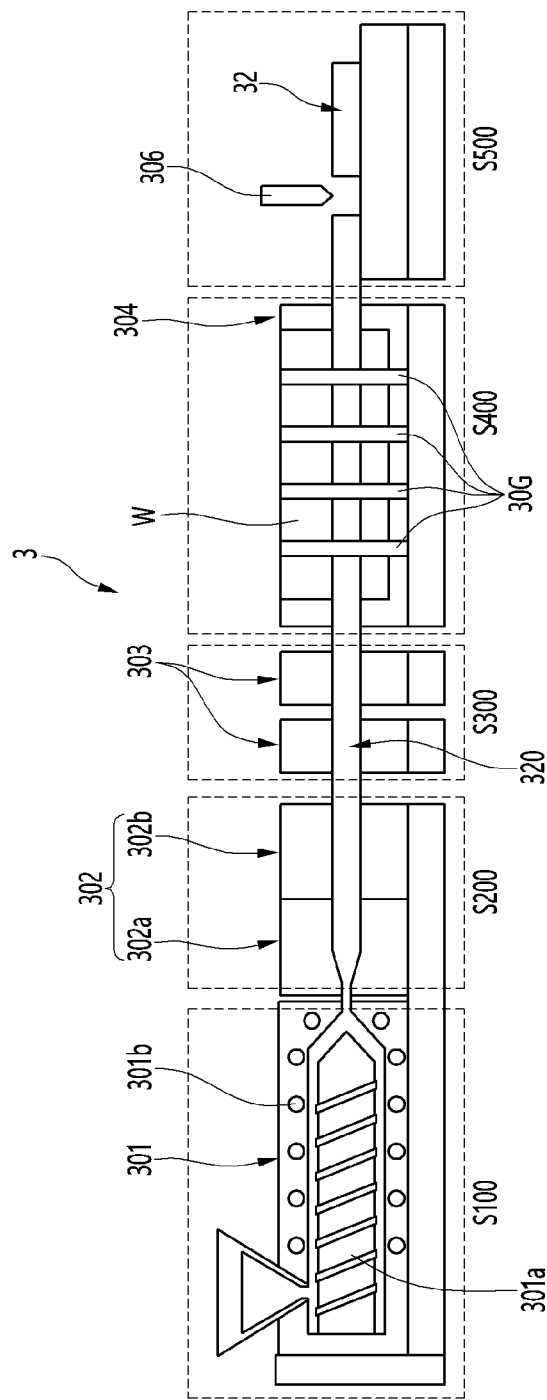
FIG. 51 is a schematic diagram showing an extrusion manufacturing method of a member according to an embodiment of the present disclosure.
Figure 52:
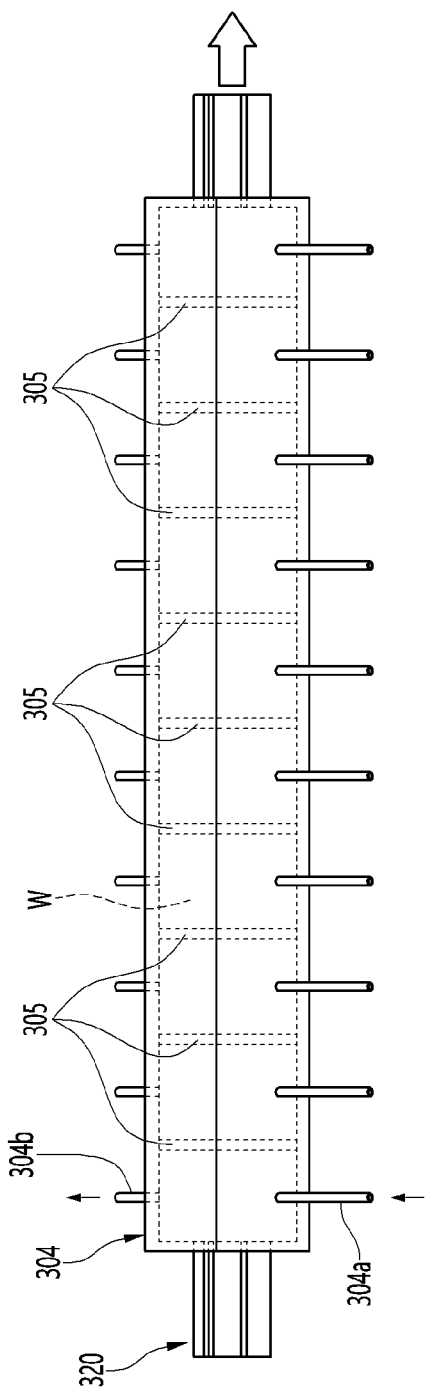
FIG. 52 is a schematic perspective view of a cooling device in the extrusion manufacturing method.
Figure 53:
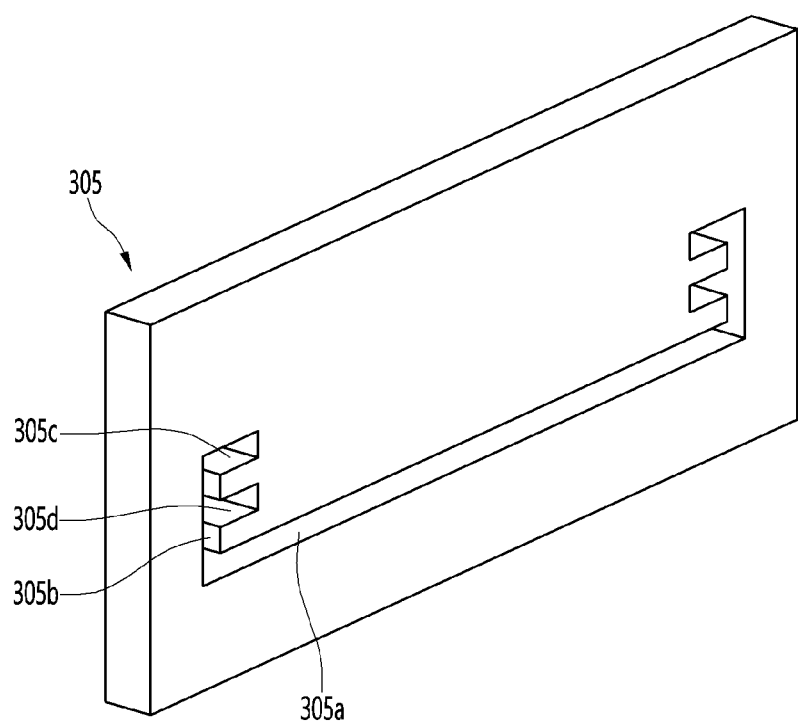
FIG. 53 is a perspective view of a shape of a cooling mold included in the cooling device.
Figure 54:
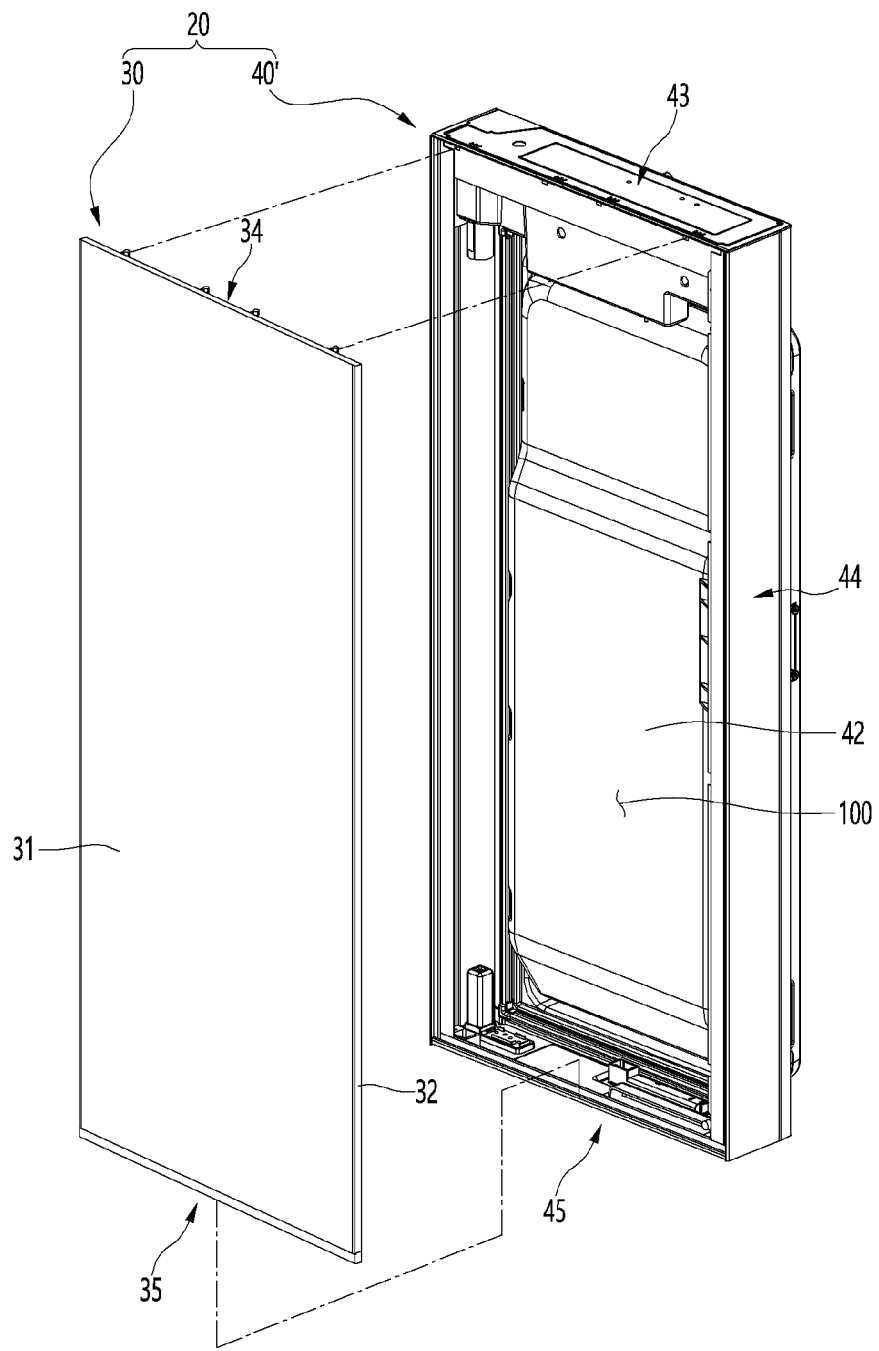
FIG. 54 is an exploded perspective view of a refrigerator door according to another embodiment of the present disclosure.

FIG. 51 is a schematic diagram showing an extrusion manufacturing method of a member according to an embodiment of the present disclosure. FIG. 52 is a schematic perspective view of a cooling device in the extrusion manufacturing method. FIG. 53 is a perspective view of a shape of a cooling mold included in the cooling device.

As shown in the drawings, the member 32 may be formed of an ABS material and may be formed by extrusion.

Needless to say, the member 32 may be formed by injection, but in the case of injection molding, the structure of the mold becomes complicated due to the shape of the side part 322 of the right and left side ends of the member 32, and thus productivity may be degraded.

In the member 32, the planarity of the front part 321 may be very important, and thus, when the planarity of the front part 321 does not satisfy a predetermined level, the light guide plate 33 or the panel 31 may interfere with the front part 321 or may be defected when being installed. In particular, in the case of a component forming the exterior of a home appliance, such as the door 20 of the refrigerator, many products may have a long vertical length or a large right and left width, and in this case, it may be difficult to achieve high planarity of the front part 321.

To overcome the problem, the member 32 may be extrusion-molded using an extrusion molding device 3 according to the embodiment. The member 32 may have a cross-sectional structure that facilitates extrusion molding due to the structures of the front part 321 and the side parts 322 at both sides of the front part 321.

A manufacturing method of the member 32 is now described. First, the extrusion molding device 3 for molding the member 32 may include a material feeding device 301, a primary mold 302a, a secondary mold 302b, a tertiary mold 303, a cooling device 304, and a cutting device 306.

In detail, a material for molding the member 32 may be fed to the material feeding device 301. In this case, the used material may be, for example, a transparent ABS material. The material feeding device 301 may include a screw 301a for moving the fed material, and a heater 301b for heating the material, and may continuously feed the material toward a mold after melting the material. [S100]

First, the melted material may be fed to the primary mold 302a through the material feeding device 301. A plurality of flow channels for feeding the material to mold the melted material into a wide plate shape may be formed on the primary mold 302a.

The secondary mold 302b may be placed consecutively with the primary mold 302a. Thus, the material uniformly distributed and fed through the primary mold 302a may be injected into the secondary mold 302b and may primarily form an overall shape of the outer appearance of the member 32 while passing through the secondary mold 302b.

That is, the shape of the inside of the secondary mold 302b may be entirely similar to the shape of a cross-sectional shape of the member 32, and shapes of the front part 321 and the side part 322 may be formed while the material passes through the secondary mold 302b.

The primary mold 302a and the secondary mold 302b may be in contact with each other, and the material passing through the primary mold 302a may be input to the secondary mold 302b to pass through the secondary mold 302b. Needless to say, as necessary, the primary mold 302a and the secondary mold 302b may also be formed as a single mold 302. [S200]

The material passing through the secondary mold 302b may pass through the tertiary mold 303 after being molded to have a similar basic shape and size to the member 32. The shape of the inside of the tertiary mold 303 may be close to the size and shape of the member 32 compared with the secondary mold 302b. Thus, a dimension of the material molded while passing through the tertiary mold 303 may be corrected and may be almost similar to a dimension of the member 32.

In this case, the tertiary mold 303 may be configured in a plural number, and a dimension of the material may be more precisely corrected while the material passes through the plurality of tertiary molds 303. Needless to say, as necessary, only one secondary mold 302b may be provided or two or more secondary molds 302b may be provided. According to the present embodiment, it may be possible to mold the member 32 having required precision by configuring the two tertiary molds 303. [S300]

The material molded while passing through the tertiary mold 303 may be cooled while passing through the cooling device 304. In this case, the inside of the cooling device 304 may be filled with cooling water W and may be in a vacuum state. A plurality of cooling molds 305 may be further provided inside the cooling device 304.

In detail, a water inlet 304a and a water outlet 304b may be connected to the cooling device 304, cooling water W may be injected into the cooling device 304 from the outside, and an extruded material 320 passing through the cooling device 304 may be cooled with the cooling water W filled in the cooling device 304.

In this case, the inside of the cooling device 304 in which the cooling water W is filled may be in a vacuum state. Thus, the extruded material 320 passing through the cooling device 304 may not deflect due to gravity, and thus it may be possible to minimize deformation of the material while the material passes through the cooling device. Needless to say, the vacuum state may not be an ideal vacuum state but may refer to the state in which gravity acts to a degree to minimize deformation of the extruded material 320 to satisfy the planarity of the member.

The plurality of cooling molds 305 may be provided inside the cooling device 304. The plurality of cooling molds 305 may be arranged along a moving direction of the extruded material 320. The cooling mold 305 may partition the inside of the cooling device 304, and the water inlet 304*a* and the water outlet 304*b* may be connected to the cooling mold 305 to inject and discharge the cooling water W to and from each partitioned space.

The extruded material 320 moving along the cooling device 304 may sequentially pass through the plurality of cooling molds 305. A dimension of the extruded material 320 may be precisely corrected again while the extruded material 320 passes through the cooling molds 305, and when the extruded material 320 passes through the lastly placed cooling mold 305 among the plurality of cooling molds 305, the extruded material 320 may be molded with the same dimension as the dimension of the last member 32.

The cooling mold 305 may be formed in a plate shape with a predetermined thickness, and an opening may be formed in the cooling mold 305 to have a shape corresponding to a cross-sectional shape of the member 32. Thus, a dimension of the extruded material 320 may be corrected while the extruded material 320 passes through the opening.

The opening may be formed to correspond to the dimension and shape of the member 32. That is, the opening may include a front part opening 305*a* forming the front part 321, and a first part opening 305*b*, a second part opening 305*c*, and a third part opening 305*d* that form a first part 322*a*, the third extension 322*b*, and the second extension 323 of the side part 322. Thus, when passing through all the plurality of cooling molds 305, the extruded material 320 may have the same cross-sectional shape as the member 32.

The plurality of cooling molds 305 may be consecutively arranged in parallel to each other, and the plurality of cooling molds 305 may be formed with the same shape. Thus, the extruded material 320 inside the cooling device 304 may be supported by the plurality of cooling molds 305, and thus, it may be possible to prevent deflection of the extruded material 320 and to further prevent deformation thereof. Thus, the number of the cooling molds 305 may be determined to satisfy an interval of a degree in which deformation of the extruded material 320 does not occur within the cooling device 304.

Since the extruded material 320 passing through the tertiary mold 303 passes through the cooling mold 305, the cooling mold 305 may be referred to as a quaternary mold, and since the cooling mold 305 is formed in a plate shape and is supported within the cooling device 304 to prevent the extruded material 320 from being deformed, the cooling mold 305 may also be referred to as a disk or a support disk. [S400]

The extruded material 320 passing through the cooling device 304 may have the same cross-sectional shape as the member 32, and the extruded material 320 may be cooled while passing through the cooling device 304 and the shape of the extruded material 320 may be completed actually.

The extruded material 320 passing through the cooling device 304 may be cut to a length corresponding to one member 32 by the cutting device 306. Thus, the member 32 may be continuously molded.

As necessary, a cut surface cut by the cutting device 306 may be further processed or a part of the upper and lower ends of the side part 322 may be further cut.

The member 32 cut by the cutting device 306 may be completely molded and may be ready to be used for assembling the panel assembly 30. [S500]

There may be various other embodiments other than the aforementioned embodiments. According to another embodiment of the present disclosure, the panel assembly may be shield an open front surface of the door body. Another embodiment of the present disclosure may have the same structure as the aforementioned embodiment except for some components of the door body, and thus the same components as in the aforementioned embodiment use the same reference numeral, and a detailed description thereof may be omitted.

Hereinafter, another embodiment of the present disclosure will be described with reference drawings.

FIG. 43 is an exploded perspective view of a refrigerator door according to another embodiment of the present disclosure.

As shown in the drawing, the door 20 of the refrigerator according to another embodiment of the present disclosure may include the panel assembly 30 and a door body 40'. The panel assembly 30 may be coupled to the door body 40' to form a front surface of the door 20.

The overall structure of the panel assembly 30 may be the same as the aforementioned embodiment. That is, the panel assembly 30 may include the panel 31, the member 32, the light guide plate 33, the upper bracket 34, the lower bracket 35, the lighting device 36, the right supporter 37, and the back cover 39, which are the same as those of the aforementioned embodiment, and thus a detailed description thereof will be omitted and may refer to the drawings of the aforementioned embodiments.

The door body 40' may include the door liner 42 forming a bottom surface of the door 20, the upper cap deco 43 disposed on upper and lower ends of the door liner 42, and the side deco 44 disposed on right and left side ends of the door liner 42. The upper cap deco 43 and the lower cap deco 45 may form upper and lower surfaces of the door 20, and the side deco 44 may form right and left side surfaces of the door 20.

In the state in which the door liner 42, the upper cap deco 43, the lower cap deco 45, and the side deco 44 are coupled to each other, a body space 100 with an open front surface may be formed. The body space 100 may be shielded by the panel assembly 30.

That is, the panel assembly 30 may be coupled to the upper cap deco 43, the lower cap deco 45, and a front end of the side deco 44, and a space in which an insulator is filled may be formed with the door liner 42 inside the door 20.

In the state in which the panel assembly 30 and the door body 40' are coupled to each other, an insulator may be filled in the door 20, and the insulating capability of the door 20 may be satisfied by filling the insulator in the body space 100.

In the state in which the door 20 is completely assembled, a bottom surface of the panel assembly 30, i.e., a rear surface of the back cover 39 may be in contact with the insulator. Thus, the insulator may not penetrate into a space inside the panel assembly 30 and may be protected by the back cover 39. The rear surface of the back cover 39 may be in contact with the insulator, and the panel assembly 30 may be firmly fixed to the door 20.

There may be various other embodiments other than the aforementioned embodiments. According to another embodiment of the present disclosure, the storage space may be partitioned into right and left sides, and the door includes a refrigerating compartment door and a freezing compartment door at right and left sides. Another embodiment of the present disclosure may have the same structure as the aforementioned embodiment except for arrangement of a storage space and a door, and thus the same components as in the aforementioned embodiment use the same reference numeral, and a detailed description thereof may be omitted.

Hereinafter, another embodiment of the present disclosure will be described with reference drawings.

Figure 55:
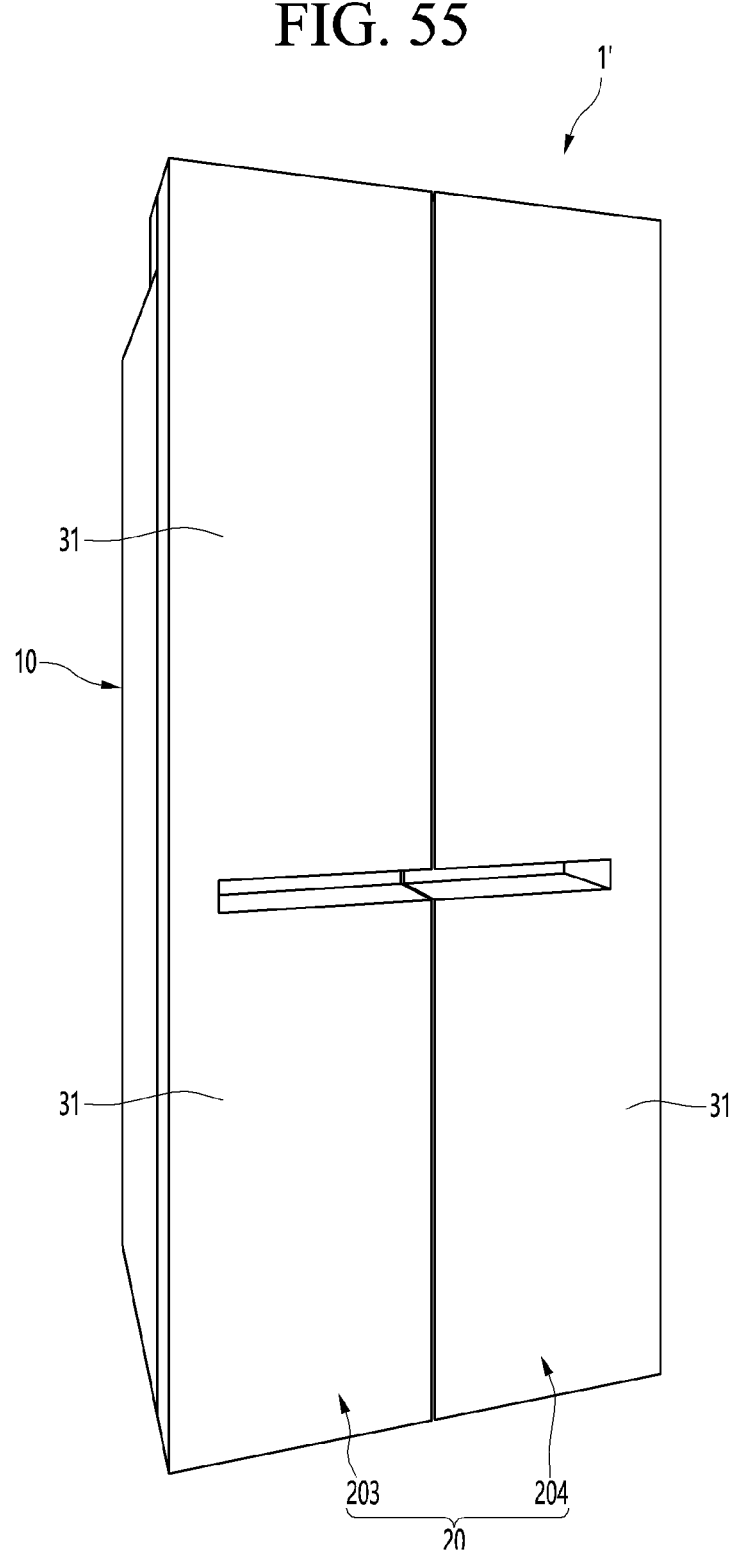
FIG. 55 is a perspective view of a refrigerator according to another embodiment of the present disclosure.
Figure 56:
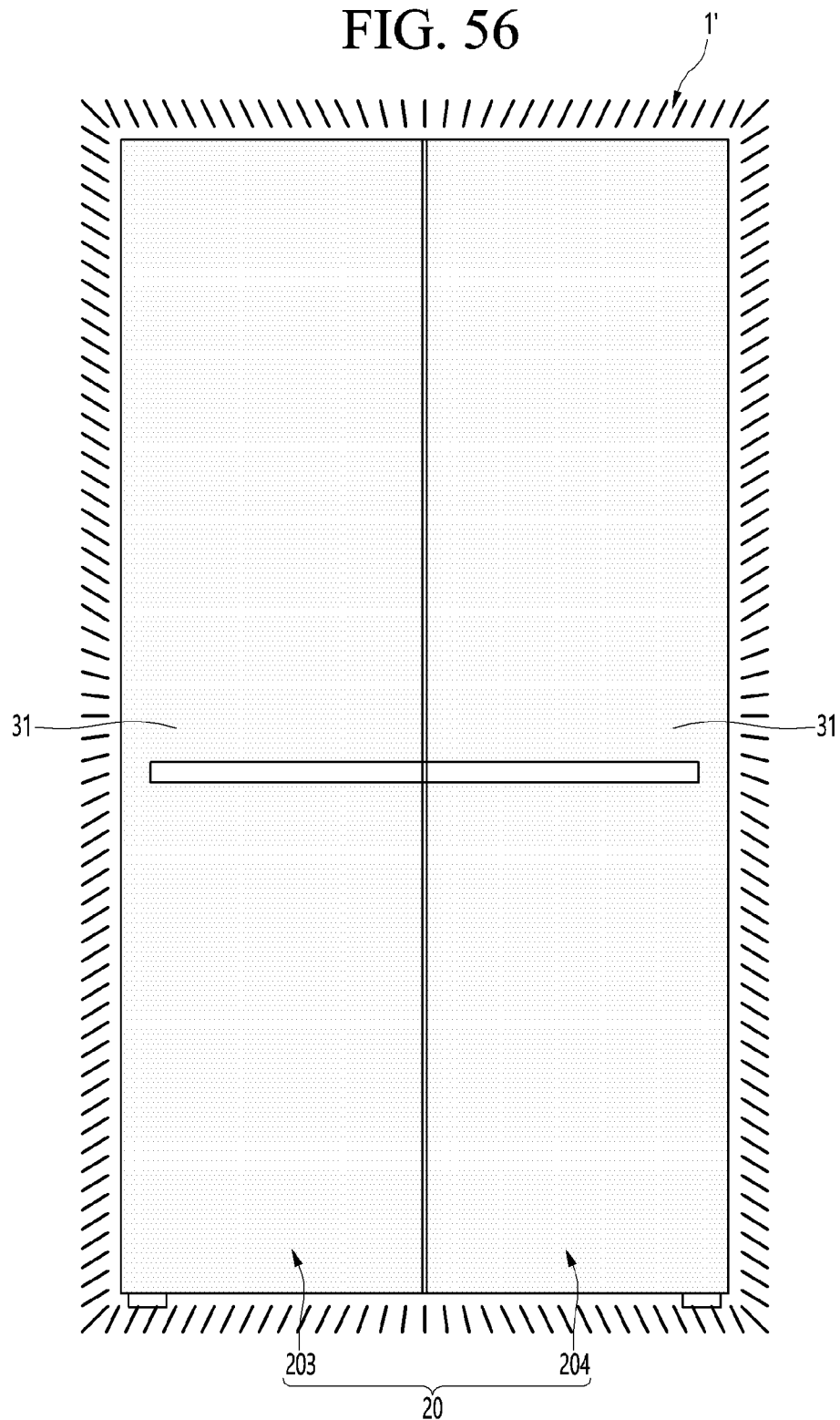

FIG. 55 is a perspective view of a refrigerator according to another embodiment of the present disclosure. FIG. 56 is a front view of a front appearance of a refrigerator in the state in which a lighting device of the refrigerator is turned on.

As shown in the drawings, an outer appearance of a refrigerator 1' according to another embodiment of the present disclosure may be formed by the cabinet 10 in which a storage space is formed, and the door 20 for opening and closing an open front surface of the cabinet 10.

The cabinet 10 may be divided into right and left sides. Although not shown, a left space of the cabinet 10 may be configured by a freezing compartment, and a right space of the cabinet 10 may be configured by a refrigerating compartment.

The door 20 may include a freezing compartment door 203 for opening and closing the freezing compartment and a refrigerating compartment door 204 for opening and closing the refrigerating compartment. The freezing compartment door 203 and the refrigerating compartment door 204 may be arranged in parallel to each other at right and left sides, and the refrigerating compartment and the freezing compartment may be configured to be opened and closed via rotation.

In the state in which the door 20 is closed, a front appearance of the refrigerator 1' may be formed by the door 20. The door 20 may include the door body 40 and the panel assembly 30. A detailed structure of the door 20 may be the same as the aforementioned embodiment and may be different therefrom except for the size and arrangement thereof, and thus a detailed description or illustration thereof may be omitted, and unexplained reference numerals in the drawings may refer to the aforementioned embodiment.

Color of the panel assembly 30 may be determined by the panel 31 configuring the front surface of the panel assembly 30. Thus, in the state in which the lighting device is turned off, the front appearance of the refrigerator 1' may be formed by color of the panel itself.

When the lighting device 36 is turned on under control of the controller 13, light emitted by the lighting device 36 may be seen through the panel 31 to change the panel 31 in color or brightness. In this case, under control of the controller 13, the lighting device 36 may emit light with various colors, and the panel 31 may be changed to various colors to glow. That is, in the state in which the door 20 is maintained to be assembled and mounted, color or brightness of the front appearance of the refrigerator 1' may be changed resulting in change in the front appearance.

As necessary, the refrigerating compartment door 204 and the freezing compartment door 203 may glow with different colors, and the refrigerating compartment door 204 and the freezing compartment door 203 may glow with color selected to harmonize with surrounding furniture or an installation environment to harmonize with a surrounding environment. When an installation or usage environment or a usage condition is change, the front appearance of the refrigerator 1' may be freely changed according to the change.

There may be various other embodiments other than the aforementioned embodiments. According to another embodiment of the present disclosure, a panel assembly forming the exterior may be applied to other home appliances other than a refrigerator to change color of an outer appearance of the home appliance. Another embodiment of the present disclosure may have the same structure as the aforementioned embodiment except for the size and shape of a panel and an application target of the panel, and thus the same components as in the aforementioned embodiment use the same reference numeral, and a detailed description thereof may be omitted.

The following embodiments are the same as the aforementioned embodiments in terms of components of a panel assembly, and thus for detailed components, reference may be made to the description and drawings of the aforementioned embodiment, and a detailed description thereof is omitted to avoid repetition.

Hereinafter, another embodiment of the present disclosure will be described with reference drawings.

Figure 57:
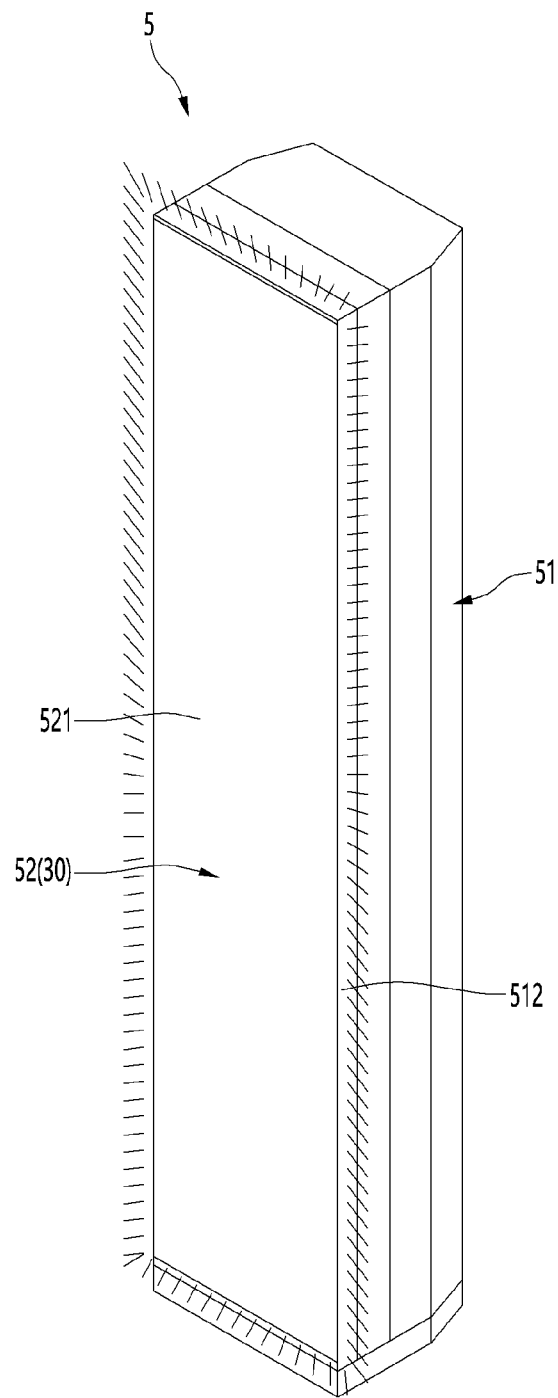
FIG. 57 is a perspective view of an indoor unit of an air conditioner according to another embodiment of the present disclosure.
Figure 58:
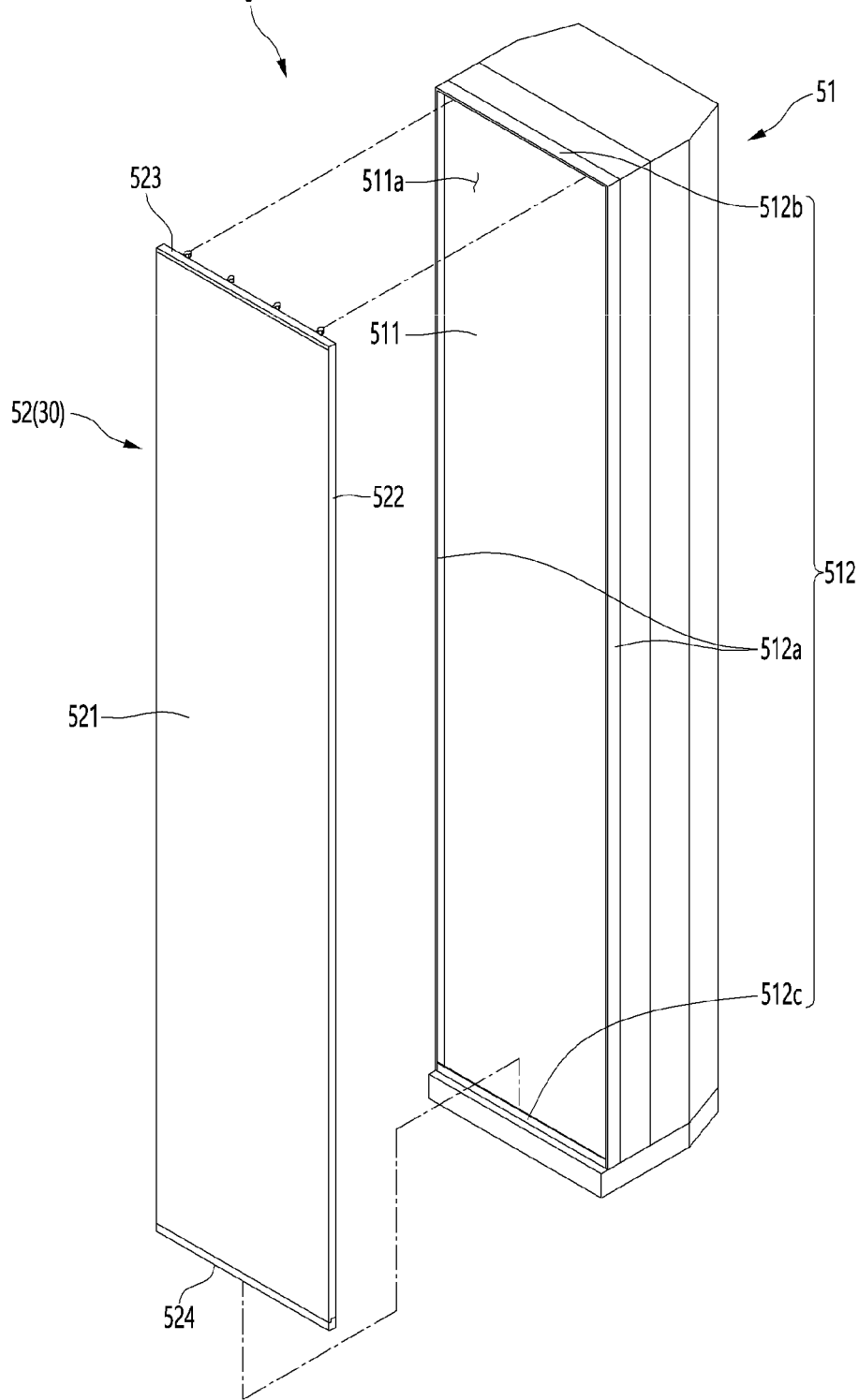
FIG. 58 is an exploded perspective view showing a dissembled panel assembly of the indoor unit.

FIG. 57 is a perspective view of an indoor unit of an air conditioner according to another embodiment of the present disclosure. FIG. 58 is an exploded perspective view showing a dissembled panel assembly of the indoor unit.

As shown in the drawings, an indoor unit 5 of the air conditioner according to another embodiment of the present disclosure may include a case 51 forming an outer shape, and a panel assembly 52 mounted on a front surface of the case 51 to form a front appearance of the indoor unit 5.

Although not shown in detail, in general, the case 51 may accommodate therein components making up a refrigeration cycle as well as a heat exchanger and a blower fan, and an absorption port for absorbing indoor air and a discharge port for discharging heat-exchanged air into a room may be formed at one side of the case 51.

A case border 512 may be formed at a perimeter of a case front surface 511. The case border 512 may be formed to correspond to a shape of the panel assembly 52 and may protrude forward from the case front surface 511 to form a panel accommodation space 511*a* for accommodating the panel assembly 52 therein.

The case border 512 may include one pair of side borders 512*a* forming both side surfaces, an upper border 512*b* for connecting upper ends of the pair of side borders 512*a*, and a lower border 512*c* for connecting lower ends of the pair of side borders 512*a*.

The panel assembly 52 may form a front appearance of the indoor unit 5 and may be accommodated on an internal surface of the panel receiving space 410. A perimeter surface of the panel assembly 52 may be supported by the case border 512. In particular, a lower end of the panel assembly 52 may be caught and restrained by the lower border 512*c*, and an upper end of the panel assembly 52 may be coupled to the upper border 512*b* to fixedly mount the panel assembly 52 on the front surface of the case 51.

The panel assembly 52 may have the same structure as the panel assembly 30 according to the aforementioned embodiment, and thus the front surface of the panel assembly 52 may glow with various colors under control of the controller 13.

The panel assembly 52 may include a panel 521 forming a front surface, a member 522 on which the panel 521 is mounted, an upper bracket 523 mounted on an upper end of the member 522 to form an upper surface of the panel assembly 52, and a lower bracket 524 mounted on a lower end of the member 522 to form a lower surface of the panel assembly 52.

Although not shown, the light guide plate 33 may be mounted on the member 522, and the lighting device 36 for emitting light to the light guide plate 33 may be provided on the lower bracket 524. The back cover 39 may be provided on a rear surface of the panel assembly 52.

As shown in FIG. 57, in the indoor unit 5 as configured above, when the lighting device 36 is turned on, the entire panel 521 may glow due to light emitted from the lighting device 36, and the front appearance of the indoor unit 5 may be formed by color corresponding to the color of the light emitted from the lighting device 36.

An operation of the lighting device 36 may be controlled according to control of the controller 13. Thus, the panel 521 may glow with various colors, and thus the front appearance of the indoor unit 5 may also correspond to various colors.

That is, outer color of the front surface of the indoor unit 5 may be freely changed under control of the lighting device 36 in the state in which the panel assembly 52 is maintained to be assembled and mounted without replacement of the panel assembly 52. Thus, the outer appearance of the indoor unit 5 may be changed according to surrounding furniture or environments, and according to an operation state of the indoor unit 5, the operation state may be intuitively represented by changing the outer appearance of the indoor unit 5.

Figure 59:
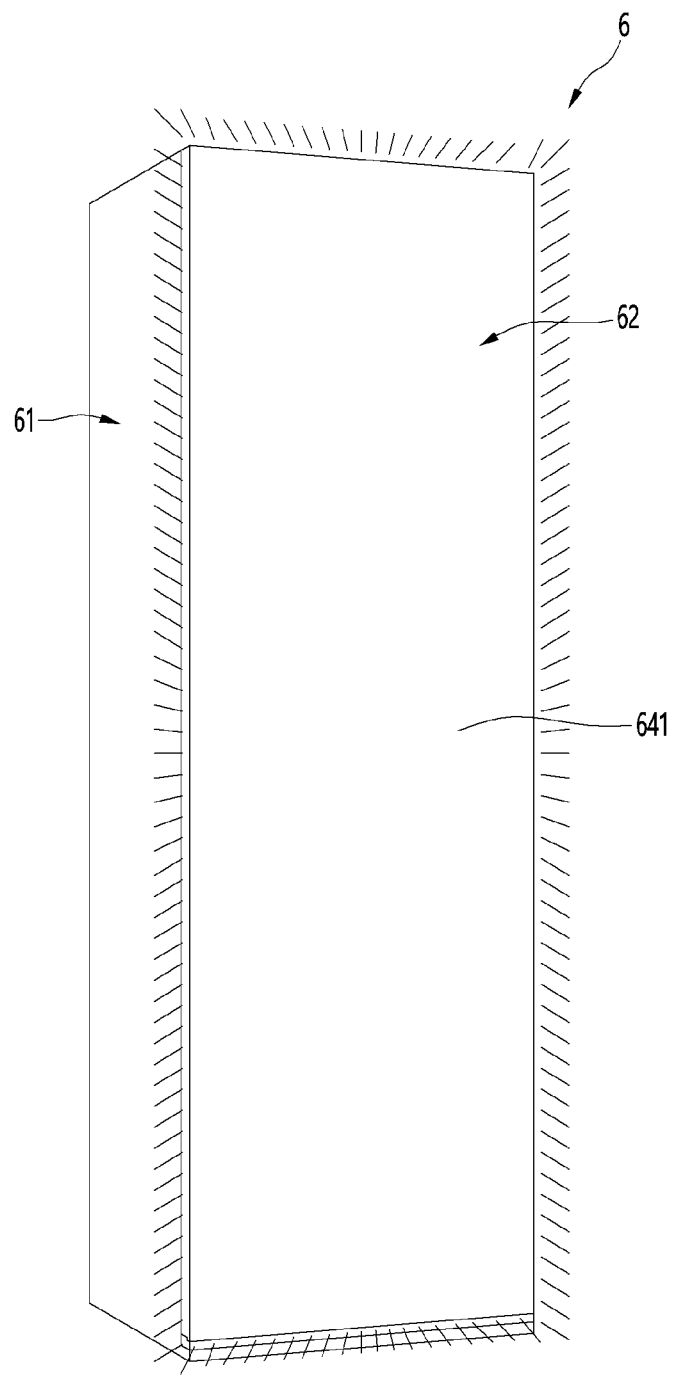
FIG. 59 is a perspective view of a clothing manager according to another embodiment of the present disclosure.
Figure 60:
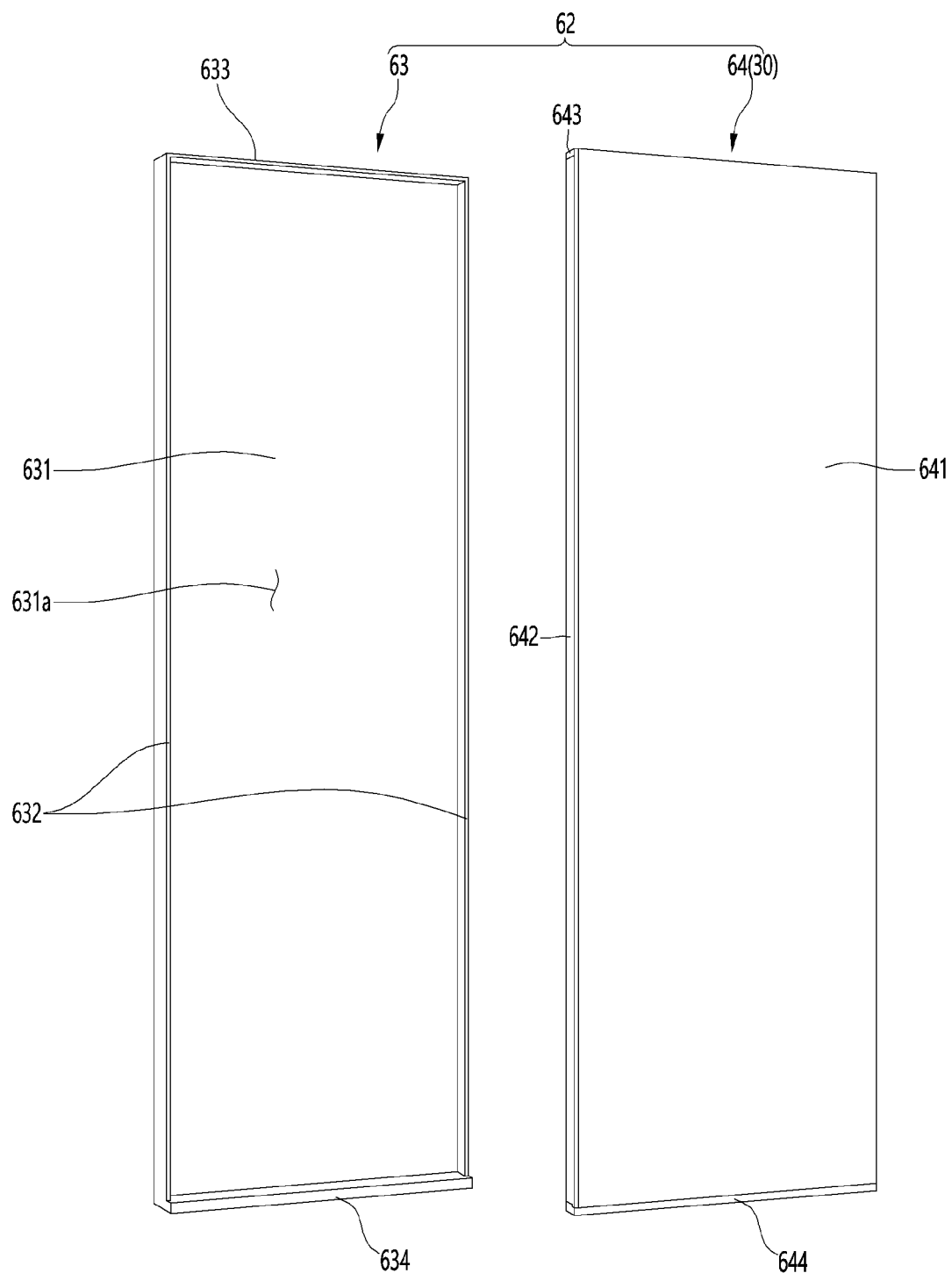
FIG. 60 is an exploded perspective view of a door of the clothing manager.

FIG. 59 is a perspective view of a clothing manager according to another embodiment of the present disclosure. FIG. 60 is an exploded perspective view of a door of the clothing manager.

As shown in the drawings, an outer appearance of a clothing manager 6 according to another embodiment of the present disclosure may be formed by a case 61 forming a clothing accommodation space, and a door 62 for opening and closing an open front surface of the case 61.

Although not shown in detail, in general, the case 61 may include a clothing accommodation space for accommodating clothing, and a heat pump, a water tank, a steam generator, and an air circulation fan may be provided within a machine room separately formed from the clothing accommodation space.

A discharge port for discharging steam generated from the steam generator and dried air heated by the heat pump, and an absorption port for absorbing air from the clothing accommodation space may be formed inside the clothing accommodation space.

The door 62 may be rotatably mounted on the case 61, and in the state in which the door 62 is closed, the door 62 may form a front appearance of the clothing manager 6. The door 62 may include a door body 63 for opening and closing the clothing accommodation space, and a panel assembly 64 mounted on the door body 63 to form a front surface of the door 62.

A body plate 631 may be provided on a front surface of the door body 63 to form a front surface of the door body 63. A side deco 632 extending in a vertical direction may be provided along right and left side ends of the door body 63, and right and left side surfaces of the door body 63 may be formed by the side deco 632. An upper surface of the door body 63 may be formed by an upper cap deco 633 for connecting upper ends of the side deco 632 at right and left sides, and a lower surface of the door body 63 may be formed by a lower cap deco 634 for connecting lower ends of the side deco 632 at right and left sides.

The side deco 632, the upper cap deco 633, and the lower cap deco 634 may protrude compared with the front surface of the body plate 631, and a panel accommodation space 631a in which the panel assembly 64 is accommodated may be formed in front of the body plate 631.

A lower end of the panel assembly 64 may be inserted into the lower cap deco 634, and an upper end of the panel assembly 64 may be coupled to the upper cap deco 633 to be fixedly mounted inside the panel accommodation space 631a. A perimeter of the panel assembly 64 may be supported by the side deco 632, the upper cap deco 633, and the lower cap deco 634.

The panel assembly 64 may have the same structure as the panel assembly 30 according to the aforementioned embodiment, and thus the front surface of the panel assembly 64 may glow with various colors under control of the controller 13.

The panel assembly 64 may include a panel 541 forming a front surface thereof, a member 642 on which the panel 541 is mounted, an upper bracket 643 mounted on an upper end of the member 642 to form an upper surface of the panel assembly 64, and a lower bracket 644 mounted on a lower end of the member 642 to form a lower surface of the panel assembly 64.

Although not shown, the light guide plate 33 may be mounted on the member 642, and the lighting device 36 for emitting light to the light guide plate 33 may be provided on the lower bracket 644. The back cover 39 may be provided on a rear surface of the panel assembly 64.

As shown in FIG. 59, in the clothing manager 6 as configured above, when the lighting device 36 is turned on, the entire panel 541 may glow due to light emitted from the lighting device 36, and the front appearance of the clothing manager 6 may be formed by color corresponding to the color of the light emitted from the lighting device 36.

An operation of the lighting device 36 may be controlled according to control of the controller 13. Thus, the panel 541 may glow with various colors, and thus the front appearance of the clothing manager 6 may also correspond to various colors.

That is, outer color of the front surface of the clothing manager 6 may be freely changed under control of the lighting device 36 in the state in which the panel assembly 64 is maintained to be assembled and mounted without replacement of the panel assembly 64. Thus, the outer appearance of the clothing manager 6 may be changed according to surrounding furniture or environments, and according to an operation state of the clothing manager 6, the operation state may be intuitively represented by changing the outer appearance of the clothing manager 6.

Figure 61:
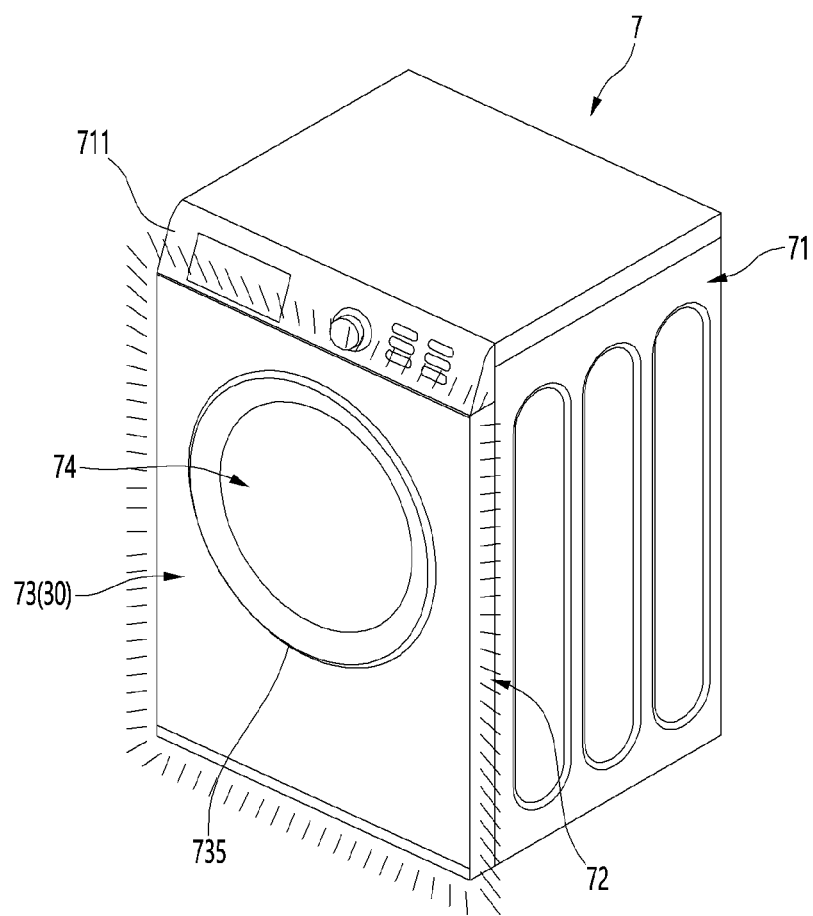
FIG. 61 is a perspective view of a washer according to another embodiment of the present disclosure.
Figure 62:
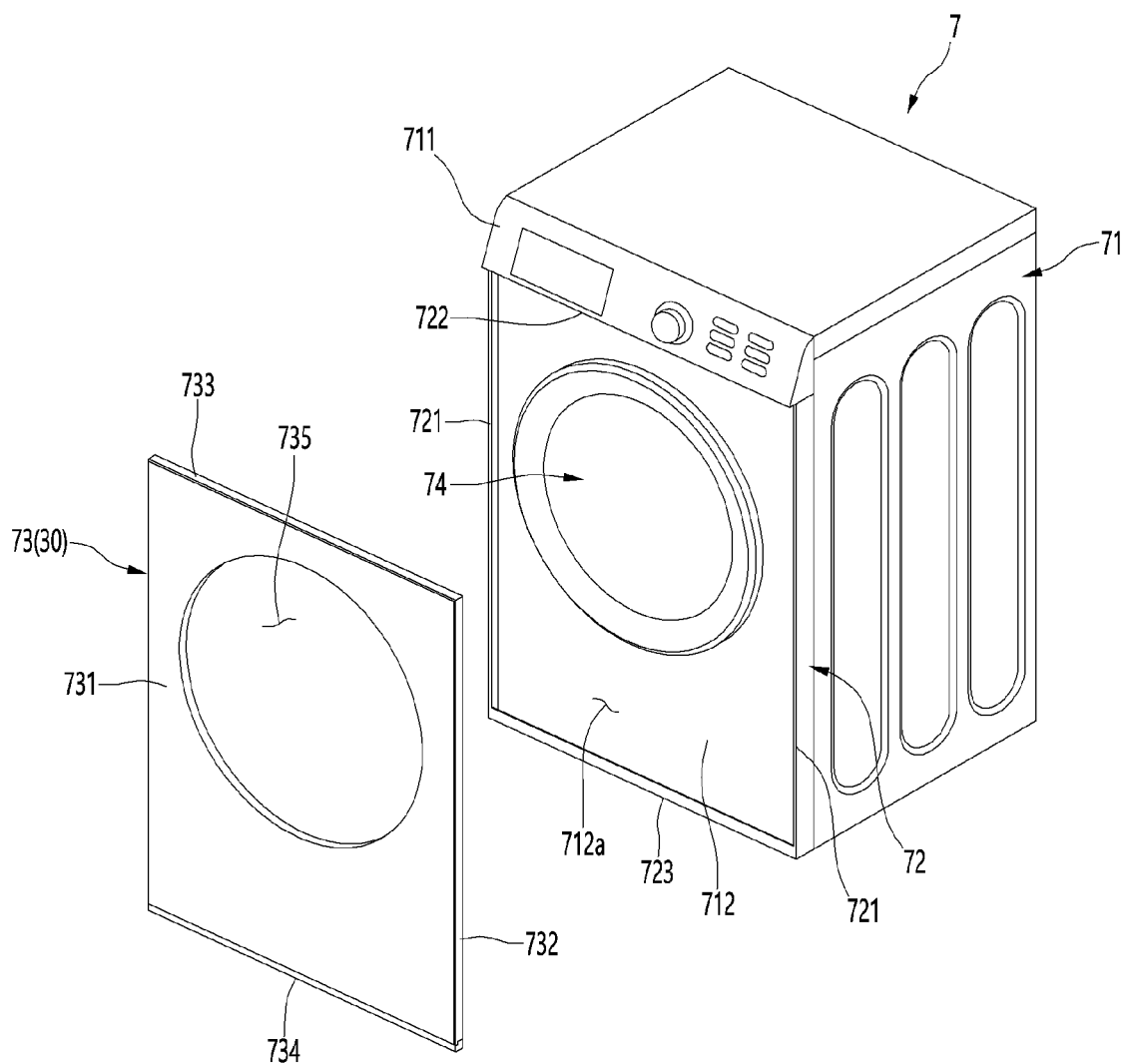
FIG. 62 is an exploded perspective view of a dissembled panel assembly of the washer.

FIG. 61 is a perspective view of a washer according to another embodiment of the present disclosure. FIG. 62 is an exploded perspective view of a dissembled panel assembly of the washer.

As shown in the drawings, a washer 7 according to another embodiment of the present disclosure may include a case 71 forming an outer shape, and a panel assembly 73 mounted on a front surface of the case 71 to form a front appearance of the washer 7.

Although not shown in detail, in general, the case 71 may accommodate therein a drum and a tub that accommodate laundry therein, and a motor for rotation of the drum, and an opening connected to the drum may be formed in a front surface of the case 71.

A manipulator 711 for manipulating an operation of the washer 7 may be formed on an upper end of a front surface of the case 71. The manipulator 711 may include a plurality of buttons or knobs and may include a display.

A door 74 for opening and closing the opening may be mounted on the front surface of the case 71. The door 74 may be rotatably mounted, and in the state in which the door 74 is closed, the drum may be formed to see the inside of the drum.

A case border 72 may be formed on a perimeter of a case front surface 712. The case border 72 may be formed to correspond to a shape of the panel assembly 73 and may protrude forward from the case front surface 712 to form a panel accommodation space 712a in which the panel assembly 73 is accommodated.

The case border 72 may include one pair of side borders 721 forming both side surfaces, an upper border 722 for connecting upper ends of the pair of side borders 721, and a lower border 723 for connecting lower ends of the pair of side borders 721.

The panel assembly 73 may form a front appearance of the washer 7 and may be mounted inside the panel accommodation space 712a. A perimeter surface of the panel assembly 73 may be supported by the case border 72. In particular, a lower end of the panel assembly 73 may be caught and restrained by the lower border 723, and an upper end of the panel assembly 73 may be coupled to the upper border 722 to fixedly mount the panel assembly 73 on the front surface of the case 71.

A panel opening 735 may be formed in the panel assembly 73. The panel opening 735 may be formed with a size corresponding the door 74, and the panel opening 735 may be formed through the door 74 when the panel assembly 73. Thus, the front surface of the door 74 may be exposed through the panel assembly 73 when the panel assembly 73 is mounted.

The panel assembly 73 may have the same structure except for the panel opening 735 compared with the panel assembly 30 according to the aforementioned embodiment, and thus the front surface of the panel assembly 73 may glow with various colors under control of the controller 13.

The panel assembly 73 may include a panel 731 forming a front surface, a member 732 on which the panel 731 is mounted, an upper bracket 733 mounted on an upper end of the member 732 to form an upper surface of the panel assembly 73, and a lower bracket 734 mounted on a lower end of the member 732 to form a lower surface of the panel assembly 73.

Although not shown, the light guide plate 33 may be mounted on the member 732, and the lighting device 36 for emitting light to the light guide plate 33 may be provided on the lower bracket 734. The back cover 39 may be provided on a rear surface of the panel assembly 73.

As shown in FIG. 61, in the washer 7 as configured above, when the lighting device 36 is turned on, the entire panel 731 may glow due to light emitted from the lighting device 36, and the front appearance of the washer 7 may be formed by color corresponding to the color of the light emitted from the lighting device 36.

An operation of the lighting device 36 may be controlled according to control of the controller 13. Thus, the panel 731 may glow with various colors, and thus the front appearance of the washer 7 may also correspond to various colors.

That is, color of the front appearance of the washer 7 may be freely changed under control of the lighting device 36 in the state in which the panel assembly 73 is maintained to be assembled and mounted without replacement of the panel assembly 73. Thus, the outer appearance of the washer 7 may be changed according to surrounding furniture or environments, and according to an operation state of the washer 7, the operation state may be intuitively represented by changing the outer appearance of the washer 7.

Although not shown, a drier having the same structure of the outer appearance of the washer 7 may also have the same structure of the panel assembly thereof. A structure configured by the drier and the washer are vertically stacked and a structure configured by disposing the drier and the washer in one case may also have the same panel assembly.

Figure 63:
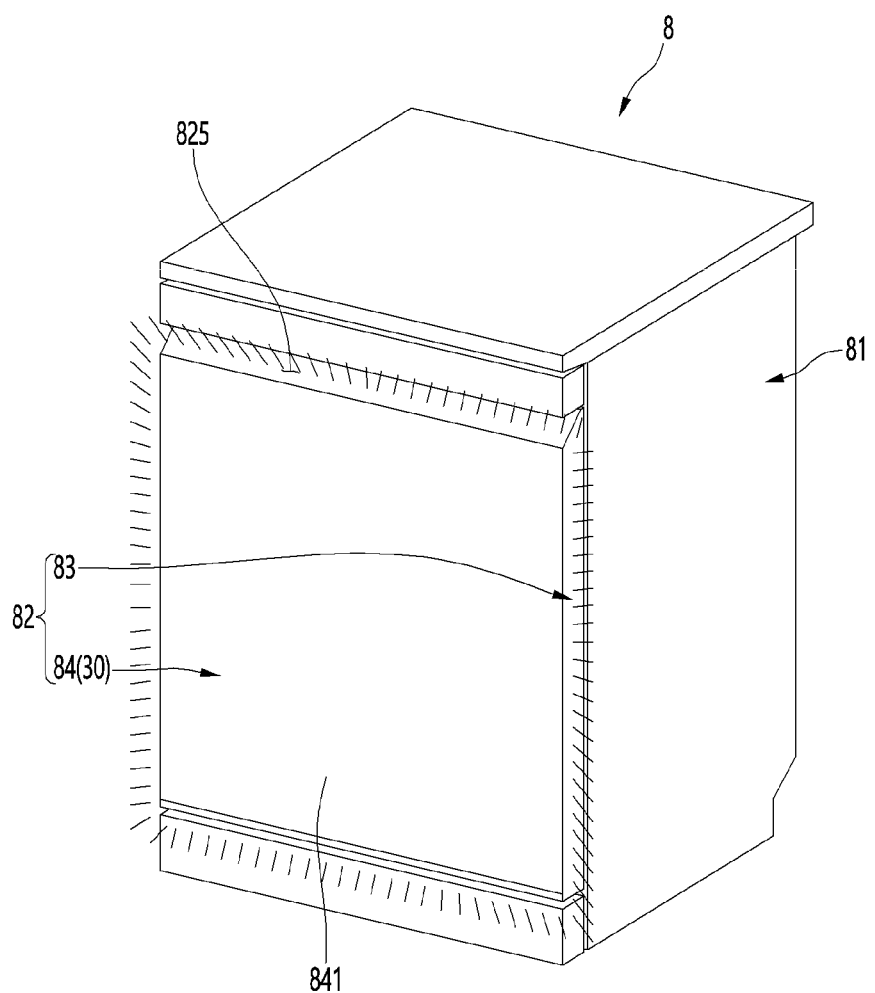
FIG. 63 is a perspective view of a dish washer according to another embodiment of the present disclosure.
Figure 64:
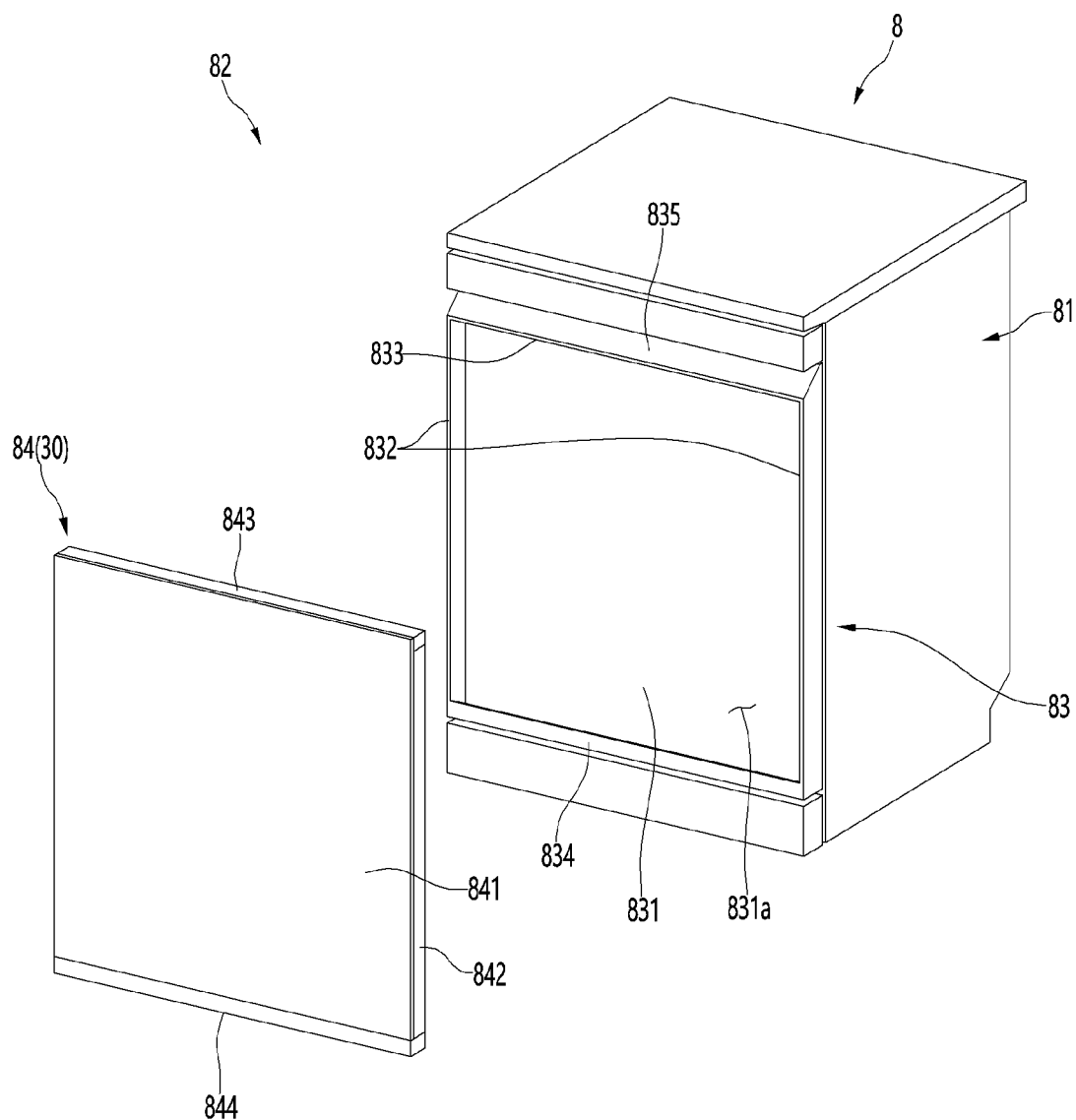
FIG. 64 is an exploded perspective view of a door of the dish washer.

FIG. 63 is a perspective view of a dish washer according to another embodiment of the present disclosure. FIG. 64 is an exploded perspective view of a door of the dish washer.

As shown in the drawings, an outer appearance of a dish washer 8 according to another embodiment of the present disclosure may be formed by a case 81 forming a space for accommodating and washing dishes, and a door 82 for opening and closing an open front surface of the case 81.

Although not shown in detail, in general, a washing space may be formed inside the case 81, and a rack which is to be drawn in and out and on which dishes are accommodated, a nozzle for spraying water for washing dishes, and a pump and water tank for supplying washing water may be provided within the washing space.

A lower end of the door 82 may be rotatably mounted on the case 81, and in the state in which the door 82 is closed, the door 82 may form the front appearance of a dish washer 8. The door 82 may include a door body 83 for opening and closing the washing space, and a panel assembly 84 mounted on the door body 83 to form a front surface of the door 82.

A body plate 831 may be provided on a front surface of the door body 83 to form a front surface of the door body 83. A side deco 832 extending in a vertical direction may be provided along right and left side ends of the door body 83, and right and left side surfaces of the door body 83 may be formed by the side deco 832. An upper cap deco 833 for connecting upper ends of the side deco 832 at right and left sides, and a lower cap deco 834 for connecting lower ends of the side deco 832 at right and left sides may be provided.

A handle 835 for manipulation to open and close the door 82 may be recessed on the door body 83. A manipulator for manipulation of the dish washer 8 may also be formed at the upper end of the door body 83.

The side deco 832, the upper cap deco 833, and the lower cap deco 834 may further protrude compared with a front surface of the body plate 831, and a panel accommodation space 831a in which the panel assembly 84 is accommodated may be formed in front of the body plate 831.

A lower end of the panel assembly 84 may be inserted into the lower cap deco 834, and an upper end of the panel assembly 84 may be coupled to the upper cap deco 833 to be fixedly mounted inside the panel accommodation space 831a. A perimeter of the panel assembly 84 may be supported by the side deco 832, the upper cap deco 833, and the lower cap deco 834.

The panel assembly 84 may have the same structure as the panel assembly 30 according to the aforementioned embodiment, and thus the front surface of the panel assembly 84 may glow with various colors under control of the controller 13.

The panel assembly 84 may include a panel 841 forming a front surface thereof, a member 842 on which the panel 841 is mounted, an upper bracket 843 mounted on an upper end of the member 842 to form an upper surface of the panel assembly 84, and a lower bracket 844 mounted on a lower end of the member 842 to form a lower surface of the panel assembly 84.

Although not shown, the light guide plate 33 may be mounted on the member 842, and the lighting device 36 for emitting light to the light guide plate 33 may be provided on the lower bracket 844. The back cover 39 may be provided on a rear surface of the panel assembly 84.

As shown in FIG. 63, in the dish washer 8 as configured above, when the lighting device 36 is turned on, the entire panel 841 may glow due to light emitted from the lighting device 36, and the front appearance of the dish washer 8 may be formed by color corresponding to the color of the light emitted from the lighting device 36.

An operation of the lighting device 36 may be controlled according to control of the controller 13. Thus, the panel 841 may glow with various colors, and thus the front appearance of the dish washer 8 may also correspond to various colors.

That is, outer color of the front surface of the dish washer 8 may be freely changed under control of the lighting device 36 in the state in which the panel assembly 84 is maintained to be assembled and mounted without replacement of the panel assembly 84. Thus, the outer appearance of the dish washer 8 may be changed according to surrounding furniture or environments, and according to an operation state of the dish washer 8, the operation state may be intuitively represented by changing the outer appearance of the dish washer 8.

Figure 65:
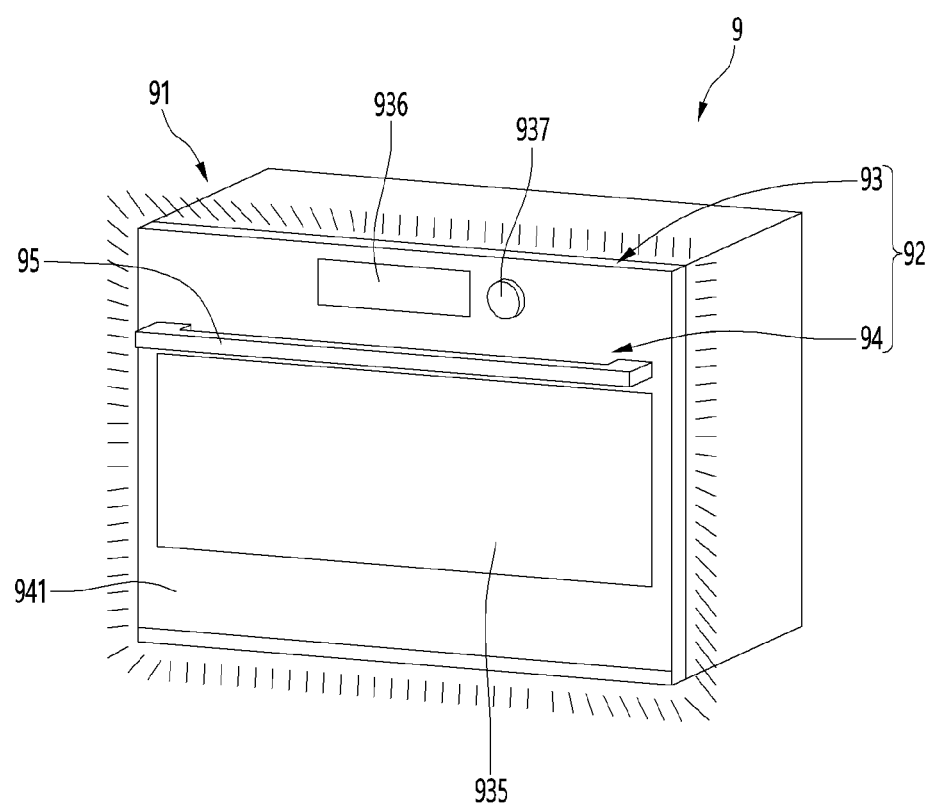
FIG. 65 is a perspective view of a cooking device according to another embodiment of the present disclosure.
Figure 66:
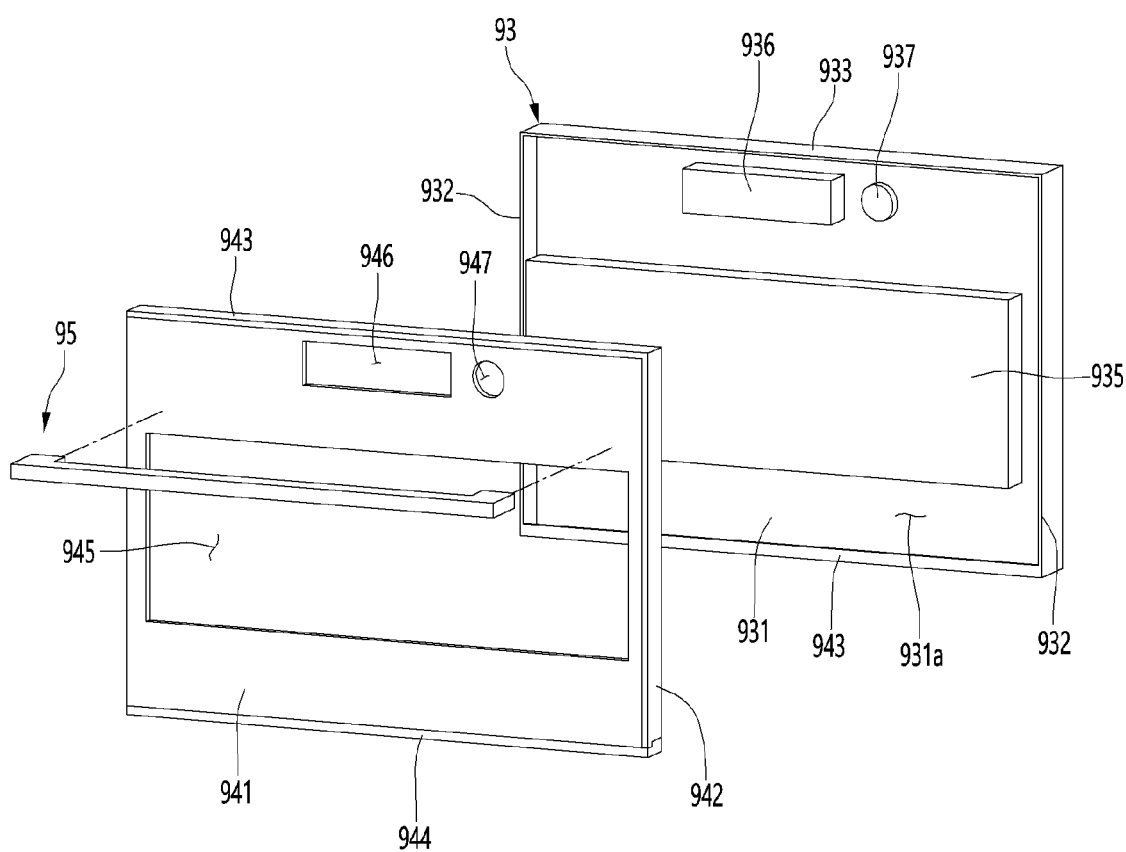
FIG. 66 is an exploded perspective view of the cooking device.

FIG. 65 is a perspective view of a cooking device according to another embodiment of the present disclosure. FIG. 66 is an exploded perspective view of the cooking device.

As shown in the drawings, an outer appearance of a cooking device 9 according to another embodiment of the present disclosure may be formed a case 91 forming a space in which food is accommodated and cooking is performed, and a door 92 for opening and closing an open front surface of the case 91.

Although not shown in detail, in general, a cooking space may be formed inside the case 91, and a heater or a magnetron for cooling food, a fan for air circulation inside the cooking device, or a turntable that accommodated food and rotates may be provided inside the cooking space.

The door 92 may be rotatably mounted on the case 91, and in the state in which the door 92 is closed, the door 92 may form the front appearance of the cooking device 9. The door 92 may include a door body 93 for opening and closing the cooking space, and a panel assembly 94 mounted on the door body 93 to form a front surface of the door 92.

A body plate 931 may be provided on a front surface of the door body 93 to form a front surface of the door body 93. A side deco 932 extending in a vertical direction may be provided along right and left side ends of the door body 93, and right and left side surfaces of the door body 93 may be formed by the side deco 932. An upper cap deco 933 for connecting upper ends of the side deco 932 at right and left sides to form an upper surface of the door body 93, and a lower cap deco 934 for connecting lower ends of the side deco 932 at right and left sides to form a lower surface of the door body 93 may be provided.

A manipulator for manipulating an operation of the cooking device 9 may be formed above the door body 93. The manipulator may include a display 936, and a knob 936 or a button for manipulation. A sight window 935 for seeing the cooking space therethrough may be formed almost at the center of the door body 93.

The side deco 932, the upper cap deco 933, and the lower cap deco 934 may further protrude compared with a front surface of the body plate 931, and a panel accommodation space 931a in which the panel assembly 94 is accommodated may be formed in front of the body plate 931.

A lower end of the panel assembly 94 may be inserted into the lower cap deco 934, and an upper end of the panel assembly 94 may be coupled to the upper cap deco 933 to be fixedly mounted inside the panel accommodation space 931a. A perimeter of the panel assembly 94 may be supported by the side deco 932, the upper cap deco 933, and the lower cap deco 934.

A plurality of panel openings 945, 946, and 947 may be formed on the panel assembly 94. The panel openings 945, 946, and 947 may include a display opening 946 formed with a corresponding size to the display 936 at a position corresponding thereto, a knob opening 947 formed with a corresponding size to the knob 936 at a position corresponding thereto, and a sight window opening 945 formed with a corresponding size to the sight window 935 at a position corresponding thereto.

Thus, when the panel assembly 94 is mounted, the display 936, the knob 936, and the sight window 935 may be exposed forward through the panel assembly 94.

Components of the panel assembly 94 may have the same structure as the panel assembly 30 according to the aforementioned embodiment except for the panel openings 945, 946, and 947, and thus the front surface of the panel assembly 94 may glow with various colors under control of the controller 13.

The panel assembly 94 may include a panel 941 forming a front surface thereof, a member 942 on which the panel 941 is mounted, an upper bracket 943 mounted on an upper end of the member 942 to form an upper surface of the panel assembly 94, and a lower bracket 944 mounted on a lower end of the member 942 to form a lower surface of the panel assembly 94.

Although not shown, the light guide plate 33 may be mounted on the member 942, and the lighting device 36 for emitting light to the light guide plate 33 may be provided on the lower bracket 944. The back cover 39 may be provided on a rear surface of the panel assembly 94.

A handle 95 for manipulation to open and close the door 92 may be further provided on a front surface of the panel assembly 94.

As shown in FIG. 65, in the cooking device 9 as configured above, when the lighting device 36 is turned on, the entire panel 941 may glow due to light emitted from the lighting device 36, and the front appearance of the cooking device 9 may be formed by color corresponding to the color of the light emitted from the lighting device 36.

An operation of the lighting device 36 may be controlled according to control of the controller 13. Thus, the panel 941 may glow with various colors, and thus the front appearance of the cooking device 9 may also correspond to various colors.

That is, outer color of the front surface of the cooking device 9 may be freely changed under control of the lighting device 36 in the state in which the panel assembly 94 is maintained to be assembled and mounted without replacement of the panel assembly 94. Thus, the outer appearance of the cooking device 9 may be changed according to surrounding furniture or environments, and according to an operation state of the cooking device 9, the operation state may be intuitively represented by changing the outer appearance of the cooking device 9.

The refrigerator according to the proposed embodiments may have the following effects.

Outer appearances of the refrigerator according to the embodiments of the present disclosure may be formed by a panel assembly forming a front appearance. In particular, in the state in which a lighting device is turned off, color of the panel assembly itself may be represented to the outside, and the refrigerator and the home appliance may have an outer appearance with a first color. When the lighting device is turned on according to user selection or already set settings, the panel assembly may have an outer appearance with a second color by changing the color of the panel assembly by the lighting device.

Accordingly, in the state in which the panel assembly is mounted, the outer appearance of the refrigerator, in particular, color thereof may be freely changed without replacement of panel assembly, and dramatic improvement in the outer appearance of the refrigerator may be expected.

In particular, the lighting device may emit light with various colors, and thus outer color of the refrigerator and the home appliance may be advantageously changed.

In the panel assembly, a panel forming an outer appearance of a front surface of the panel assembly may be simply adhered to a member via an adhesive member, and thus an outer appearance of the entire door as well as an outer appearance of the panel assembly may be formed by a front plate without exposure of a separate fixing structure to expect improvement in an entire outer appearance of the refrigerator and the home appliance.

In particular, there may be no component for hiding the panel, color of which is changed while light is emitted, and thus an effect of change in an outer appearance due to color change may be maximized, and the outer appearance may be advantageously further improved.

The member may include a front part to which the panel is to be adhered, and a perimeter of the panel may be adhered to the front part of the member via an adhesive member. In this case, the adhesive member may be formed of a material for transmitting light therethrough, and thus, light may also be transmitted in a region of the panel, in which the adhesive member is disposed, to cause the entire panel to glow.

A pattern part having patterns with higher density may be further formed on a portion of the light guide plate, which corresponds to a position of the adhesive member. Thus, light may be more concentrated on a portion in which the adhesive member is disposed, and thus even if the panel is adhered by an adhesive member, the entire front surface of the panel may glow with uniform brightness without shadow on the panel.

An edge reflector with higher reflectance may be formed on a portion of a reflective sheet, which corresponds to a position of the adhesive member. Thus, light may be more concentrated on a portion in which the adhesive member is disposed, and thus even if the panel is adhered by an adhesive member, the entire front surface of the panel may glow with uniform brightness without shadow on the panel.

Side surface parts may be formed on both side surfaces of the member, and the light guide plate may be slidably inserted through the side part. In the state in which the light guide plate is slidably inserted along the side part, the light guide plate may be in contact with a front part of the member. In this case, the member may be formed of a material for transmitting light therethrough to simultaneously support the member and the light guide plate.

Thus, even when the door is opened and closed, the light guide plate may be maintained to be spaced apart from the panel by a constant interval, and thus the panel may glow with uniform brightness. In particular, even when the light guide plate is deformed by heat, the light guide plate may be maintained to be in contact with the front part of the member, thereby preventing a dark part such as stain from being formed on the panel.

The first space may be formed on the side part, and thus the light guide plate may be slidably inserted and mounted without adding a separate component for coupling the light guide plate. In this case, since the member may be formed of a transparent material, light reflected by the light guide plate may not be hidden, and accordingly, light may be emitted through the entire panel to represent color desired by a user.

A second space into which an upper bracket and a lower bracket are inserted may be further formed on the side part, and thus the upper bracket and the lower bracket may be simply assembled and mounted, thereby improving assembly workability. As necessary, the upper bracket, the lower bracket, and the light guide plate may be decoupled without a separate coupling and dissembling operation, thereby advantageously improving serviceability.

The member may be integrally formed with the front part, and a structure for mounting the panel and the light guide plate may be advantageously provided by simply molding the member. In particular, the member may be formed with the same or similar cross-sectional shape in a vertical direction to be molded by extrusion, and thus the formability of the member and the productivity of the entire panel assembly may be advantageously improved.

Because a light diffuser may be added to the member, light that is transmitted through the member and is directed toward the panel may be diffused to cause the panel to glow brightly, and accordingly, the entire surface of the panel may glow uniformly and brightly.

Since the light diffuser is added to the member, the transparency of the member may be lowered in the state in which the lighting device is turned off to prevent components disposed behind the member from being exposed to the outside, thereby advantageously preventing an outer appearance from being adversely affected in the state in which the lighting device is turned off In addition, because components exposed through the panel may be hidden by the member, a separate component of a border region such as a bezel may be not required in the panel assembly, and thus improvement in an entire outer appearance may be expected.

The front plate and the support member may be fixedly adhered by the sealant. The sealant may be coated along a periphery of the rear surface of the front plate or the front surface of the support member. Thus, a separate component for coupling the front plate and the support member may not be required, and in particular, another component may not be coupled along an edge of the front surface of the front plate. Thus, the front plate may define an entire outer appearance of the front surface of the door. That is, a bezel may not be visible to advantageously provide a refined aesthetic.

The sealant may be formed of a transparent or light-transmissible material. The sealant may be spread with a larger thickness than a thickness by which the sealant is initially coated by pressing the front plate and the support member. Accordingly, the sealant may not define an interface with the support member. When the lighting device is operated, the front plate may uniformly glow, and the sealant may not be exposed from the front, advantageously.

The front plate and the support member may be adhered by the sealant and may be firmly fixed, thereby advantageously simplifying an assembly operation.

In the panel assembly, a light guide plate disposed behind the panel may be fixed by a simple coupling structure of a member, an upper bracket, and a lower bracket. A component for fixing the light guide plate may be prevented being exposed to the front of the panel assembly.

In particular, there may be no component that hides the panel emitting light, and thus an effect of changing the exterior color may be maximized. The components supporting the light guide plate may not hide the front end of the light guide plate. Accordingly, the entire panel may shine, and the outer appearance may be further improved.

The both left and right ends of the light guide plate may be constrained by side parts of the member, and the upper and lower ends of the light guide plate may be constrained by the upper and lower brackets, and thus upper, lower, left, and right peripheries of the light guide plate may entirely fixed. Therefore, even if the door is repeatedly opened and closed, the light guide plate may be stably maintained at an initial mounting position, and the panel may glow with uniform brightness.

The upper bracket and the lower bracket may have a simple coupling structure by being inserted into the upper and lower ends of the member, and the upper and lower ends of the light guide plate may also be advantageously supported through such a coupling structure.

In particular, the light guide plate may be fixed and the upper bracket and the lower bracket may also be fixed using the side part, and an entire assembly structure of the panel assembly may be very simplified. The upper bracket, the lower bracket, and the light guide plate may be separately and simply dissembled, thereby advantageously improving maintenance performance.

A support for supporting the light guide plate may be formed between a plurality of screw bosses for coupling the back cover on the upper bracket and the lower bracket. Thus, the panel assembly may be advantageously thinner and more compact.

The invention claimed is:

1. A refrigerator comprising:
a cabinet that defines a storage space; and
a door configured to open and close at least a portion of the storage space, the door comprising a door body that accommodates an insulator and a panel assembly disposed on the door body,
wherein the panel assembly comprises:
a lighting device configured to emit light,
a panel that defines a front surface of the door and is configured to transmit the light emitted from the lighting device,
a light guide plate disposed rearward relative to the panel and configured to guide the light emitted from the lighting device toward the panel, and
a member that is made of a material configured to transmit the light and that is disposed between the panel and the light guide plate, the member partitioning a space between a rear surface of the panel and a front surface of the light guide plate and being configured to transmit the light from the light guide plate to the panel.

2. The refrigerator of claim 1, wherein the member includes:
a front part that faces the panel and partitions the space between the rear surface of the panel and the front surface of the light guide plate; and
side parts that extend from lateral sides of the front part toward the door body to thereby define an accommodation space that receives the light guide plate.

3. The refrigerator of claim 2, wherein each of the side parts includes:
a first extension that extends from the front part toward the door body; and
a second extension that extends from the first extension in a direction parallel to the front part, and
wherein the accommodation space comprises a first space that is defined by the first extension and the second extension and receives the light guide plate.

4. The refrigerator of claim 3, wherein the first space has an upper opening and a lower opening that are spaced apart from each other in a vertical direction to thereby allow the light guide plate to be inserted into the first space and removed from the first space in the vertical direction through the upper opening or the lower opening, and
wherein a shape of a first horizontal cross-section of the member defined at a first point of the member is identical to a shape of a second horizontal cross-section of the member defined at a second point of the member, the second point being spaced apart from the first point in the vertical direction.

5. The refrigerator of claim 3, wherein a distance between the front part and the second extension corresponds to a thickness of the light guide plate.

6. The refrigerator of claim 3, wherein the front part is in contact with the front surface of the light guide plate,
wherein the second extension is in contact with a rear surface of the light guide plate, and
wherein the first extension is in contact with a side surface of the light guide plate.

7. The refrigerator according to claim 3, wherein the panel assembly further comprises:
an upper bracket that defines an upper surface of the panel assembly and is disposed at an upper end of the member; and
a lower bracket that defines a lower surface of the panel assembly and is disposed at a lower end of the member.

8. The refrigerator of claim 7, wherein each of the side parts further comprises a third extension that is spaced apart from the second extension and protrudes from the first extension in the direction parallel to the front part, and
wherein the accommodation space further comprises a second space that is defined between the second extension and the third extension and receives the upper bracket and the lower bracket.

9. The refrigerator of claim 8, wherein the third extension protrudes farther toward a center of the member than the second extension.

10. The refrigerator of claim 7, wherein the lighting device is disposed at at least one of the upper bracket or the lower bracket.

11. The refrigerator according to claim 7, wherein the member defines:
an upper step portion that receives the upper bracket at the upper end of the member; and
a lower step portion that receives the lower bracket at the lower end of the member.

12. The refrigerator according to claim 2, wherein the panel assembly further comprises a back cover that is disposed at rear surfaces of the side parts and defines a rear surface of the panel assembly.

13. The refrigerator according to claim 12, wherein the panel assembly further comprises:
an upper bracket that defines an upper surface of the panel assembly and is disposed at an upper end of the member; and
a lower bracket that defines a lower surface of the panel assembly and is disposed at a lower end of the member.

14. The refrigerator according to claim 13, wherein the rear surfaces of the side parts are flush with a rear surface of the upper bracket, and wherein the back cover is in contact with the rear surfaces of the side parts and the rear surface of the upper bracket.

15. The refrigerator according to claim 1, wherein the rear surface of the panel faces a front surface of the member, and
wherein a surface area of the rear surface of the panel is equal to a surface area of the front surface of the member.

16. The refrigerator according to claim 1, wherein a width of the panel in a first direction is equal to a width of the member in the first direction, and
wherein a height of the panel in a second direction orthogonal to the first direction is equal to a height of the member in the second direction.

17. The refrigerator according to claim 1, wherein the member is configured to diffuse the light based on transmitting the light emitted from the lighting device.

18. The refrigerator according to claim 1, wherein the member couples the panel and the light guide plate to each other.

19. The refrigerator according to claim 1, wherein the panel is made of glass, and the member is made of a plastic material.

20. A home appliance comprising:
a cabinet that defines an opening; and
a door configured to open and close at least a portion of the opening, the door comprising a door body and a panel assembly disposed on the door body,
wherein the panel assembly comprises:
a lighting device configured to emit light,
a panel that defines a front surface of the door and is configured to transmit the light emitted from the lighting device,
a light guide plate disposed rearward relative to the panel and configured to guide the light emitted from the lighting device toward the panel, and
a member that is made of a material configured to transmit the light, that is disposed between the panel and the light guide plate, and that couples the panel and the light guide plate to each other, the member partitioning a space between a rear surface of the panel and a front surface of the light guide plate and being configured to transmit the light from the light guide plate to the panel.

* * * * *